(12) United States Patent
Leon et al.

(10) Patent No.: US 7,194,957 B1
(45) Date of Patent: Mar. 27, 2007

(54) SYSTEM AND METHOD OF PRINTING LABELS

(75) Inventors: J. P. Leon, San Carlos, CA (US); L. Carlton Brown, Jr., Warrenton, VA (US)

(73) Assignee: Neopost Inc., Hayward, CA (US)

( * ) Notice: Subject to any disclaimer, the term of this patent is extended or adjusted under 35 U.S.C. 154(b) by 1289 days.

(21) Appl. No.: 09/708,185

(22) Filed: Nov. 7, 2000

Related U.S. Application Data

(63) Continuation-in-part of application No. 09/611,375, filed on Jul. 7, 2000.

(60) Provisional application No. 60/216,779, filed on Jul. 7, 2000, provisional application No. 60/216,653, filed on Jul. 7, 2000, provisional application No. 60/206,207, filed on May 22, 2000, provisional application No. 60/204,357, filed on May 15, 2000, provisional application No. 60/181,299, filed on Feb. 9, 2000, provisional application No. 60/181,368, filed on Feb. 8, 2000, provisional application No. 60/165,885, filed on Nov. 16, 1999, provisional application No. 60/164,639, filed on Nov. 10, 1999.

(51) Int. Cl.
*B41J 29/32* (2006.01)
*B41J 13/00* (2006.01)

(52) U.S. Cl. .................. 101/485; 101/483; 400/76
(58) Field of Classification Search ............... 400/76
See application file for complete search history.

(56) References Cited

U.S. PATENT DOCUMENTS

| 4,447,890 | A | 5/1984 | Duwel et al. |
|---|---|---|---|
| 4,657,697 | A | 4/1987 | Chiang |
| 4,725,718 | A | 2/1988 | Sansone et al. |
| 4,743,747 | A | 5/1988 | Fougere et al. |
| 4,757,537 | A | 7/1988 | Edelmann et al. |
| 4,775,246 | A | 10/1988 | Edelmann et al. |
| 4,812,994 | A | 3/1989 | Taylor et al. |
| 4,813,912 | A | 3/1989 | Chickneas et al. |

(Continued)

FOREIGN PATENT DOCUMENTS

DE     197 37 232 A1     3/1999

(Continued)

OTHER PUBLICATIONS

Machine translation of JP 6-199016 to Sato from Japanese Patent Office website.*

(Continued)

*Primary Examiner*—Daniel J. Colilla
(74) *Attorney, Agent, or Firm*—Townsend and Townsend and Crew LLP

(57) ABSTRACT

Printing one or more value indicia onto a printable medium using a remote device coupled to a computer server via a communications network includes accessing the computer server with the remote device. A user is prompted to select a serial number associated with the printable medium, and the serial number is transmitted to the computer server using the remote device. A print control program is received from the computer server. Information for printing one or more value indicia are transmitted from the computer server to the remote device. The print control program executes on the remote device to print the one or more value indicia to the printable medium using a printer coupled with the remote device.

17 Claims, 33 Drawing Sheets

U.S. PATENT DOCUMENTS

| | | | |
|---|---|---|---|
| 4,831,555 A | 5/1989 | Sansone et al. | |
| 4,853,865 A | 8/1989 | Sansone et al. | |
| 4,853,961 A | 8/1989 | Pastor | |
| 4,949,381 A | 8/1990 | Pastor | |
| 5,142,577 A | 8/1992 | Pastor | |
| 5,181,245 A | 1/1993 | Jones | |
| 5,231,668 A | 7/1993 | Kravitz | |
| 5,280,531 A | 1/1994 | Hunter | |
| 5,319,562 A | 6/1994 | Whitehouse | |
| 5,369,258 A | 11/1994 | Sansone et al. | |
| 5,377,268 A | 12/1994 | Hunter | |
| 5,448,641 A | 9/1995 | Pintsov et al. | |
| 5,457,636 A | 10/1995 | Sansone et al. | |
| 5,573,277 A | 11/1996 | Petkovsek | |
| 5,625,694 A | 4/1997 | Lee et al. | |
| 5,638,442 A | 6/1997 | Gargiulo et al. | |
| 5,666,421 A | 9/1997 | Pastor et al. | |
| 5,688,056 A | 11/1997 | Peyret | |
| 5,715,164 A | 2/1998 | Liechti et al. | |
| 5,717,597 A | 2/1998 | Kara | 364/464.18 |
| 5,737,729 A | 4/1998 | Denman | |
| 5,742,683 A | 4/1998 | Lee et al. | |
| 5,769,457 A | 6/1998 | Warther | |
| 5,781,438 A | 7/1998 | Lee et al. | |
| 5,793,867 A | 8/1998 | Cordery et al. | |
| 5,822,738 A | 10/1998 | Shah et al. | |
| 5,822,739 A | 10/1998 | Kara | 705/410 |
| 5,826,267 A | 10/1998 | McMillan | |
| 5,848,401 A | 12/1998 | Goldberg et al. | 705/408 |
| 5,909,373 A | 6/1999 | Sansone et al. | |
| 5,920,850 A | 7/1999 | Hunter et al. | |
| 5,963,928 A | 10/1999 | Lee | |
| 5,970,150 A | 10/1999 | Sansone | |
| 6,010,156 A | 1/2000 | Block | 281/2 |
| 6,085,195 A | 7/2000 | Hoyt et al. | |
| 6,141,684 A | 10/2000 | McDonald et al. | |
| 6,208,980 B1 | 3/2001 | Kara | |
| 6,249,777 B1 | 6/2001 | Kara et al. | |
| 6,262,717 B1 | 7/2001 | Donohue et al. | |
| 6,296,404 B1 | 10/2001 | Pierce et al. | |
| 6,505,179 B1 | 1/2003 | Kara | |
| 2002/0099652 A1* | 7/2002 | Herzen et al. | 705/39 |

FOREIGN PATENT DOCUMENTS

| | | | |
|---|---|---|---|
| EP | 825 565 A2 | | 2/1998 |
| EP | 845 762 A2 | | 6/1998 |
| GB | 1 536 403 | | 12/1978 |
| GB | 2197824 A | | 6/1988 |
| JP | 05064926 A | * | 3/1993 |
| JP | 06199016 A | * | 7/1994 |
| JP | 10211747 A | * | 8/1998 |
| WO | WO 97/46957 A1 | | 12/1997 |
| WO | WO 98/13790 A1 | | 4/1998 |
| WO | WO 98/20461 A2 | | 5/1998 |
| WO | WO 99/15340 | | 4/1999 |
| WO | WO 00/22602 | | 4/2000 |
| WO | WO 00/49580 A1 | | 8/2000 |

OTHER PUBLICATIONS

Diane Tinney, Organize Your Finances in a Weekend With Quicken 2000, Sep. 1, 1999, Course Technology Ptr, p. 58.*

Tetsuzo, Toyonaga *Patent Abstracts of Japan* vol. 010, No. 211 (M-501), (Jul. 24, 1986). JP 61 051370 A Fujitsu LTD., (Mar. 13, 1986) abstract.

Pollocks, L. Jr., et al. *Paper Print Side Indicator*, Xerox Disclosure Journal, US, Xerox Corporation, Stamford, Connecticut. vol. 23, No. 3, (May 1, 1998) p. 145 XP000780401 the whole document.

"Information-Based Indicia Program (IBIP), Performance Criteria for Information-Based Indicia and Security Architecture for Closed IBI Postage Metering Systems (PCIBI-C)" Jan. 12, 1999, United States Postal Service, dated Jan. 12, 1999.

"Information Based Indicia Program (IBIP) Indicium Specification," United States Postal Service, dated Jun. 13, 1996.

Information Based Indicia Program Postal Security Device Specification, United States Postal Service, dated Jun. 13, 1996.

"Information Based Indicia Program Host System Specification [Draft]," United States Postal Service, dated Oct. 9, 1996.

"Information-Based Indicia Program (IBIP), Performance Criteria for Information-Based Indicia and Security Architecture for IBI Postage Metering Systems (PCIBISAIBIPMS)," United States Postal Service, dated Aug. 19, 1998.

United States Postal Service, "Performance Criteria For Information-Based Indicia And Security Architecture For Open IBI Postage Evidencing Systems," Information Based Indicia Program (IBIP), Jun. 25, 1999 XP-002161216.

Barker-Benfield, "First Union Offers Online Transactions," *Florida Times-Union*, Jan. 28, 1994.

FIBS PUB 140-1, Federal Information Processing Standards Publication, (Jan. 11, 1994) Security Requirements for Cryptographic Modules, U.S. Department of Commerce, Ronald H. Brown, Secretary, National Institute of Standards and Technology; pp. 1-51.

* cited by examiner

WELCOME TO neopostonline.com home logout print stamps | supplies | register | account | tutorial | support about NEOPOST online customer information customer: Test User label serial numbers label in use: 1005 — [0013-D9D8 ▼] — 1011 labels remaining: 10 add label serial number: [      ][>] — 1003
                                    — 1001 mailing options mailing class: 1055 — [First Class ▼]
                              — 1051 quantity: 10 amount: $ 0.33 printing cost subtotal: $ 3.30 handling 10%: $ 0.33 total: $ 3.63 credit car information name on card: [            ] — 1351 card type: [Visa ▼] — 1353 card number: [            ] — 1355 expiration date: [06 ▼]/[2000 ▼]
                            — 1359
                  — 1357

[print stamp] [test print]
1021

WELCOME TO neopostonline.com home | logout print stamps | supplies | register | account | tutorial | support | about NEOPOST online customer information
customer: Test User label serial numbers
label in use: 00BB-EA64
labels remaining: 10
add label serial number:

mailing options
mailing class: Priority
quantity: 1305 — 1 — 1301
amount: $ 3.20   calculate cost — 1303 printing cost
subtotal: $ 3.20 — 1307
handling 10%: $ 0.32 — 1309
total: $ 3.52 — 1311 credit car information
name on card: — 1351
card type: Visa — 1353
card number: — 1355
expiration date: 06 / 2000 — 1359
— 1357 print stamp | test print
1403

SYSTEM AND METHOD OF PRINTING LABELS

CROSS-REFERENCES TO RELATED APPLICATIONS

The present application claims priority from the following applications, the entire disclosures of which are herein incorporated by reference for all purposes:

(1) U.S. Non-Provisional patent application Ser. No. 09/611,375, entitled "Providing Stamps On Secure Paper Using A Communications Network," filed Jul. 7, 2000;

(2) U.S. Provisional Patent Application No. 60/216,779, entitled "System And Method Of Printing Labels," filed Jul. 7, 2000;

(3) U.S. Provisional Patent Application No. 60/216,653, entitled "Method And System For Dispensing Postage Over The Internet, With Enhanced Postal Security Features" filed Jul. 7, 2000;

(4) U.S. Provisional Patent Application No. 60/206,207, entitled "Providing Stamps on Secure Paper Using A Communications Network" filed May 22, 2000;

(5) U.S. Provisional Patent Application No. 60/204,357, entitled "Stamps Over a Communications Network" filed May 15, 2000;

(6) U.S. Provisional Patent Application No. 60/181,299, entitled "System and Method For Stamps Over The Internet," filed Feb. 9, 2000;

(7) U.S. Provisional Patent Application No. 60/181,368, entitled "System and Method For Stamps Over The Internet," filed Feb. 8, 2000;

(8) U.S. Provisional Patent Application No. 60/165,885, entitled "System And Method For Managing Multiple Postage Functions In A Single Account," filed Nov. 16, 1999; and (9) U.S. Provisional Patent Application No. 60/164,639, entitled "System and Method For Dispensing Postage Over The Internet, With Enhanced Postal Security Features," filed Nov. 10, 1999.

The disclosure of the following U.S. patent application is herein incorporated by reference in its entirety for all purposes:

(1) U.S. Non-Provisional patent application Ser. No. 09/358,801, entitled "Method And Apparatus For Postage Label Authentication," filed Jul. 21, 1999.

The following patent applications, including the present application, are being filed concurrently, and the disclosure of each other application is herein incorporated by reference in its entirety for all purposes:

(1) U.S. Non-Provisional patent application Ser. No. 09/708,883, now abandoned, entitled "Techniques For Dispensing Postage Using A Communication Network";

(2) U.S. Non-Provisional patent application Ser. No. 09/708,975, now U.S. Pat. No. 7,085,725, entitled "Method Of Distributing Postage Label Sheets With Security Features";

(3) U.S. Non-Provisional patent application Ser. No. 09/708,913, now abandoned, entitled "Method And Apparatus For Providing Postage Indicia Over A Data Communication Network";

(4) U.S. Non-Provisional patent application Ser. No. 09/708,698, now abandoned, entitled "System And Method For Managing Multiple Postage Functions In A Single Account";

(5) U.S. Non-Provisional patent application Ser. No. 09/708,792, entitled "Targeted Advertisement Using A Security Feature On A Postage Medium";

(6) U.S. Non-Provisional patent application Ser. No. 09/708,185, entitled "System And Method Of Printing Labels"; and (7) U.S. Non-Provisional patent application Ser. No. 09/708,971, now abandoned, entitled "Providing Stamps On Secure Paper Using A Communications Network".

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates generally to postage dispensing systems, and more particularly to techniques for dispensing postage in a distributed environment using a communication network.

Traditionally, consumers could purchase postage or stamps only from special locations designated by a postal authority. For example, in the U.S., consumers could buy postage only from post offices or other centers specifically authorized by the United States Postal Service (USPS) to sell postage. A disadvantage of this traditional postage buying method is that a consumer has to spend the time and make to effort to physically travel to the post office to buy postage.

In order to alleviate the inconveniences associated with traditional techniques described above, postal authorities such as the USPS, now allow postage to be printed by electromechanical postage meters which can be placed at the consumers' or users' premises. Such postage meters can be leased, rented, or purchased where allowed, from the postal authority or from vendors, such as Neopost™, who have been authorized by the postal authority to sell the meters. Typically, the user purchases a fixed amount of postage value beforehand and the meter is programmed with this amount. Subsequently, the user is allowed to print postage up to the programmed amount. The meter typically includes a print mechanism and mechanical arrangements and/or electronic control circuitry that direct the operation of the print mechanism.

Because the meter is capable of printing postage having a value, the postal authority generally mandates that, in order to maintain security of the postal funds, the postage meters be acquired and used/handled according to strict, complex, and often bureaucratic regulations imposed by the postal authority. For example, a special meter agreement has to be signed between the meter vendor and the user before the meter can be rented or leased by the user. The user also has to secure a postal license number from a postal authority and the meter has to be seeded with the postal license number. A postal license number is usually associated with a geographical address of a user and is used by the postal authority to track the location of the postage meter and its user. A user using postage meters at multiple geographical addresses has to secure multiple postal licenses, one for each address. Additionally, before a new meter is put into service, the meter has to be inspected and sealed by postal authority personnel. Once in service, each meter has to be periodically inspected by postal authority representatives. Further, postal regulations mandate that the postage meter itself incorporate a variety of security features thereby increasing the costs associated with acquiring and using the meter. As a result, renting or leasing, and subsequently using a postal meter can often be expensive, inconvenient, and involve many bureaucratic hurdles. Consequently, it is quite impractical for individual users to use postage meters.

With a view towards alleviating some of the above-mentioned problems and making use of advances in electronics and communications, the United States Postal Service (USPS) has promulgated specifications for its Information Based Indicia Program (IBIP). The IBIP program supports new methods of applying postage in lieu of conventional approaches that typically rely on the use of a postage meter mechanically printing the indicium on mail pieces.

The IBIP program contemplates postal indicia printed by conventional printers (e.g., thermal, inkjet, or laser) and including human-readable and machine-readable portions. An indicium refers to the imprinted designation or a postage mark used on mail pieces denoting evidence of postage payment. The machine-readable portion was initially specified to be a two-dimensional barcode symbology known as PDF417. The indicium content includes a digital signature for security reasons (to preclude forgery). There are separate specifications for open and closed systems.

The specifications have been updated over the last few years; the recent specifications for open and closed systems are:

Information-Based Indicia Program (IBIP) Performance Criteria for Information-Based Indicia and Security Architecture for Open IBI Postage Evidencing Systems (PCIBI-O) (Draft Feb. 23, 2000), and Information-Based Indicia Program (IBIP) Performance Criteria for Information-Based Indicia and Security Architecture for Closed IBI Postage Metering Systems (PCIBI-C) (Draft Jan. 12, 1999).

These specifications are herein incorporated by reference in their entirety for all purposes.

An open system is defined as a general purpose computer used for printing information-based indicia, but not dedicated to the printing of those indicia. A closed system is defined as a system whose basic components are dedicated to the production of information-based indicia and related functions, that is, a device dedicated to creating indicia similar to an existing, traditional postage meter. A closed system may be a proprietary device used alone or in conjunction with other closely related, specialized equipment, and includes the indicium print mechanism.

The IBIP program specifies a postal security device (PSD) that manages the secure postage registers and performs the cryptographic operations of creating and verifying digital signatures.

The open system specification describes a host system (a computer or postage meter) connected to an unsecured printer (e.g., a laser printer or the like) and a PSD. The host system also provides communication facilities that allow the PSD's vendor and/or the USPS to establish communications with the PSD. Communications supported include troubleshooting, accounting transactions, and the like.

The PSD and host cooperate to provide an indicium, which is then transmitted to and printed by the unsecured printer. The specified indicium allows the use of an unsecured printer (e.g., thermal, inkjet, or laser) by using a digital signature, which also supports authentication of the mail piece. The indicium includes human-readable information and machine-readable information (initially specified as a PDF417 two-dimensional bar code). Each PSD is a unique security device, having core security functions such as digital signature generation and verification and secure management of information (e.g., descending and ascending registers).

Several techniques have been developed, based on the IBIP program, to streamline and simplify the use of postage meters while providing the required security. For example, U.S. Pat. No. 6,005,945 (Whitehouse) discloses a system for electronic distribution of postage using a secure central computer which generates the postal indicia in response to postage requests submitted by end user computers. However, these conventional techniques, including the system described in the Whitehouse patent, still require the user to apply for and obtain a postal license number from a postal authority. Further, since a postal license is associated with a particular address, if the user wants to purchase postage from more than one address, the user has to secure multiple postal license numbers, one for each address. As a result, a user still has to suffer the inconveniences and bureaucratic hurdles of obtaining postal license numbers. Further, since the issuance of postal licenses may take several days or even weeks, valuable time is wasted before a user can make use of services provided by a postage vendor. Thus, even though electronic postage distribution techniques based upon the IBIP program have reduced inconveniences associated with traditional postage meters, they are still significantly unwieldy.

Many consumers find printing postage indicia intimidating. For instance, if done improperly, the postage indicia may be misprinted and rendered unusable. For example, if a roll of postage labels is improperly inserted into a label printer, postage indicia might be printed on the back side of the label roll. In such cases, consumers must expend time and effort to obtain refunds for postage indicia rendered unusable.

In light of the above, there is a need for techniques which allow a user to buy postage without suffering the inconveniences described above. It is further desirable that the techniques be operable in a distributed environment and make use of communication networks such as the Internet. Additionally, there is a need for techniques which allow a user to purchase and print postage in a user-friendly and non-intimidating manner.

SUMMARY OF THE INVENTION

In one embodiment according to the invention, a method for printing one or more value indicia onto a printable medium using a remote device coupled to a computer server via a communications network is provided. The method comprises accessing the computer server with the remote device. The method also comprises prompting a user to select a serial number associated with the printable medium, and transmitting the serial number to the computer server using the remote device. The method additionally comprises receiving from the computer server a print control program, and transmitting from the computer server to the remote device information for printing one or more value indicia. The method still further comprises executing the print control program on the remote device to print the one or more value indicia to the printable medium using a printer coupled with the remote device.

In another embodiment according to the invention, a system for printing one or more value indicia onto a printable medium using a remote device coupled to a computer server via a communications network is provided. The system includes a module for permitting the remote device access to the computer server. The system also includes a module for prompting a user to select a serial number associated with the printable medium, and a module for receiving the serial number from the remote device. The system further includes a module for transmitting to the remote device information for printing one or more value indicia, and a module for transmitting a print control program to the remote device, wherein the print control program is configured to execute on the remote device to print the one or more value indicia to the printable medium using a printer coupled with the remote device.

In another aspect according to the invention, a method for determining a correct insertion orientation for a printable medium in a printer is provided. The method comprises prompting, with a computer coupled with an output device and with the printer, a user to place a first mark on a sheet of paper, and prompting, with the computer, a user to insert the sheet of paper into the printer in an orientation relative to the first mark. The method also comprises printing a second mark to the sheet of paper with the printer, and prompting, with the computer, the correct insertion orientation for a label sheet based upon the location of the first and second marks on the sheet of paper.

In another embodiment according to the invention, another method for determining a correct insertion orientation for a printable medium in a printer is provided. The method includes prompting, with a computer coupled with an output device and with the printer, a user to insert the printable medium into the printer in a first orientation, and printing a test mark to an actual location on the printable medium with the printer. The method additionally include prompting, with the computer, the user to compare the actual location of the test mark to an intended location. The method further includes if the actual location does not correspond to the intended location, prompting the user to re-insert the printable medium into the printer in a second orientation, and repeating the printing, prompting the user to compare, and prompting the user to re-insert steps until the actual location corresponds to the intended location.

In still another embodiment according to the invention, yet another method for determining a correct insertion orientation for a printable medium in a printer is provided. The method comprises providing a printable medium having a plurality of orientation markings, and prompting, with a computer coupled with an output device and with the printer, a user to insert the printable medium into the printer in an orientation relative to the orientation markings. The method additionally comprises printing a test mark to the printable medium with the printer, and prompting, with the computer, the user to select one of the plurality of orientation markings proximate to which the test mark was printed. The method further comprises prompting, with the computer, the correct insertion orientation for the printable medium based upon the location of the test mark relative to the orientation markings.

In yet another aspect according to the invention, a reversible label sheet is provided. The reversible label sheet comprises a plurality of labels removably adhered thereto, and the label sheet having a center point. Each of the plurality of labels has a pattern preprinted thereon defining a print target area, the print target area having a size, shape, location, and orientation, and each of the plurality of labels has a corresponding one of the plurality of labels. The size and shape of the print target area of the each of the plurality of labels is the same as the size and shape of the print target area of the corresponding one of the plurality of labels, and the location of the print target area of the each of the plurality of labels is rotated 180 degrees about the center point from the location of the print target area of the corresponding one of the plurality of labels. Further, the orientation of the print target area of the each of the plurality of labels is rotated 180 degrees from the orientation of the print target area of the corresponding one of the plurality of labels.

A further understanding of the nature and advantages of the present invention may be realized by reference to the remaining portions of the specification and the attached drawings.

BRIEF DESCRIPTION OF THE DRAWINGS

FIG. 5 is another example of a web page for registering with a website;

FIG. 6 is yet another example of a web page for registering with a website;

FIG. 10 is an example of a web page for entering a serial number, selecting a stamp type, selecting a stamp value, submitting payment information, and printing stamps;

FIG. 13A an example of a web page for entering a serial number, selecting a stamp type, selecting a stamp value, submitting payment information, and printing stamps;

DESCRIPTION OF THE SPECIFIC EMBODIMENTS

A System for Dispensing Postage

Figure 1A:
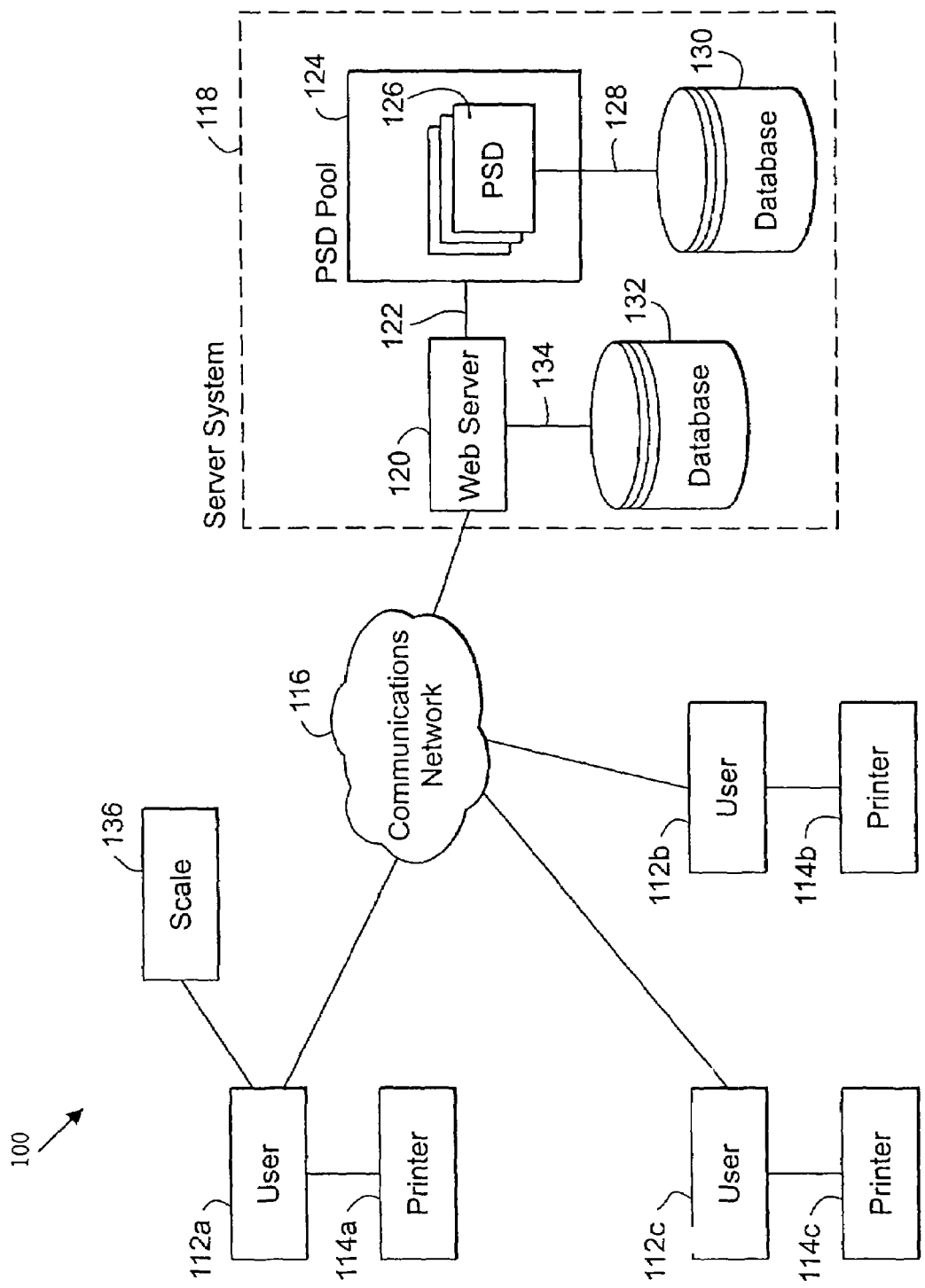
FIG. 1A is a simplified block diagram of a distributed computer network which may incorporate an embodiment of the present invention.

The present invention provides techniques for dispensing postage using a communication network such as the Internet. FIG. 1A is a simplified block diagram of a distributed computer network 100 which may incorporate an embodiment of the present invention. User computers 112a, 112b, and 112c are coupled to their respective printers 114a, 114b, and 114c. A user may have an optional postal scale, such as postal scale 136 coupled with user computer 112a. The user computers 112a, 112b, and 112c communicate over a communication network 116, e.g., the Internet, to a server system 118, which may include one or more Web servers 120. In one embodiment the server system 118 is a "central" postage meter with one USPS Postal license, that dispenses stamps on demand. The Web server 120 communicates with a Postal Security Device Module (PSDM), including a pool 124 of one or more virtual Postal Security Devices (PSDs) for generating postage indicia. A particular PSD, e.g., 126, in the pool 124 is selected to generate an indicium. The PSD 126 in the pool 124 stores its postal information, including its Ascending Register (AR) and Descending Register (DR) data on a database 130, which may be a relational, object-oriented, or mixed database. The link 128 is a logical link to the database 130 and may include a physical connection.

In contrast to prior art systems, the postal license is assigned to the server system. The users do not have to obtain separate postal licenses. In addition there are a small number of PSDs, each with a digital signature key pair for signing the indicia. Each user does not need nor have a digital signature key pair. Thus the generating of stamps is centralized and the management of keys and accounting information is simplified. To the user, its client is small, e.g., a print.dll, and there is the familiarity of the simplicity of purchasing an over the counter stamp or book of stamps, except now the post office has come to the user's home rather than the user going to the post office.

Communication network 116 provides a mechanism for allowing the various components of distributed network 100 to communicate and exchange information with each other. Communication network 116 may itself be comprised of many interconnected computer systems and communication links. Communication links 108 may be hardwire links, optical links, satellite or other wireless communications links, wave propagation links, or any other mechanisms for communication of information. While in one embodiment communication network 116 is the Internet, in other embodiments, communication network 116 may be any suitable computer network. Distributed computer network 100 depicted in FIG. 1A is merely illustrative of an embodiment incorporating the present invention and does not limit the scope of the invention as recited in the claims. One of ordinary skill in the art would recognize other variations, modifications, and alternatives. For example, more than one server system 118 may be coupled to communication network 116. Further, one or more printers 114, or one or more scales 136, may optionally be coupled to a single user system 112, or alternatively a plurality of user systems 112 may share one or more common printers and/or common scales. Other devices such as fax machines, scanners, etc. may also be coupled to user systems 112.

User systems 112 allow users of the present invention, for example, postage consumers, to interact with and buy postage from server system 118. These users may include one or more human beings interacting with an user system 112, one or more processes executing on user system 112 or systems coupled to user systems 112, devices coupled to user system 112, or other entities capable of interacting with server system 118. Various different types of interactions with server system 118 are facilitated by user systems 112. For example, users may use user systems 112 to configure requests to purchase postage from server system 118. These user purchase requests are then communicated from user systems 112 to server system 118 via communication network 116. In response to the user requests, user systems 112 may receive information for printing indicia (or a single indicium) from server system 118. A user may then use user system 112 to print the indicia using printer devices coupled to or accessible to user system 112. The indicia may be printed on labels, on paper, on the mail pieces themselves, or on other like media. In alternative embodiments of the present invention, a user using user system 112 may store the information for printing indicia received from server system 118 on a storage medium, such as a computer disk, for subsequent printing of the indicia.

Users may also use user systems 112 to perform other activities such as browse web-pages stored by server system 118, register as users of services provided by server system 118, provide financial and credit information for consummating commercial transactions with server system 118, review status of user accounts if such accounts are maintained by server system 118, review postage purchase history, access help or customer services provided by server system 118, and to perform other like activities. Accordingly, in a client-server environment, user system 112 typically operates as a client requesting information from server system 118 which operates as a server which performs processing in response to the client request and provides the requested information to the client systems. It should, however, be apparent that a particular user system 112 may act both as a client or a server depending on whether the user system is requesting or providing information.

In one embodiment, the server system 118 includes a database 132 coupled with web server 120. The web server 120 and database 132 store information and disseminate it to individual computers (e.g., 112a) over communications network 116. With respect to the electronic database 132, it generally contains web pages and forms. The web pages may be written using hypertext markup language (HTML), dynamic HTML, or the like, and may incorporate any combination of text, graphics, audio and video contents, software programs (e.g., java), and other data. Web pages may also contain hypertext links to other web pages. Each web page is uniquely identified by an address called a Uniform Resource Locator (URL) that enables users to access the web page.

A user may use user system 112 to browse or interact with web pages provided by server system 118. These web pages may be stored by one or more web servers 120 in server system 118 and may be accessed by users of user system 112 via a browser program executing on user system 112. Examples of browser programs include the Internet Explorer browser program provided by Microsoft Corporation, the Netscape Navigator browser provided by Netscape Corporation, and others. Users may access web pages by providing URL information to the browser, either directly or indirectly, and in response, a web page corresponding to the user-specified URL is downloaded from a server coupled to communication network 116 to the requesting user computer 112. The downloaded web page may then be viewed by the user using the browser.

Database 132 can be composed of a number of different databases. These databases can be located in one central repository, or alternatively, they can be dispersed among various distinct physical locations. These databases can be categorized and structured in various ways based on the needs and criteria of the database designer. Methods used to create and organize databases are commonly known in the art, for example, relational database techniques can be used to logically connect these databases. In one embodiment, as shown in FIG. 1A, the database 132 can be physically located separate from the web server 120. The database can reside on remote, distant servers on a local area network or the Internet. Under this arrangement, whenever any data are needed, the processor needs to access the necessary database (s) via a communication channel to retrieve the requisite data for analysis. For example, the processor can access and retrieve data from a remote database via a computer network such as a LAN or the Internet.

According to the teachings of the present invention, server system 118 is responsible for dispensing postage to users in response to postage purchase requests received from user systems 112. As shown in FIG. 1A, server system 118 may itself be comprised of multiple interconnected computer and server systems and communication links, as will be described below. Server system 118 may be configured to receive postage requests from user systems 112, validate the postage requests, generate information for printing indicia in response to the postage requests, perform security functions related to the postage transaction, manage funds related to the postage transaction, communicate the information for printing the indicia to the requesting user systems 112, maintain users accounts, and several other functions. These functions are generally performed by software code modules executed by server system 118. However, it should be apparent that these functions may be also performed by software modules or hardware modules of server system 118, or combinations thereof.

According to an embodiment of the present invention, the information for printing indicia generated by server system 118 is generally along the lines specified by the IBIP specifications published by the United States Postal Service (USPS). As indicated above, the IBIP specifications propose new methods for generating postage which will make use of technological advances in the fields of computers and communication networks while enhancing the security of the postage. These methods are supposed to retrofit and augment existing postage meters using new technology known as information-based indicia.

According to the teachings of the present invention, the security-critical functions performed by server system 118 as part of generating the information for printing the indicia comply with the security-critical functions performed by the Postal Security Device (PSD) described in the IBIP specifications. Server system 118 may also be configured to perform functions performed by the Host System described in the IBIP specifications. Further, details regarding the functions performed by server system 118 are provided below.

According to the teachings of the present invention, a single postal license number is assigned to each server system 118 by a postal authority such as the USPS. Server system 118 uses the single postal license number to cater to postage requests from a plurality of unrelated users who may be at different geographical addresses. Thus, according to the present invention, a single postal license number is effectively shared between a plurality of users who may have different geographical addresses. This is substantially different from conventional postage vending techniques wherein a user is required to apply for and receive at least one unique postal license number. This is the case even if the postage indicium was generated by a central computer, for example, as discussed in U.S. Pat. No. 6,005,945 (Whitehouse). Accordingly, the present invention provides a level of postage buying convenience heretofore not achieved by conventional techniques. Since the postal license number is associated with server system 118 rather than with the user, the user is shielded from the procedural steps required for obtaining the postal license number. In fact, according to the present invention, the consumer of the postage does not even have to be aware of the postal license number. A user may buy postage by simply sending a postage request to server system 118 and receiving information for printing one or more indicia corresponding to the request from server system 118.

The user computers 112a, 112b, and 112c may be any one of various devices including, for example, a desktop computer, a laptop computer, a personal digital assistant, a cellular phone, a pager, a workstation, and the like. Each of the user computers 112a, 112b, and 112c may include user output devices such as, for example, a display device, a speaker, and the like. Each of the user computers 112a, 112b, and 112c may also include user input devices such as, for example, a keyboard, a key pad, a mouse, a trackball, a touch screen, a barcode scanner, a light pen, a microphone, and the like. As described above, each of the user computers 112a, 112b, and 112c is coupled to respective printers 114a, 114b, and 114c. The printers 114a, 114b, and 114c may be any one of various printer types including printers such as, for example, laser printers, inkjet printers, and the like, or specialized label printers such as, for example, the Seiko SLP 220, the Brother PT-9200PC, or the like. The printers 114a, 114b, and 114c may be coupled with their respective user computers 112a, 112b, and 112c directly, such as with a cable, infrared link, or the like, or indirectly, such as, via a local area network, intranet, internet, or the like.

Additionally, each of the user computers 112a, 112b, and 112c may include an optional scale device (e.g., scale device 136 associated with user computer 112a). The scale device 136 may be a device such as, for example, the Weigh-Tronix 7628 electronic postal scale, or the like. The scale device 136 may be coupled with the user computer 112a directly, such as with a cable, infrared link, or the like, or indirectly, such as, via a local area network, intranet, internet, or the like.

Also, as described above, each of the user computers 112a, 112b, and 112c includes web browsing software operating thereon for accessing, viewing, and interacting with web pages via the Internet. The web browsing software typically provides a graphical user interface allowing users to easily interact with data available on computers on the communications network 116, such as the server system 118. For example, the web browsing software allows a user to view web pages from the web server 120, enables the user to submit forms, and other data to the web server 120 and the like. Many other operations are provided by browser software and are known to those skilled in the art.

Figure 1B:
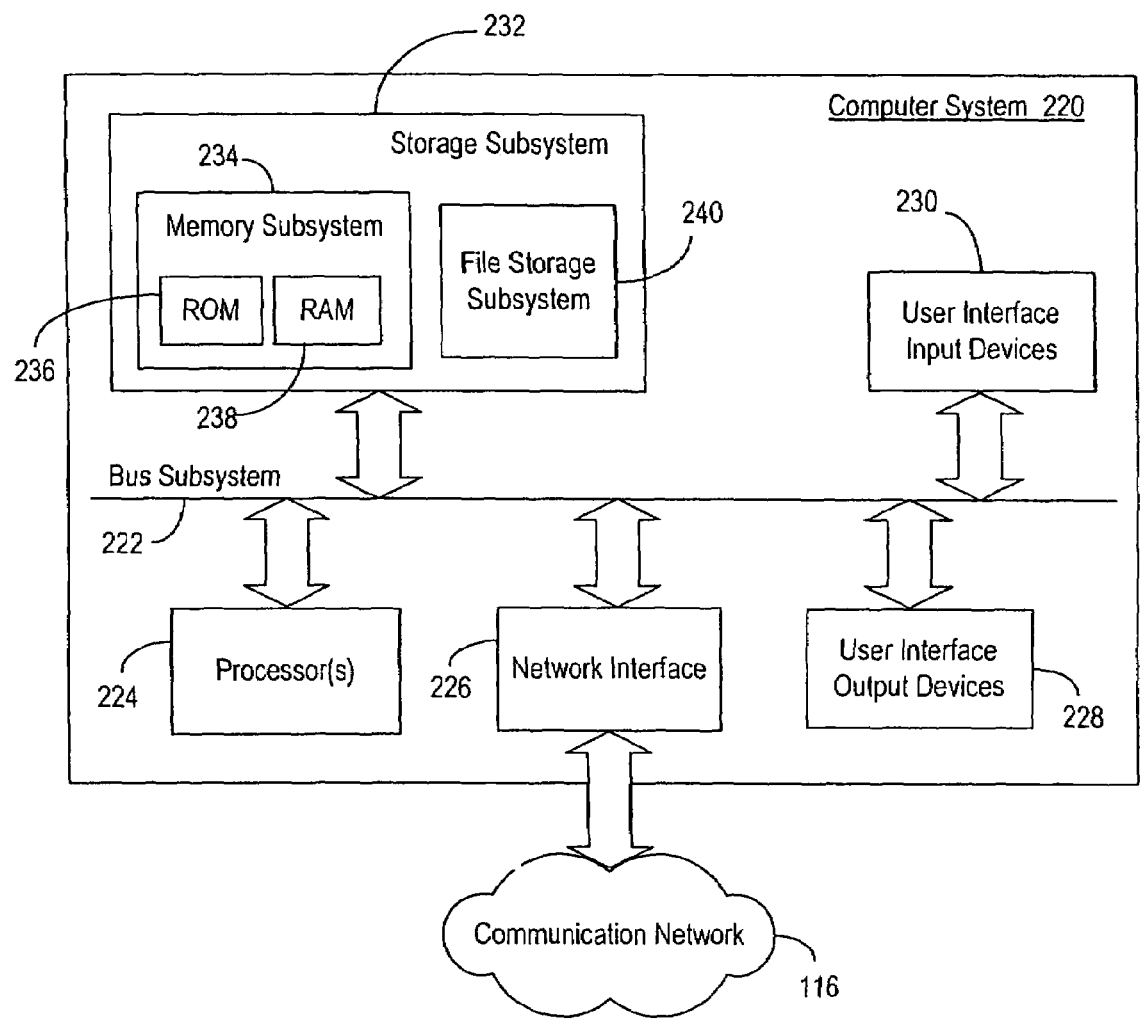
FIG. 1B is a simplified block diagram of an exemplary computer system according to an embodiment of the present invention.

FIG. 1B is a simplified block diagram of an exemplary computer system 220 according to an embodiment of the present invention. Computer system 220 may function as user system 112, as server system 118 or as one of the computer systems which make up server system 118, or other like system. Computer system 220 typically includes at least one processor 224, which communicates with a number of peripheral devices via bus subsystem 222. These peripheral devices typically include a storage subsystem 232, comprising a memory subsystem 234 and a file storage subsystem 240, user interface input devices 230, user interface output devices 228, and a network interface subsystem 226. The input and output devices allow user interaction with computer system 220. It should be apparent that the user may be a human user, a device, a process, another computer, and the like. Network interface subsystem 226 provides an interface to outside networks, including an interface to communication network 116, and is coupled via communication network 116 to corresponding interface devices in other computer systems.

User interface input devices 230 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 220 or onto communication network 116.

User interface output devices 228 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 220 to a user or to another machine or computer system.

Storage subsystem 232 stores the basic programming and data constructs that provide the functionality of the computer system. For example, the various modules implementing the functionality of the present invention may be stored in storage subsystem 232 of server system 118. These software modules are generally executed by processor(s) 224. In a distributed environment, the software modules may be stored on a plurality of computer systems and executed by processors of the plurality of computer systems. Storage subsystem 232 also provides a repository for storing the various databases storing information according to the present invention. Storage subsystem 232 typically comprises memory subsystem 234 and file storage subsystem 240.

Memory subsystem 234 typically includes a number of memories including a main random access memory (RAM) 238 for storage of instructions and data during program execution and a read only memory (ROM) 236 in which fixed instructions are stored. File storage subsystem 240 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 116. Information stored according to the teachings of the present invention may also be stored by file storage subsystem 240.

Bus subsystem 222 provides a mechanism for letting the various components and subsystems of computer system 220 communicate with each other as intended. The various subsystems and components of computer system 220 need not be at the same physical location but may be distributed at various locations within distributed network 100. Although bus subsystem 222 is shown schematically as a single bus, alternative embodiments of the bus subsystem may utilize multiple busses.

Computer system 220 itself can be of varying types including a personal computer, a portable computer, a personal digital assistant, a cellular phone, a pager, a workstation, a computer terminal, a network computer, a mainframe, or any other data processing system. Due to the ever-changing nature of computers and networks, the description of computer system 220 depicted in FIG. 1B is intended only as a specific example for purposes of illustrating the preferred embodiment of the computer system. Many other configurations of a computer system are possible having more or fewer components than the computer system depicted in FIG. 1B. Client computer systems and server computer systems generally have the same configuration as shown in FIG. 1B, with the server systems generally having more storage capacity and computing power than the client systems.

Referring again to FIG. 1A, operation of the system 100 will now be briefly described. Processing is generally initiated when a user accesses a web page provided by server system 118. Using user computer 112 and web pages provided by server system 118, the user may configure a request to purchase postage from the server system 118. The user may also use devices coupled to the user computer 112 to configure the request. For example, scale 136 may be used to provide information related to the weight of a mail piece for which postage is to be purchased.

According to an embodiment of the present invention, a user may be required to first register as a user of server system 118 and open an account with server system 118 before the user is allowed to buy postage from server system 118. As part of this registration process, the user may be asked to provide information to server system 118 such as information identifying the user, credit-card or other like information which may be used by server system 118 to bill for postage purchased by the user, and other information related to =the user. The information provided by the user may be stored by server system 118 and a unique identifier may be assigned to the user to uniquely identify the user. The user may also be allowed to select a password to access the user's account. The user may also be allowed to configure user preferences related to postage buying activities. The user may also be allowed to store funds in the account which may be used for postage purchases. It should be apparent that in alternative embodiments of the present invention, the user may be allowed to buy postage from server system 118 without opening an account or registering with server system 118.

The user request may include information identifying the user, credit-card or other like information which will be used by server system 118 to bill for the purchased postage, the amount and value/denomination of the postage which the user wishes to purchase, and other like information which may be used by server system 118 to process the request.

User computer 112 then communicates the user's request to purchase postage to server system 118 via communications network 116. According to an embodiment, a secure socket layer (SSL) connection may be established between user computer 112 and server system 118 to facilitate communication of information between user computer 112 and server system 118.

Upon receiving the request, server system 118 then may validate the request. For example, server system 118 may determine if the credit card information provided by user is valid, determine if the user has sufficient funds in a prefunded user account, validate identity of user, serial numbers on the medium on which postage indicium is to be printed, etc.

If validation is successful, server system 118 then generates information for printing an indicium for each stamp requested by the user. According to an embodiment of the present invention, the indicium related information generated by server system 118 is along the lines specified in the IBIP specifications published by the USPS. For each indicium, the information for printing the indicium may include a bitmap of the indicium, a graphical image of the indicium, data representing the indicium, raw data corresponding to the indicium, or any other information which facilitates printing of the indicium. The information for printing the indicium is then communicated from server system 118 to the requesting user system via communication network 116.

The requesting user computer 112 then receives the information for printing the indicium from the server system 118, and may use this information to print the indicium. Further details of the operation of system 100 are described below. Additionally, U.S. patent application Ser. No. 09/708, 883, entitled "Techniques For Dispensing Postage Using A Communication Network", filed Nov. 7, 2000 describes further details of the system 100 and its operation, and is herein incorporated by reference in its entirety for all purposes.

Anti-Fraud Security Features

In one embodiment, the use of specially manufactured paper or special ink may be used to print the indicia, in order to increase the difficulty of fraudulent misuse. Users are required to print on special pre-printed labels which may contain any or all of a variety of security features, for example, bar-coding, microprinting, watermarking, a fluorescent strip, or the like. In addition the labels may have serrated edges, which both enhance the security, as well as improve the esthetics of what is the typical outline of a U.S. postage stamp. Other alternative embodiments for security features on postage labels can be seen by one skilled in the art by the disclosures in Application No. 60/093,849, filed Jul. 22, 1998, entitled "Method and Apparatus for Postage Label Authentication," of J. P. Leon and David A. Coolidge and the above-noted application Ser. No. 09/358,801, filed Jul. 21, 1999, entitled "Method and Apparatus for Postage Label Authentication," of J. P. Leon and David A. Coolidge. The indicia may be printed on a secure label sheet that may be inserted in a standard printer, or on a roll of secure labels that may be inserted in a label printer.

In another embodiment serial numbers associated with each postage label and/or a "lot" of postage labels, for example, a sheet of 10 labels, are used as a security feature to prevent fraud. Users may be required to input a valid lot serial number (also referred to as a "batch number") and/or an individual label serial number before printing is enabled. The first use of a valid serial number causes it to be invalidated for future use. Serial numbers are assigned to lots and/or individual labels as they are manufactured, and are tracked and validated by the server system. A list of valid serial numbers is maintained by the server system, consisting of all serial numbers which are known to have been issued, but have not yet been reported as used. ("Issued" may, for example, include "manufactured", "received into stock", "sold at wholesale", "sold at retail", and the like). The list is updated each time a label, or a lot of labels, is imprinted, by removing from the list the serial number of that label, or of that lot. Invalid serial numbers are all numbers or character strings not included in this list.

For increased security, both lots and individual labels can be serialized; lot serial numbers and label serial numbers may be related or unrelated to each other mathematically. In either case, each lot serial number is associated with a particular set of label serial numbers. The lot serial numbers are tracked. When the consumer logs into the website, she/he is required to input a valid serial number for the lot of labels then in use. Along with the list of valid lot serial numbers, the server also contains data showing the set of individual label serial numbers associated with each lot. These label serial numbers become valid only after a consumer reports that the lot that contains them has gone into service. In an another embodiment, when printing postage, the consumer is further required to enter a valid serial number for each individual label before the system will generate the indicium. The server checks each such entry against a list of valid (i.e. unused) label serial numbers for the lot then in use. As each label serial number is used, it is invalidated for the future by deleting it from the list. When all the label serial numbers in the lot have been used, the lot serial number becomes invalid as well.

In yet another embodiment, a package of label sheets, or the like, may be purchased via the website or a third party. The package may include a tracking number that is linked with the unique lot serial numbers, label serial numbers, or the like of the label sheets, label rolls, or labels within the package.

For clarity, a serial number of a particular label will hereinafter be referred to as a "label serial number." Similarly, a lot serial number (i.e., a "batch number") corresponding to one or more label sheets or label rolls will hereinafter be referred to as a "sheet serial number" or a "roll serial number," respectively. Also, a tracking number of a package of labels sheets, label rolls, or labels, will hereinafter be referred to as a "package serial number." It is to be understood that, for a particular label on a label sheet, the label serial number may or may not be the same number as the sheet serial number. Similarly, it is to be understood that, for a particular label on a label roll, the label serial number may or may not be the same number as the roll serial number.

Figure 1C:
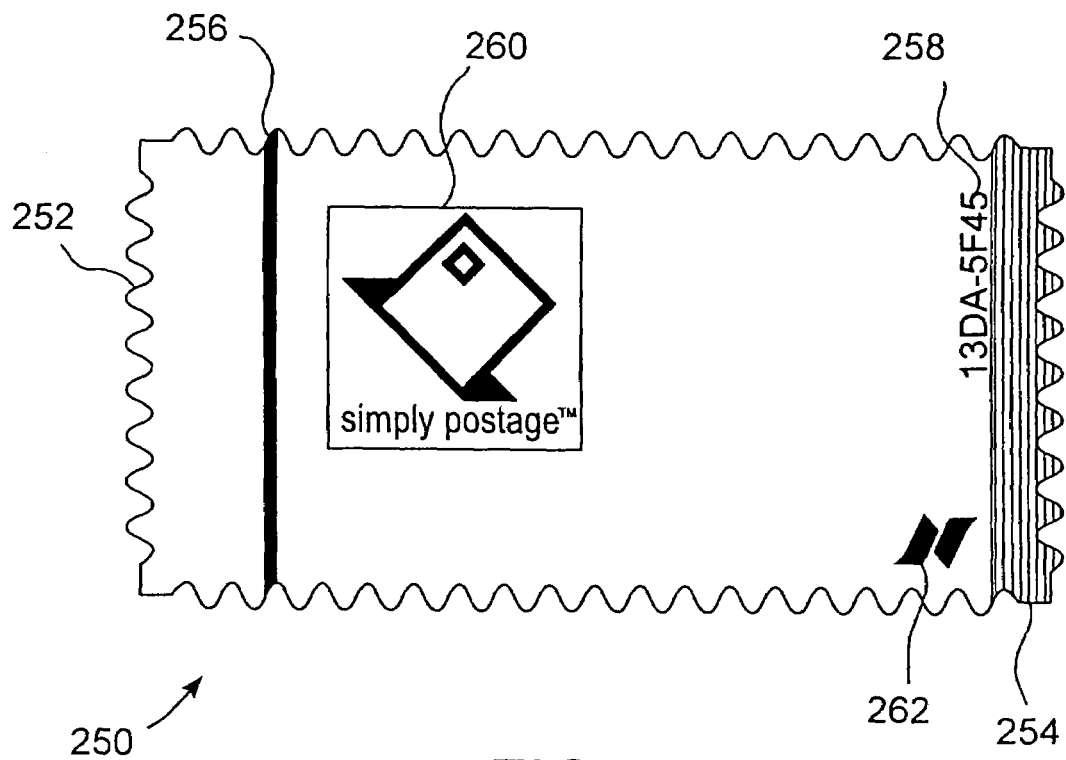
FIG. 1C depicts an exemplary individual pre-printed label on which an indicium may be printed according to an embodiment of the present invention.

FIG. 1C depicts an example of an individual pre-printed label 250 on which the indicium may be printed according to an embodiment of the present invention. As shown in FIG. 1C, label 250 has serrated edges 252 which not only serve as a security mechanism but also provide an aesthetic look and feel of a conventional U.S. postage stamp. Other security features imprinted on label 250 may include a colored stripe 254, lines of micro-print 256, a label serial number 258, a logo 260, and a watermark 262. These security features may be placed at different locations on label 250. The description of individual pre-printed label 250 depicted in FIG. 1C is intended only as a specific example for purposes of illustrating an embodiment of the present invention. Many other configurations of label 250 are possible having more or fewer features than those depicted in FIG. 1C.

The security features shown in FIG. 1C are meant to reduce fraudulent copying or misuse of the label with the indicium printed on it. For example, colored stripe 254 may be in a color, for example, fluorescent pink, which cannot be easily copied by black and white copiers. Micro-print 256 may include the name of the postage vendor printed in an intricate manner. For example, micro-print 256 may contain the name "Neopost" printed repetitively. As described above, individual labels may be serialized for increased security and the serial number corresponding to each label may be printed on the label, e.g., serial number 258 depicted in FIG. 1C.

Logo 260 may display a logo of the postage vendor. In alternative embodiments, logo 260 displayed on label 250 may be selected or customized by the user purchasing the postage. Further, logo 260 need not be pre-printed on label 250, but may be downloaded to user system 112 along with the indicium or indicium data and then printed on label 250.

The different features printed on label 250 may be printed in special ink to further increase security. The paper on which label 250 is printed may itself be made of or contain special features to reduce fraudulent use.

Figure 17:
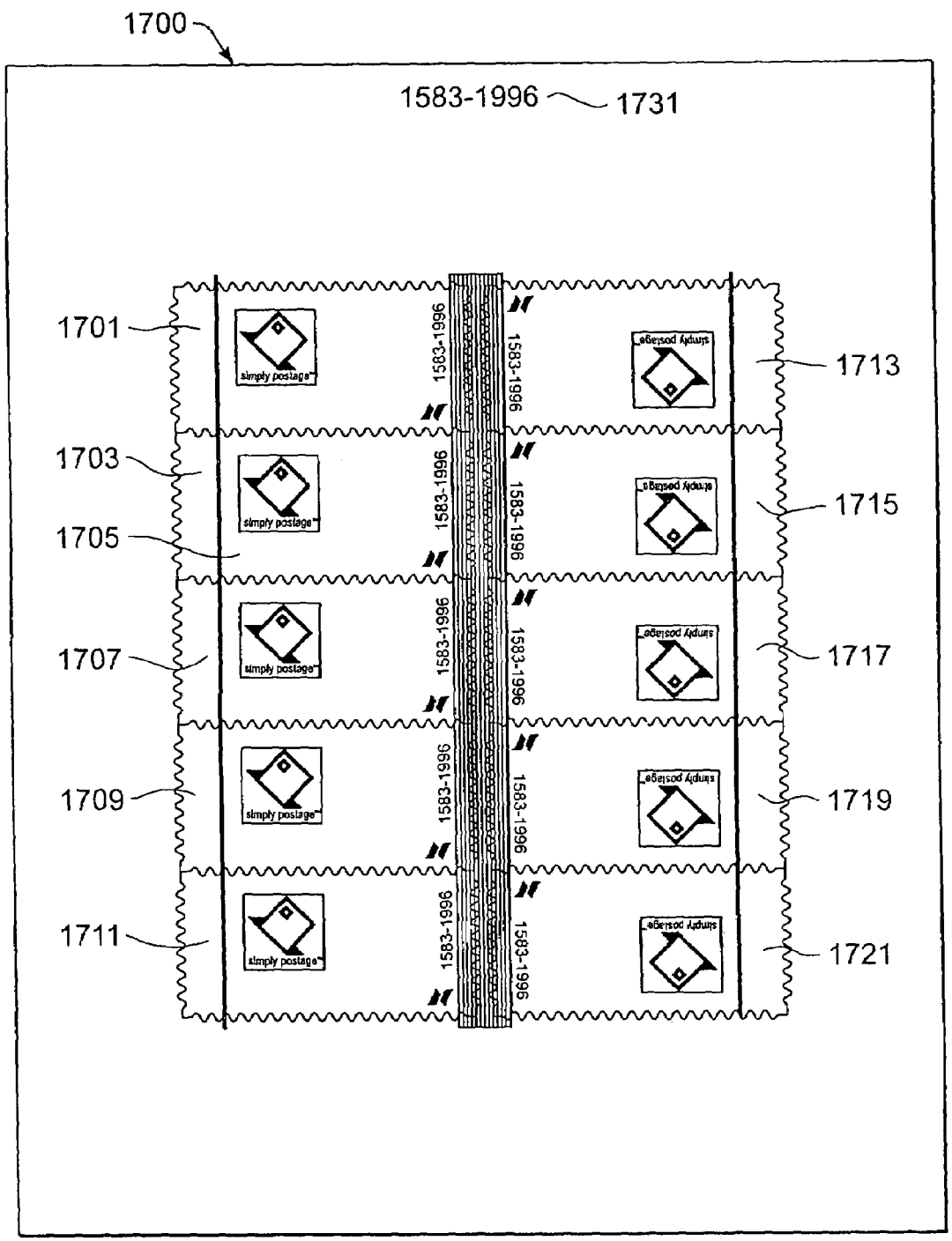
FIG. 17 illustrates a sheet of pre-printed labels according to an embodiment of the present invention.

FIG. 17 depicts a sheet 1700 of pre-printed labels according to an embodiment of the present invention. As shown in FIG. 17, sheet 1700 comprises ten individual pre-printed labels depicted in FIG. 1C. The number of individual labels on a sheet may vary in alternative embodiments of the present invention. Individual sheets may be serialized for increased security and a unique serial number corresponding to each sheet may be printed on the sheet, e.g., sheet serial number 1731.

As part of configuring the user postage request, the user may be required to enter the unique serial number of the sheet on which the indicium is to be printed. Server system 118 may maintain a list of all available and valid sheet serial numbers and the number of unused labels corresponding to the sheets. After all the labels on a particular sheet have been used, the unique sheet serial number corresponding to the particular sheet may be invalidated by server system 118. In this manner, misuse or fraud can be detected if the sheet serial number received from the user refers to an invalidated sheet serial number. According to an embodiment of the present invention, label serial number 258 printed on each label of a sheet may be the same as sheet serial number 1731. In alternative embodiments, the sheets of labels may be serialized using a first set of numbers, and each of the labels on the sheets may themselves be serialized using a second set of numbers. Serializing both the sheets and the labels provides for increased security.

Figure 1D:
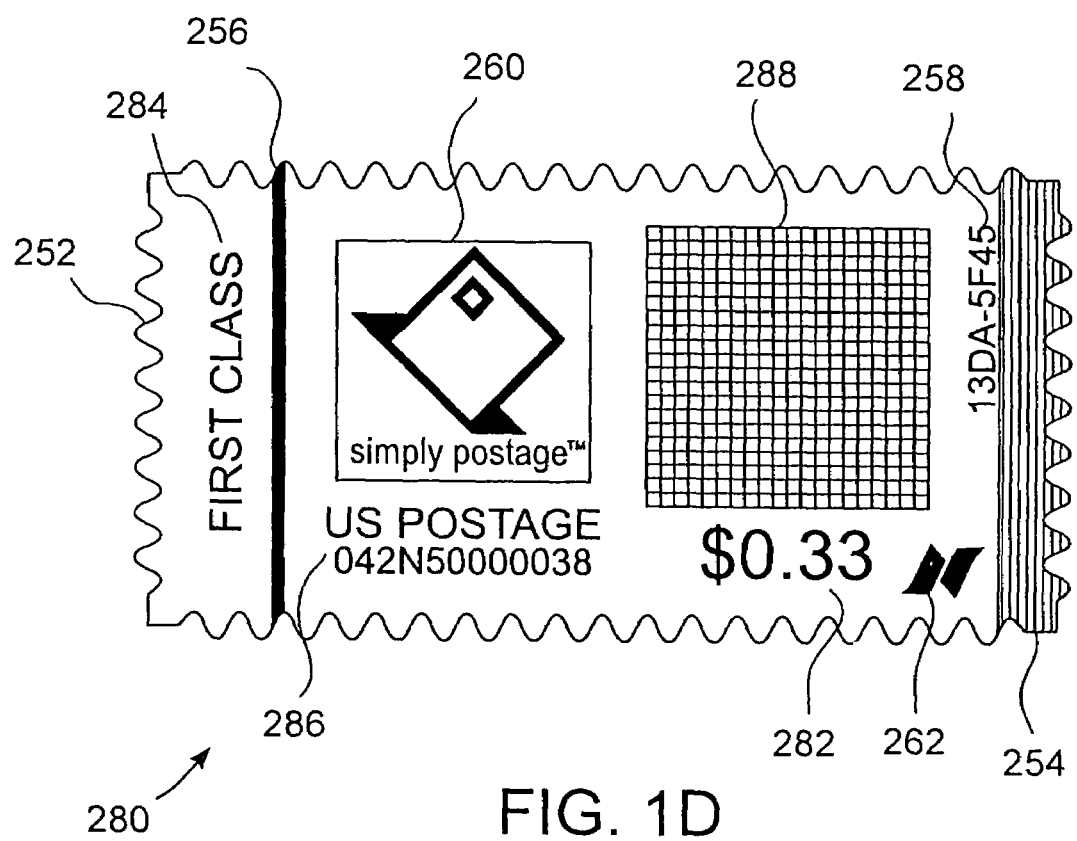
FIG. 1D depicts an individual label with an indicium printed on it according to an embodiment of the present invention.

FIG. 1D depicts an individual label 280 with an indicium printed on it according to an embodiment of the present invention. In addition to features of a blank label. (described above with respect to FIG. 1C), label 280 has an indicium printed on it which may include human readable information and machine readable information. For example, the human readable information of the indicium may include the postage amount or value 282 (e.g., $0.33), the mail class 284 of the postage (e.g., FIRST CLASS), and number 286 (e.g., 042N5DD00038) corresponding to a PSD resource from the pool of PSD resources on server system 118 which was used to generated the information for printing the indicium. Further details related to the use of PSD resources for generating information for printing the indicium are provided in U.S. patent application Ser. No. 09/708,883, entitled "Techniques For Dispensing Postage Using A Communication Network", filed Nov. 7, 2000.

The machine readable portion of the indicium may include a two-dimensional code 288, which may be for example a PDF-417 barcode format, a DataMatrix format, or other format. According to an embodiment of the present invention, two-dimensional code 288 is DataMatrix. The particular contents of the two-dimensional code 288 will be discussed below. According to an embodiment of the present invention, the indicium and the positioning of the indicium on label 280 conform generally to specifications described in the IBIP specifications.

Further details related to the use of security features are discussed in U.S. application Ser. No. 09/611,375 filed Jul. 7, 2000.

Server System 118

Figure 1E:
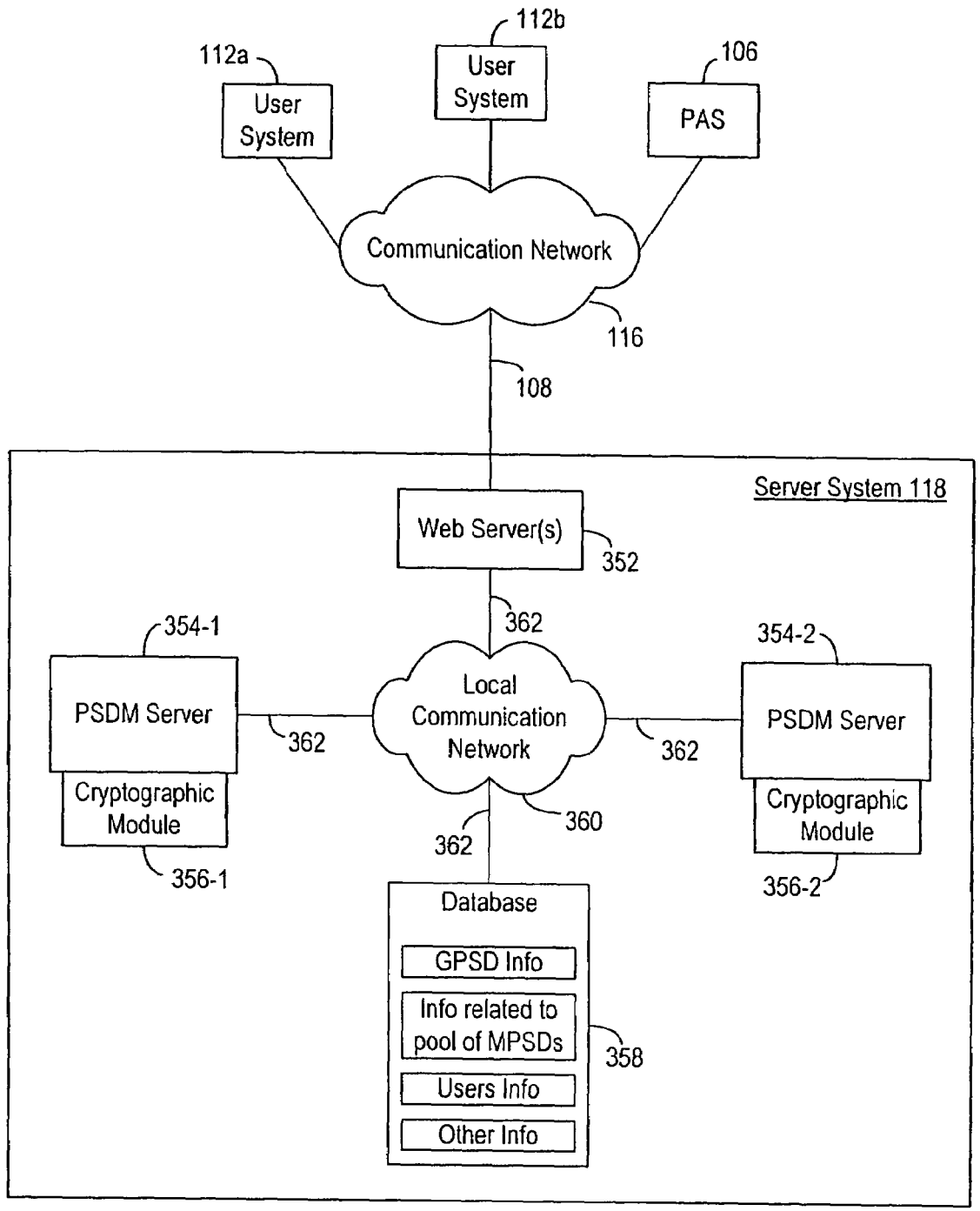
FIG. 1E is an expanded block diagram of a postage vendor system according to an embodiment of the present invention.

FIG. 1E depicts an expanded block diagram of server system 118 according to an embodiment of the present invention. As shown in FIG. 1E, server system 118 may comprise one or more web servers 352, one or more postal security device module (PSDM) servers 354 (with associated cryptographic modules 356), and a database 358 coupled to a local communication network 360 via a plurality of communication links 362. Local communication network 360 provides a mechanism for allowing the various components of server system 118 to communicate and exchange information with each other. Local communication network 360 may itself be comprised of many interconnected computer systems and communication links. Communication links 362 may be hardwire links, optical links, satellite or other wireless communications links, wave propagation links, or any other mechanisms for communication of information. The configuration of server system 118 depicted in FIG. 1E is merely illustrative of an embodiment incorporating the present invention and does not limit the scope of the invention as recited in the claims. One of ordinary skill in the art would recognize other variations, modifications, and alternatives.

Web server 352 may host the postage vendor's web site and store web pages provided by the postage vendor. Web server 352 is responsible for receiving URL requests from user systems 112 and for forwarding web pages corresponding to the URL requests to the requesting user systems 112. As previously stated, these web pages allow a user to interact with server system 118. e.g., to configure a request to purchase postage from server system 118. When user system 112 requests communication with server system 118, web server may be configured to establish a communication link between user system 112 and server system 118. For example, web server 352 may establish a secure Internet socket link. e.g., a SSL 2.0 link, between server system 118 and user system 112. The information communicated between user system 112 and server system 118 may be SSL encrypted using various encryption levels, e.g., 40-bit encryption, 128-bit encryption, and the like. Web server 352 may also incorporate a firewall which shields the internal server system 118 network from communication network 116 and user systems 112 and other resources coupled to communication network 116. According to an embodiment of the present invention, web server 352 is responsible for receiving requests from user systems 112 to purchase stamps and for performing load distribution and fail-over processing associated with the requests. Web server 352 may also be configured to control the downloading of software programs from server system 118 to user system 112.

Each PSDM server 354, in conjunction with one or more cryptographic modules 356 coupled to the PSDM server, is responsible for generating the information for printing the indicium in response to requests to buy postage received from one or more user systems 112. According to an embodiment of the present invention, functions performed by PSDM server 354 include functions performed by a Postal Security Device (PSD) as described in the IBIP specifications published by the USPS. For example, functions performed by PSDM server 354 include initialization and creation of PSD resources, digital signature generation, management of funds related to the postage dispensed by server system 118, generation of information for printing the indicia, key handling, and other functions. PSDM servers 354 are designed to operate in a clustered environment to allow for expandability to meet the needs of a rapidly growing user base. According to an embodiment of the present invention, PSDM server 354 communicates with web server 352 using a DCOM (Microsoft's Distributed Component Object Model) interface.

Each PSDM server 354 may comprise one or more cryptographic modules 356 for performing cryptographic functions and for generating digital signatures. Various keys for performing security-critical functions such as digital signature generation, hashing, encryption, etc. are stored by cryptographic module 356. According to an embodiment of the present invention, cryptographic module 356 is a nCipher nFast/CA module which is validated to FIPS 140-1 Level 3 security.

According to the teachings of the present invention, PSDM server 354 uses PSD resources to generate indicia and to track monetary amounts related to the postage dispensed by server system 118. In order to increase the indicia generation throughput, a plurality of shared PSD resources may be used by PSDM servers 354 to generate the indicia. By using a plurality of PSD resources, multiple PSDM servers 354 can run concurrently, producing indicia in parallel without the bottleneck of sharing a single PSD resource.

According to an embodiment of the present invention, each PSD resource comprises a unique PSD identifier (e.g., a 4-byte identifier), a descending register (DR) value (e.g., a 4-byte value), an ascending register (AR) value (e.g., a 5-byte value), and a control code (e.g., a 20-byte value). The PSD identifier uniquely identifies each PSD resource. The ascending register (AR) value represents the total monetary value of all indicia ever produced by the PSD during its life cycle. The descending register (DR) value indicates the available funds assigned to the PSD resource which may be used to dispense postage.

According to the teachings of the present invention, monetary amounts related to the postage dispensed by server system 118 are tracked using a global PSD (GPSD) resource and a pool of PSD resources referred to as mini-PSDs (or MPSDs). According to an embodiment of the present invention, eight MPSD resources may be used by a single cryptographic module 356 associated with PSDM server 354 to concurrently generate information for printing indicia. The sum of the AR value and the DR value of the GPSD represents the total amount of postage bought from the postal authority, for example, from the USPS, by the postage vendor provider (e.g., Neopost) of server system 118. The sum totals of the AR and DR values of the MPSD resources matches the AR and DR values of the GPSD resource. Information related to the GPSD resource and MPSD resources may be stored in database 358.

According to an embodiment of the present invention, each MPSD resource may be assigned a unique number by the postage vendor. A number assigned to a particular MPSD may be included in the information for printing an indicium generated by the particular MPSD and printed as part of the indicium. For example, the number "042N50000051" (reference 286 in FIG. 1D) uniquely identifies the MPSD resource which was used for generating the information for printing the indicium depicted in FIG. 1D. This MPSD serial number is like a meter number and may be used to track the MPSD resource responsible for generating information for printing the indicium. A unique certificate number assigned by a postal authority may also be assigned to each MPSD uniquely identifying the MPSD.

Database 358 acts as a repository for storing information related to the postage dispensing process. For example, database 358 may store information related to the PSD resources (both GPSD and MPSDs), information used for generation of digital signatures, and other like information. Database 358 may also store information about users who have purchased postage from server system 118. Information related to users who have registered with server system 118, e.g., user account information, user preferences information, etc. may also be stored by database 358. Database 358 may also store the postal license number assigned to server system 118 by the postal authority. Other information related to the dispensing of postage may also be stored by database 358. The term "database" as used in this application may refer to a single database or to a plurality of databases coupled to local communication network 360. Further, database 358 may be a relational database, an object-oriented database, a flat file, or any other way of storing information. According to an embodiment, database 358 is coupled to web server 352 and to PSDM server 354 via an ODBC interface. In some embodiments, the database 358 may include database 132 of FIG. 1A.

Also shown in FIG. 1E is a postal authority system (PAS) 106. PAS may comprise one or more computer systems managed by a postal authority authorized to regulate and control all postal matters. Examples of postal authorities include the United States Postal Service (USPS), France's La Poste, UK's Royal Mail, and others. In most instances, the postal authority is a governmental or quasi-governmental agency authorized to oversee postal matters. PAS 106 may be coupled to server system 118 via communication network 116 or directly via some other communication link 108. The information exchanged between server system 118 and PAS 106 may include finance information, information required by the postal authority for audit purposes, status information, security information, and other like information. The information required by the postal authority for audit purposes may include information identifying the postage buyers, the postage value and amount purchased by the buyers, and other information. Server system 118 may be configured to download information to PAS 106 on a periodic basis using batch processing, or upon the occurrence of certain events. Server system 118 may also be configured to purchase postage from PAS 106.

Operation of the embodiment shown in FIG. 1E will now be briefly described. Processing is generally initiated when a user using a user computer 112 accesses a web page provided by server system 118. Such requests are generally received by web server 352 which responds by transmitting the requested web pages to requesting user computer 112. As part of the communication, web server 352 may establish a SSL connection with user computer 112. Web server 352 may also download a software program, such as print.dll, to user computer 112.

Web server 352 may receive a request to purchase postage from the user computer 112, and may validate this purchase request. Numerous validation checks may be performed, such as, for example, validating credit card information, user identity, serial numbers, etc.

If the validation checks were successful, web server 352 then, based on the purchase request, determines the number of stamps for which information for printing the indicium have to be generated and the tasks for generating the information are allocated to one or more PSDM servers 354. In this manner, web server 352 distributes the indicium related information generation work load among PSDM servers 354 coupled to local communication network 360. Web server 352 may use different allocation schemes/algorithms to distribute the work among PSDM servers 354.

One or more PSDM servers 354 then generate the information for printing the requested indicium (or indicia). The information for printing an indicium includes a digital signature signed by cryptographic module 356 coupled to PSDM server 354.

Then, the information for printing an indicium is forwarded by PSDM server 354 to web server 352. Web server 352 then communicates the information for printing an indicium to requesting user computer 112. According to an embodiment of the present invention, a bitmap or a graphical image representing the indicium may be included in the information for printing the indicium. According to another embodiment of the present invention, indicium data or a data structure comprising information representing the indicium may be included in the information for printing the indicium. According to yet another embodiment of the present invention, a data structure in XML format may be included, an example of which will be described below.

Further details of the embodiment shown if FIG. 1E are described in U.S. patent application Ser. No. 09/708,883, entitled "Techniques For Dispensing Postage Using A Communication Network", filed Nov. 7, 2000.

Purchasing and Printing Postage

Figure 2:
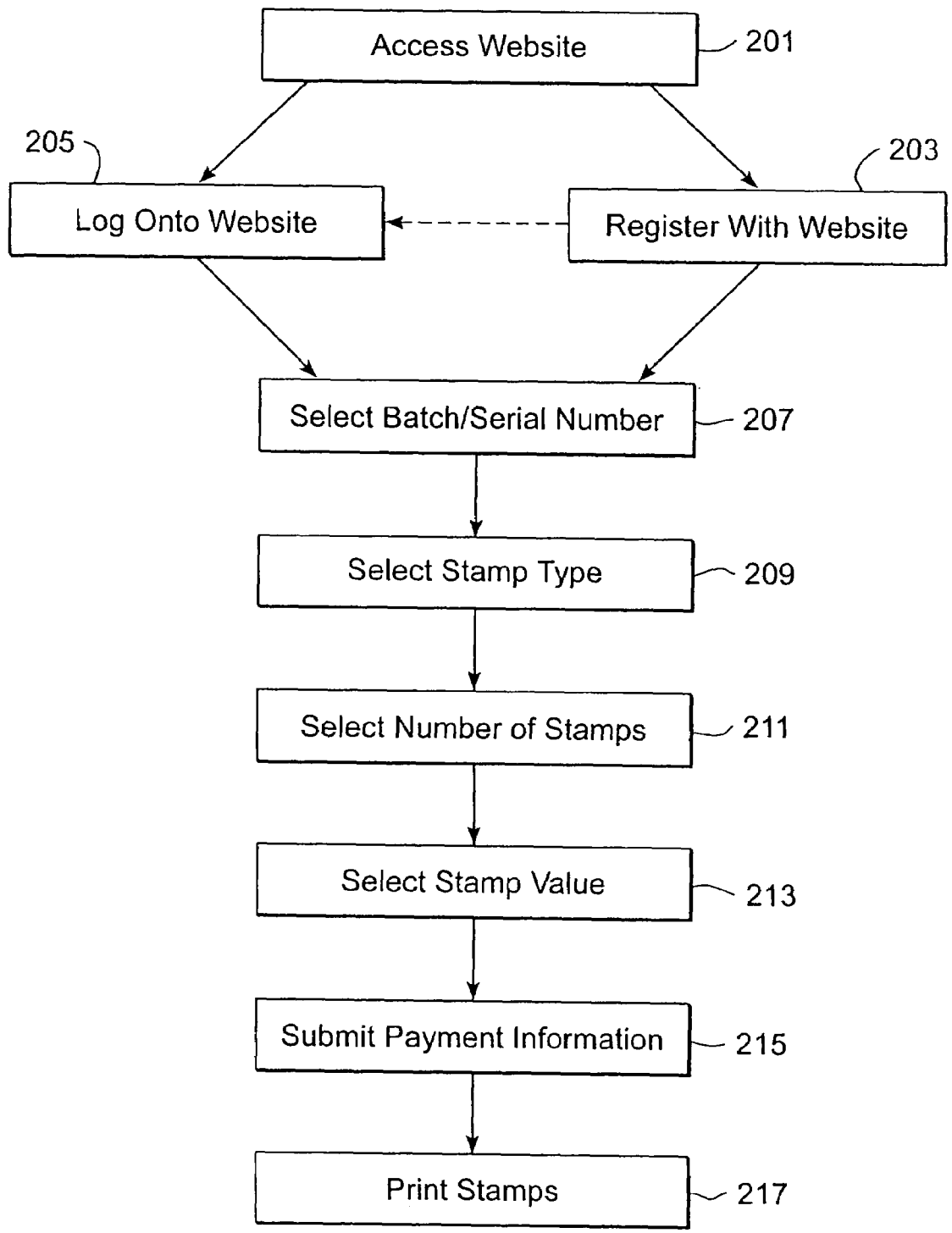
FIG. 2 is a simplified flow diagram of a method of purchasing postage according to one embodiment of the invention.

FIG. 2 is a simplified flow diagram of a method according to an embodiment of the invention, and will be discussed with reference to FIG. 1A. In the present embodiment, the user computer 112 accesses a website maintained by server system 118 using a browser in a step 201. Typically, a user performs this action by typing in the name or a portion of the name of web server 120 in an address box of the browser using, for example, a keyboard. The user may also directly type in the IP address of web server 120. Alternatively, the user may have previously bookmarked the home page, thus the user simply selects the bookmark from the user's list of bookmarks, using, for example, a mouse. In yet another embodiment, the user may select a link for web server 120 that is located on a third party web page. For example, the third party web page may be a results screen from a web search engine, the third party web page may be a page with an advertisement banner and a link to web server 120, the third party web page may be a strategic partner, and the like. In one embodiment, a home page of the website is transmitted to the user computer 112a and displayed using the browser upon accessing the website.

If the user has not previously created an account with the website, the user may proceed to register with the website in a step 203. When the user registers with the website, an account may be created with the website in any number of ways known to those skilled in the art. In one embodiment, the user may select a register link on the home page. Then, the web server 120 prompts the user to transmit registration information to the web server 120 via a registration web page, or the like, which the web server 120 may transmit to the user computer 112a. The registration web page prompts the user for various information, such as personal information, contact information, payment information, and the like. The personal information may include a first and last name. The contact information may include a telephone number, an e-mail address, a postal address, and the like. The payment information may include credit card information, debit card information, smart card information, and the like. The registration web page may also prompt the user to enter a user ID and a password chosen by the user. After entering information into, for example, a registration web page, the information is transmitted to the web server 120 in a manner well known to those skilled in the art. For example, the information may be transmitted via a SSL connection.

Upon receiving the information, the server system 118 creates an account for the user in any of various ways known to those skilled in the art. In the future, the user is identified by the web server 120 using, for example, a user ID and a password. In one embodiment, the user is identified by the web server 120 using an e-mail address and a password supplied by the user as discussed above. In another embodiment, the user is identified by the web server 120 using a user ID and a password supplied by the user as discussed above.

In another embodiment, the server system 118 may generate for the user the user ID, the password, or both. In this embodiment, the generated user ID and/or generated password may be transmitted to the user via the e-mail address, postal mail address, telephone number, or the like, provided by the user in the registration information.

In yet another embodiment, the server system 118 e-mails to the user an account activation link using the e-mail address supplied by the user. Upon receiving the e-mailed activation link from the web server 120, the user selects the link using, for example, a mouse coupled with the user computer 112a. Upon selecting the link, a string is transmitted to the web server 120 in a manner well known to those skilled in the art. Upon receiving the transmitted string, the web server 120 identifies the user's account and activates and/or unlocks the user's account in a manner well known to those skilled in the art.

Upon registering, the web server 120 may log the newly registered user onto the website. In another embodiment, the newly registered user must log onto the website.

If the user has previously registered with the website, the user may elect to log onto the website in a step 205. In one embodiment, the user logs on by selecting a login link, or the like, on the website. Then, the web server 120 prompts the user to transmit login information to the web server 120. In one embodiment, the web server 120 may transmit to the user computer 112a a login web page that prompts the user for a user ID, a password, and the like. After entering the prompted login information, the login information is transmitted to the web server 120 in a manner well known to those skilled in the art. If the submitted logon information is valid, the web server 120 logs the user onto the website in any of various ways known to those skilled in the art.

Having logged onto the website, the user may proceed with printing one or more stamps. In order to proceed with printing a stamp or stamps, the user must first select a sheet serial number, roll serial number, or label serial number corresponding to a label on which to print a postage mark (step 207). In one embodiment, a web page form is transmitted to the user computer 112a prompting the user to enter a label serial number, or the like. The user then enters a label serial number, or the like into the form and the serial number is transmitted to the web server 120. For example, the user may type in the sheet serial number using a keyboard or keypad. Additionally, the user may enter the serial number using, for example, a pen scanner or the like. Also, if the serial number is provided in a bar code or the like, the user may enter the serial number by scanning the bar code with a bar code scanner or the like.

In some embodiments, the user is prompted to optionally select from serial numbers associated with the user (e.g., previously entered by the user). In this embodiment, the web server 120 may transmit to the user computer 112a a web page, or the like, that permits the user to select from serial numbers associated with the user.

In one embodiment, the user may enter a sheet or roll serial number into a web page form that is transmitted by the server system 118 to the user computer 112a and that prompts the user for a serial number. The user may enter the sheet or roll serial number, and it is then transmitted to the server system 118. Upon receiving the sheet or roll serial number, the server system may identify the label serial numbers of the labels associated with the sheet or roll serial number. Those serial numbers may then be added to a list of serial numbers associated with the user. Similarly, in another embodiment, the user may enter a package serial number of a package of labels, sheets, or rolls into a web page form that is transmitted by the server system 118 to the user computer 112a. The package serial number is then transmitted to the server system 118. Upon receiving the package serial number, the server system 118 may then identify the serial numbers of label sheets, label rolls, or labels within the package identified by the package serial number. Those serial numbers may then be added to a list of serial numbers associated with the user. In these embodiments, the serial numbers may be included in the web page, or the like, discussed above that permits the user to select from serial numbers associated with the user. In this way, the user need only enter one serial number (e.g., the package serial number) rather than all the individual serial numbers of the label sheets, or the like, within the package.

In still another embodiment, if the user purchases a package of label sheets or label rolls via the website, the server system 118 may, upon the purchase, identify the serial numbers of the label sheets within the package (e.g., using the package serial number) and add those serial numbers to the list of those already associated with the user. Thus, these serial numbers may be included in the web page, or the like, discussed above that permits the user to select from serial numbers associated with the user. In this way, the user need not enter any of the serial numbers of the labels, label sheets, or label rolls within the package, nor a serial number of the package.

Because each label sheet, roll, or the like, may be uniquely identified by a serial number, the server system 118 may keep track of the number of labels available on a particular label sheet, roll or the like, and/or the number of labels on that label sheet or roll printed by the user. Hence, in yet another embodiment, when the server system 118 determines that no labels are left on a particular label sheet or roll, the server system 118 may invalidate that sheet or roll serial number and remove the sheet or roll serial number from the list of those associated with the user. Thus, these serial numbers would be removed from the web page, or the like, discussed above that permits the user to select from serial numbers associated with the user.

Upon receiving the serial number selected in step 207, the server system 118 may check the validity of the selected serial number as previously described.

In a step 209, the user may select a stamp type. The types of stamps available may include, for example, first class, first class oversize, post card, standard B (parcel post), priority, express mail, and the like. In one embodiment, a web page form is transmitted to the user computer 112a prompting the user to select a stamp type. The user then selects a stamp type, and the selected stamp type is transmitted to the web server 120 in a manner well known to those skilled in the art.

In yet another embodiment, the user is not provided a choice of stamp types. Rather, the website offers only one stamp type such as, for example, first class stamps.

In a step 211, the user may select a number of stamps to print. In one embodiment, a web page form is transmitted to the user computer 112a prompting the user to select a number of stamps to print. After a number of stamps to print is selected, the number is transmitted back to the web server 120 in a manner well known to those skilled in the art. The server system 118 may limit the user's choice of the number of stamps to print. In one embodiment, the server system 118 limits the number of stamps that a user may choose to print to a known number of labels in a label sheet, label roll, or the like. In another embodiment, the server system 118 may limit the number of stamps that a user may choose to print to the known number of labels left in a particular label sheet, label roll, or the like. As described above, because label sheets, label rolls, and the like, may have unique sheet serial numbers, label serial numbers, and the like, the server system 118 may track how many labels are left on a particular label sheet, label roll, or the like. Thus, the server system 118 may, for example, refuse the user the choice of printing a number of labels for a particular label sheet if that number exceeds the number of labels that the server system 118 determines are remaining on that particular label sheet.

In another embodiment, the user is not provided a choice of a number of stamps to print. For example, the website may only permit the user to print one stamp at a time. In another example, the website may only permit the user to print a full sheet of labels.

In a step 213, the user may select a stamp value. In one embodiment, a web page form is transmitted to the user computer 112a prompting the user to select a stamp value. The user then selects a stamp value, and the selected stamp value is transmitted to the web server 120 in a manner well known to those skilled in the art. In another embodiment, a user can choose a stamp value from fixed denominations using, for example, a pull-down menu, buttons, or the like. In yet another embodiment, the website may permit the user to enter a stamp value for some stamp types, and offer a choice of fixed denominations for other stamp types. In still another embodiment, a stamp value may be selected in conjunction with the use of a scale (e.g., scale 136). For example, the user may place a letter or package on the scale 136 and a stamp value is chosen based upon the weight of the letter or package and an appropriate postal rate.

In a step 215, the user is prompted to submit payment information. In one embodiment, the web server 120 prompts the user via a web page for payment information upon every request to print a stamp or stamps. In another embodiment, the server system 118 prompts the user for payment information each time the user logs into the website. In yet another embodiment, payment information need not be submitted each time stamps are printed or each time the user logs into the website. Rather, payment information is submitted only during the registration step 203 in FIG. 2. In this way, the user need not repeatedly enter payment information. Additionally, the user may update the payment information via the website at a time subsequent to the registration step 203, for example, if the user wishes to change the method of payment.

Then, in a step 217 the user prints the stamp or stamps using, e.g., the computer 112*a* and the printer 114*a*. In one embodiment, the user is prompted with a web page, window, or the like, to insert the label sheet corresponding to the sheet serial number selected in step 207 into the printer 114*a*. Then, the user is prompted to select a button, link, or the like, to initiate the printing of the stamp or stamps onto the label sheet.

FIG. 2 is merely an illustration which should not limit the scope of the claims herein. One skilled in the art would recognize many other variations, modifications, and alternatives. For example, a user may elect to prefund his/her account and have postage purchases debited from the prefunded account, rather than have a credit card, or the like, charged for each postage purchase. Postage purchases that exceed the amount in the account may be refused. Also, in some embodiments, a user is not required to register with the website in order to purchase postage. Rather, a transaction with the server system 118 may be treated as one-time transaction. Additionally, although these embodiments were described in the context of postage stamps, the present invention may be used with other types of value indicium. For example, in other embodiments, a tax stamp, a hunting/fishing license stamp, a ticket, a driver's license, a trading stamp (e.g., green stamp), or any other item of monetary value may be purchased and printed according to the invention. Further, although these embodiments were described in the context of printing value indicia to labels, the indicia may be printed to other types of printable media as well, e.g., envelopes, post cards, etc.

Various embodiments of the flow of FIG. 2 will now be described.

Accessing Website

Figure 3:
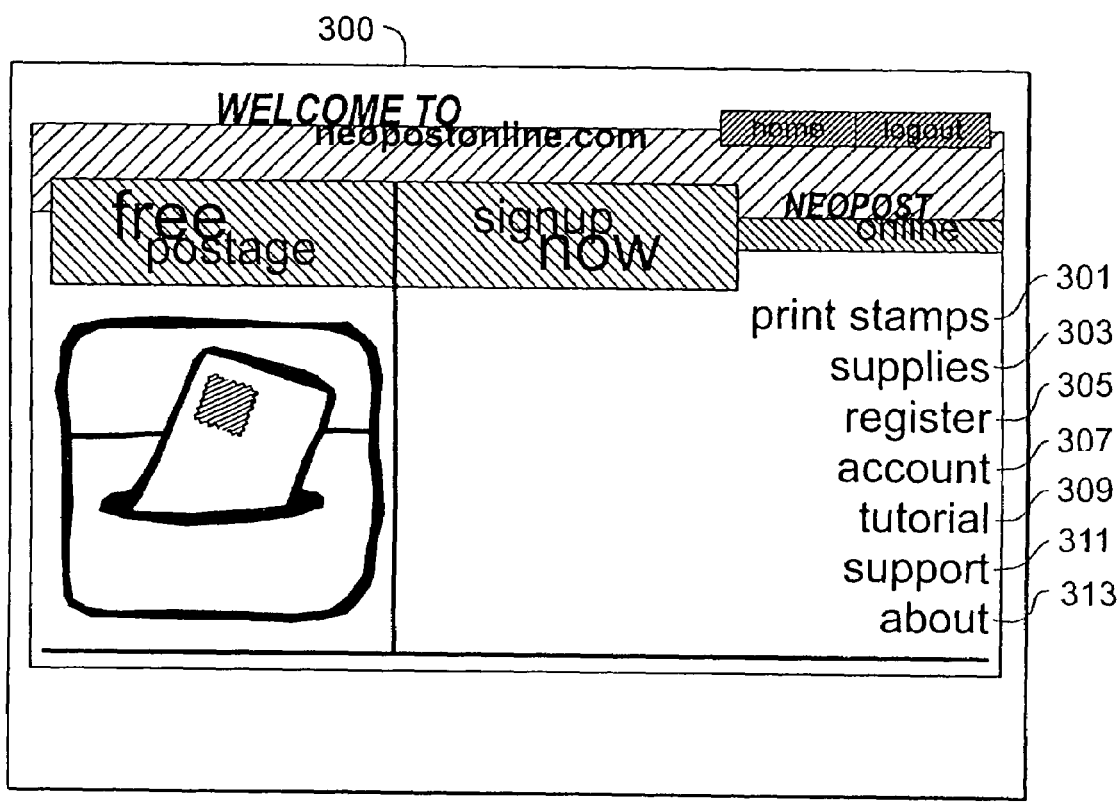
FIG. 3 is an example of a home page of a website.

FIG. 3 illustrates one embodiment of a home page that the web server 120 may transmit to the user computer 112*a* upon the user accessing the website. The home page 300 includes links 301, 303, 305, 307, 309, 311, and 313 to other areas of the website. A user may select a link using, for example, a mouse, a keypad, a touch screen, or the like. Upon selecting a link, the user is directed to another area of the website in a manner well known to those skilled in the art. For example, the user may select the link 305 in order to register with the website (step 203).

Registering With the Website

Figure 4:
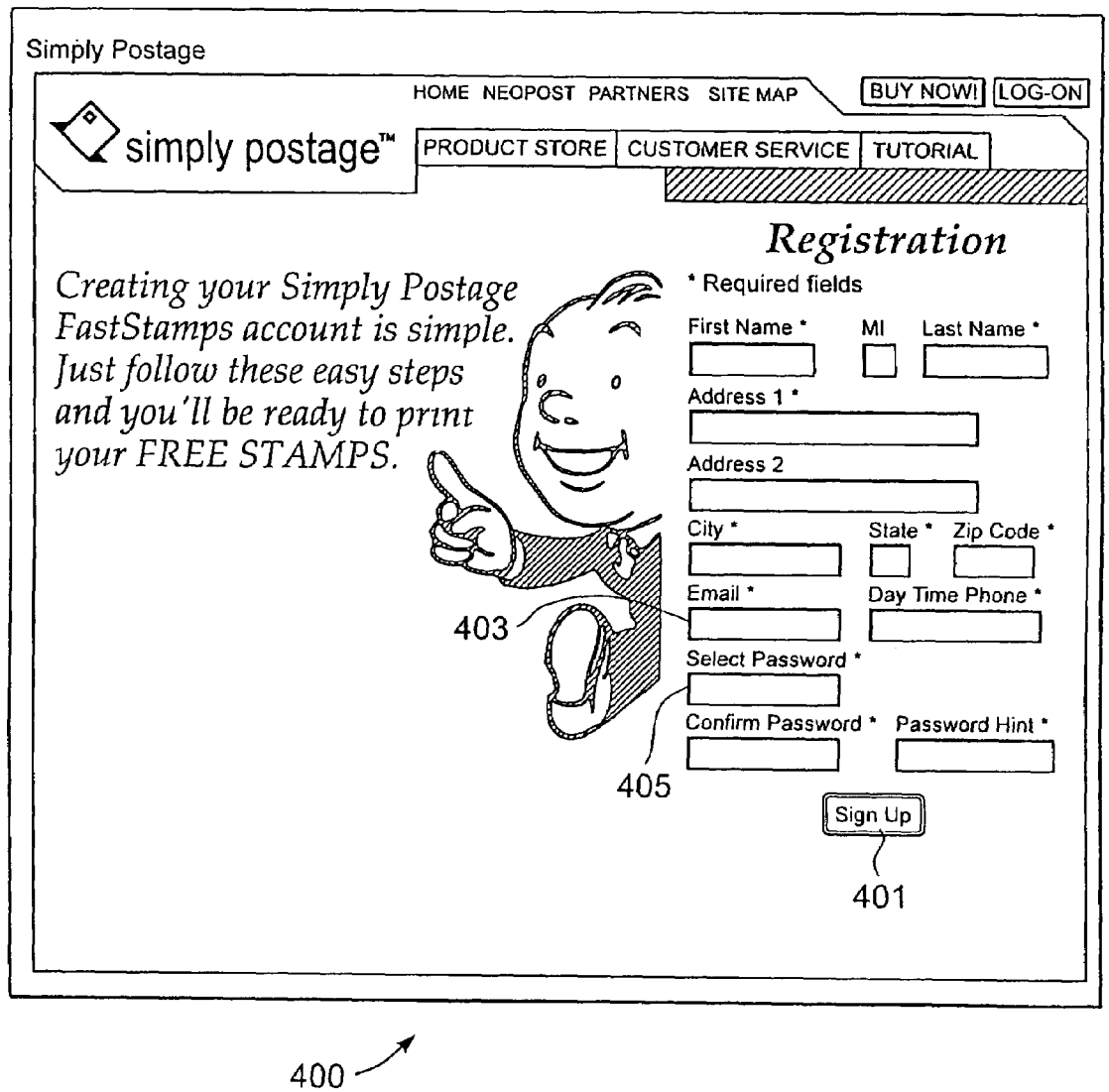
FIG. 4 is an example of a web page for registering with a website.
Figure 5:
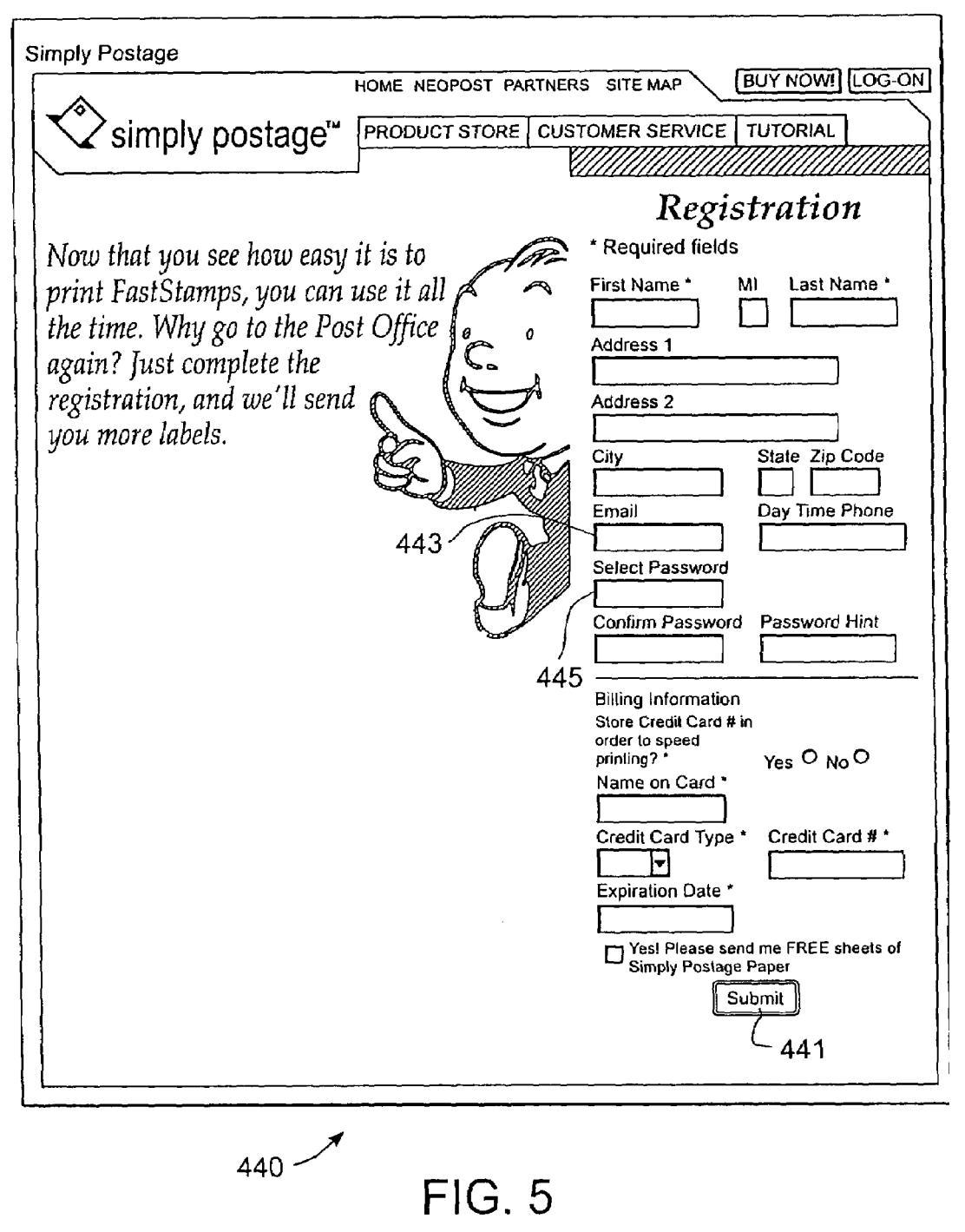
Figure 6:
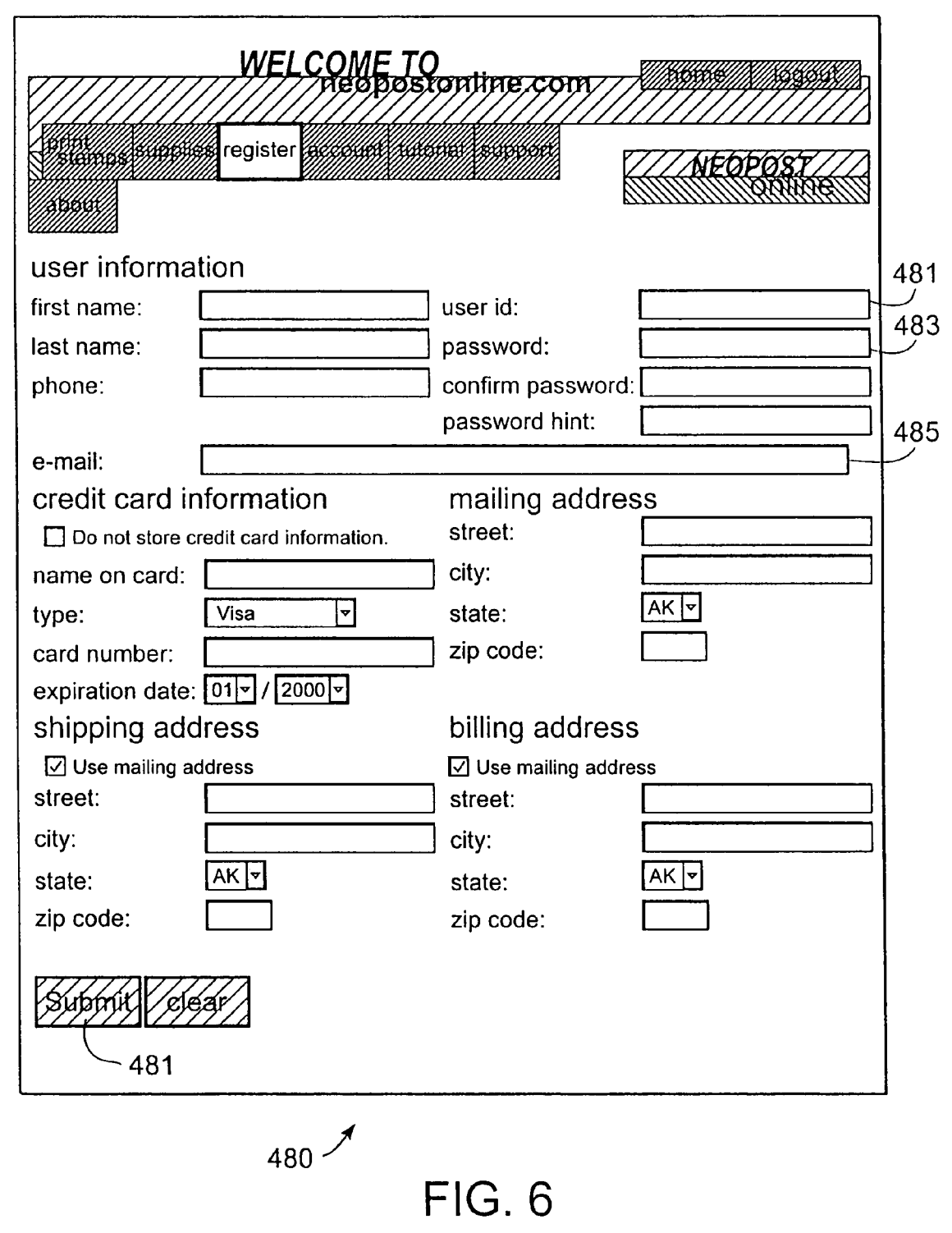

FIG. 4 illustrates one embodiment of a registration web page for registering with the website. The registration web page 400 shown in FIG. 4 does not prompt the user for payment information such as credit card information. Once the user has entered the requested information, the user may transmit the registration information to the web server 120 by selecting the "Sign Up" button 401. The information is then transmitted to the web server 120 in a manner well known to those skilled in the art. FIG. 5 illustrates another embodiment of a registration web page. Unlike the registration web page 400 of FIG. 4, the registration web page 440 of FIG. 5 requests credit card information from the user. FIG. 6 illustrates yet another embodiment of a registration web page. The user may initiate the transmission of the registration information to the web server 120 by selecting the buttons 401, 441, or 481 of respective registration web pages 400, 440, and 481.

Logging Onto the Website

Figure 7:
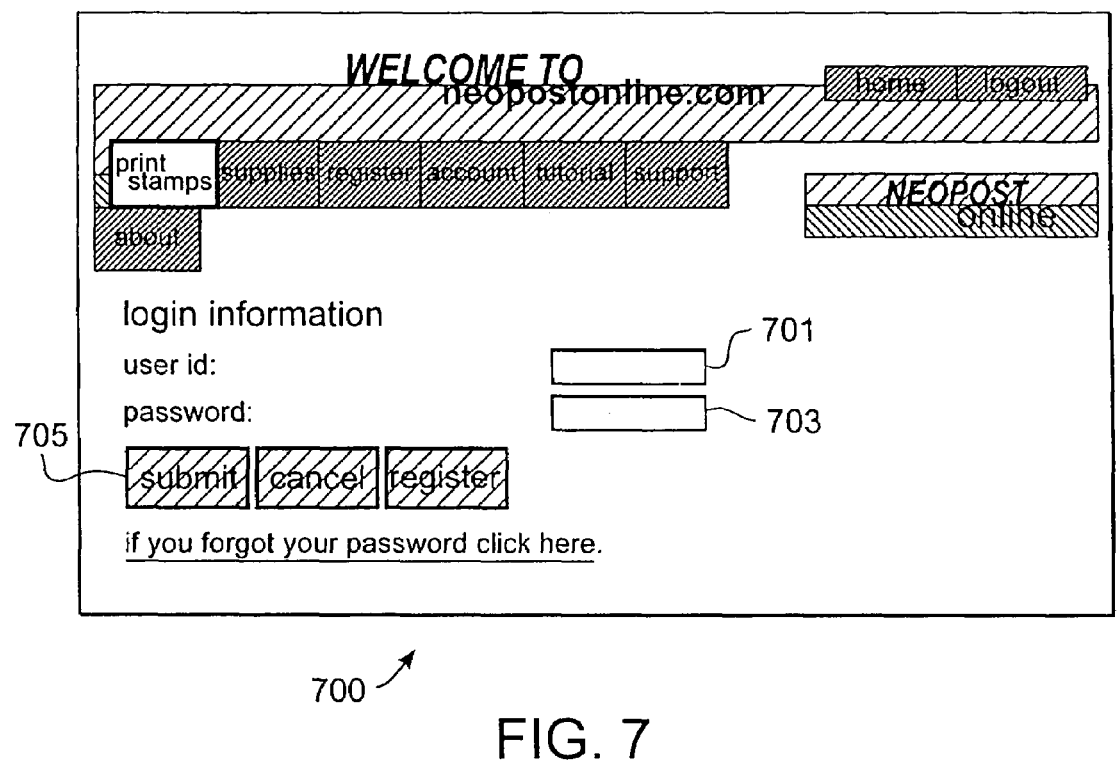
FIG. 7 is an example of a web page for login into a website.
Figure 8:
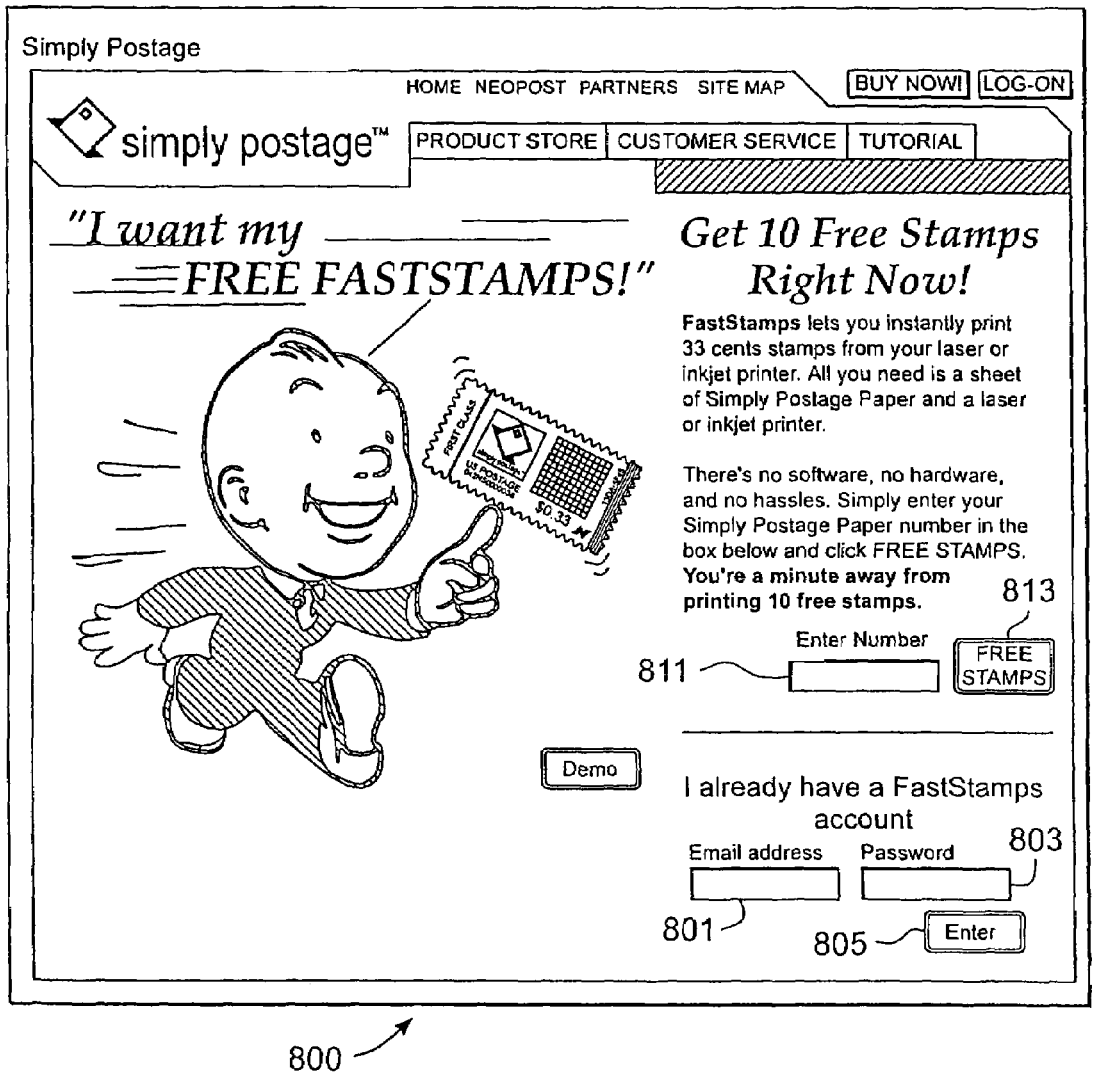
FIG. 8 is an example of a web page for entering a serial number.

FIG. 7 illustrates one embodiment of a login web page 700. The login web page 700 may be accessed by, for example, selecting the link 301 on home page 300 of FIG. 3. The web page 700 prompts the user for a user ID and a password in boxes 701 and 703, respectively. FIG. 8 illustrates another embodiment of a web page for logging onto a website. In particular, FIG. 8 illustrates a web page 800 that prompts the user to enter an e-mail address and a password in boxes 801 and 803, respectively. After entering the prompted login information, the login information is transmitted to the web server 120 in a manner well known to those skilled in the art. For example, the user may select button 705 of web page 700 or button 805 of web page 800. If the submitted logon information is valid, the server system 118 logs the user onto the website in any of various ways known to those skilled in the art.

Selecting Serial Number

Figure 9:
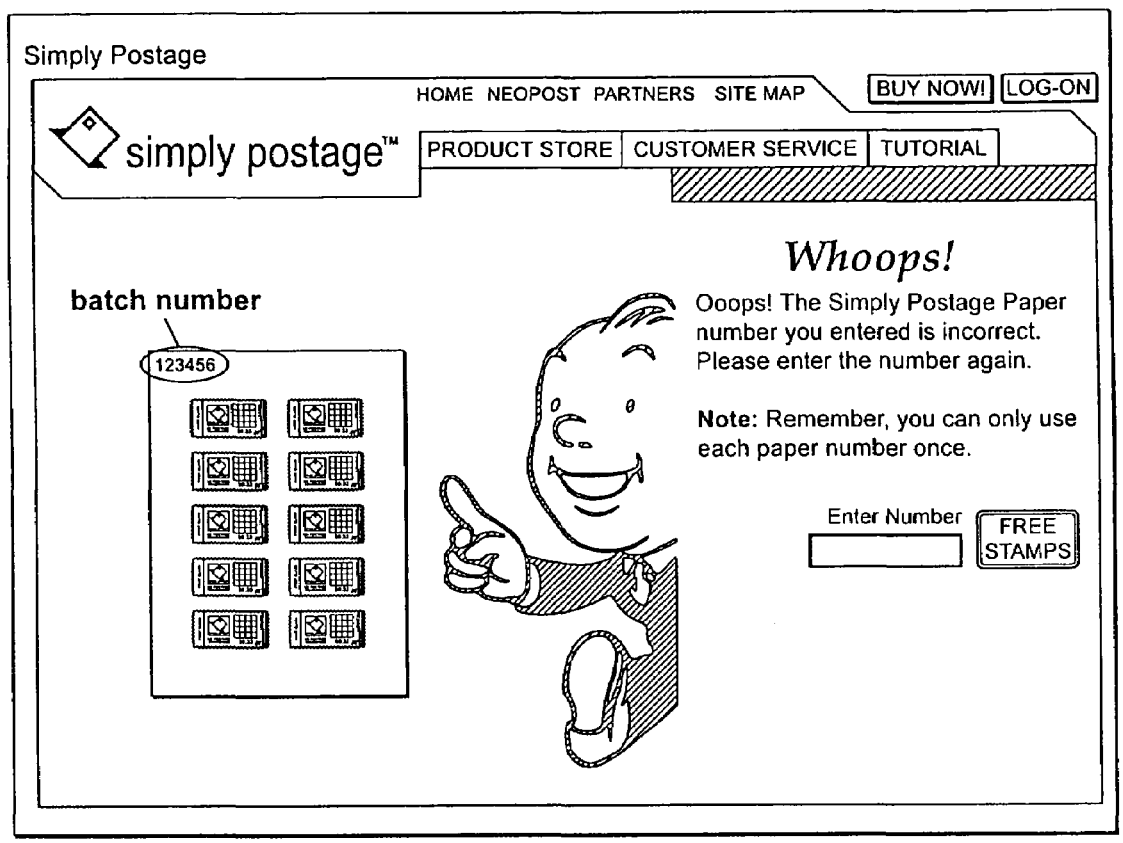
FIG. 9 is an example of a web page that notifies a user that a serial number is not valid.

FIG. 8 illustrates an embodiment of a web page for entering a serial number. In particular, the user may enter the serial number in the box 811. After entering the serial number, the user may select the button 813 to transmit the entered serial number to the web server 120 in a manner well known to those skilled in the art. Upon receiving the serial number, the server system 118 verifies that the transmitted serial number is a valid serial number. If the transmitted serial number is not a valid serial number, the web server 120 may transmit a notification to the user computer 112*a* that the serial number is not valid. FIG. 9 illustrates an embodiment of a web page that notifies the user that the transmitted serial number is not valid.

FIG. 10 illustrates another embodiment of a web page that permits a user to enter a serial number. In the web page 1000, the user may enter the serial number in a method similar to that described with respect to FIG. 8. In particular, the user may enter the serial number into box a 1001 and then select a button 1003 to transmit the entered serial number to the web server 120. If the entered serial number is determined to be a valid serial number by the server system 118, a web page similar to web page 1000 is transmitted back to the user computer 112*a* and displayed with the browser. This web page displays the entered serial number in box a 1005.

Figure 11:
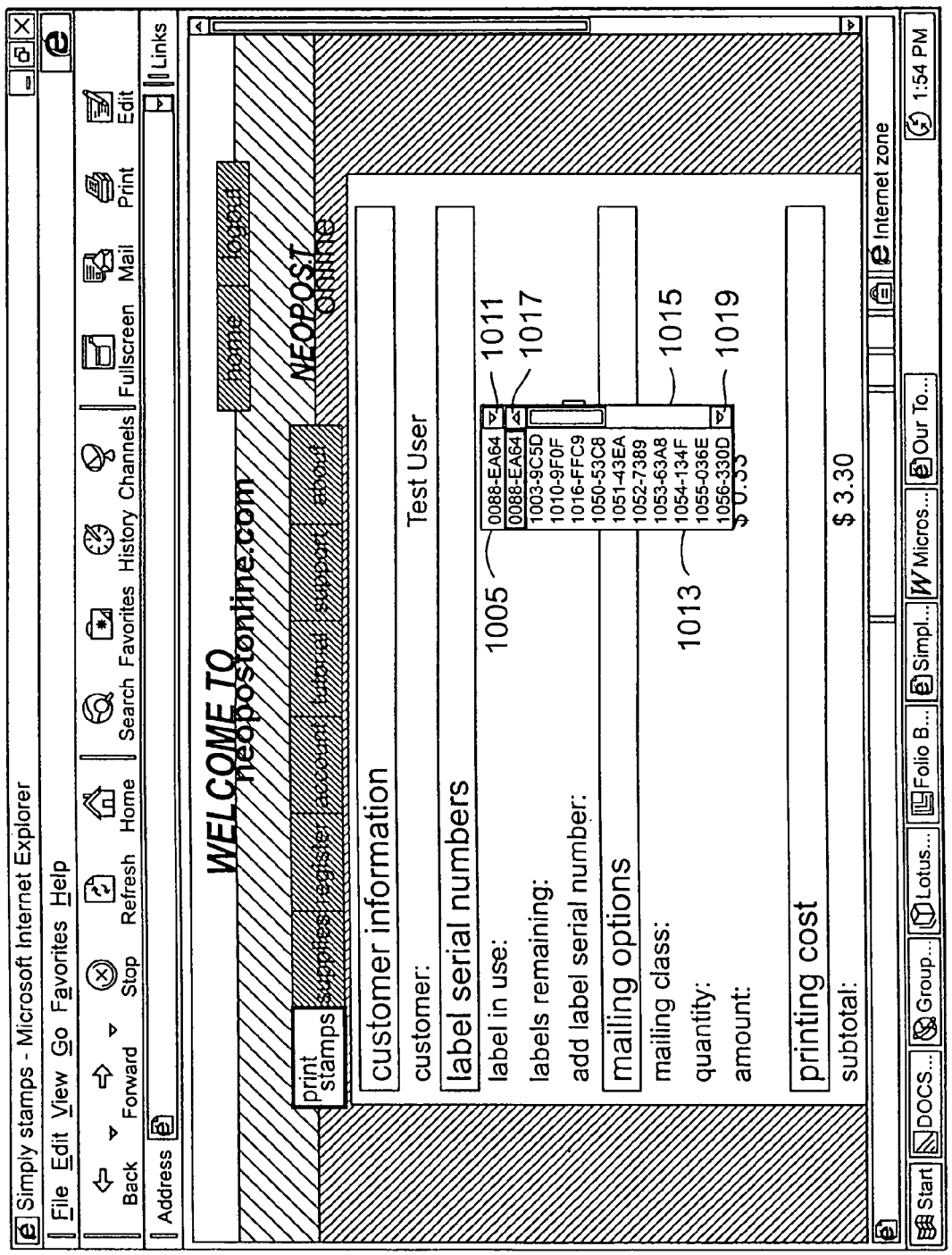
FIG. 11 illustrates a web page with a pull-down menu for selecting a serial number.

Additionally, the user may select from one or more serial numbers associated with (e.g., previously entered by) the user using a pull-down button 1011. FIG. 11 illustrates a pull-down menu 1013 that is displayed after the user selects the pull-down button 1011. The pull-down menu 1013 lists serial numbers associated with the user. The user may scroll through the pull-down menu 1013 and select a serial number. In one embodiment, when a serial number in the pull-down menu 1013 is selected by the user, the selected serial number is transmitted to the server system 118. Then, the server system 118 transmits a web page similar to web page 1000 to the user computer 112a, which displays the updated web page 1000 with the browser. This updated web page displays the selected serial number in box 1005. In another embodiment, when a serial number in the scroll down menu 1013 is selected by the user, the selected serial number is displayed in box 1005. Then, when the user selects the button 1021 (FIG. 10), the selected serial number is transmitted to the web server 120.

Selecting Stamp Type

Figure 12:
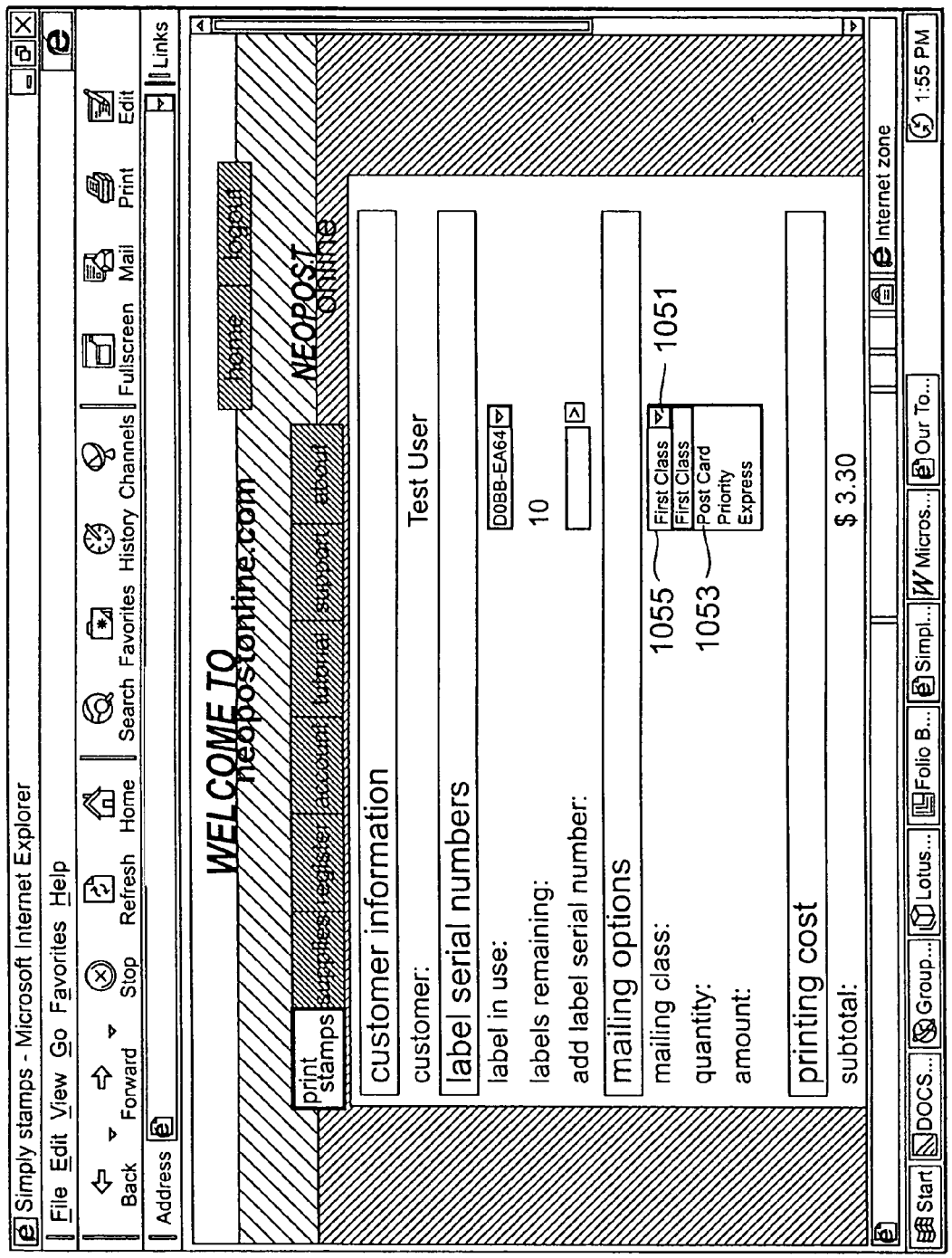
FIG. 12 illustrates a web page with a pull-down menu for selecting a stamp type.

FIG. 10 illustrates an embodiment of a web page for selecting a stamp type. In particular, the user may select the stamp type from a pull-down menu, or the like, in the web page 1000. The user may select the button 1051 to view the selections in the pull-down menu. FIG. 12 illustrates a pull-down menu 1053 that is displayed after the user selects the pull-down button 1051. The pull-down menu 1053 lists stamp types that may be selected by the user. The user may scroll through the pull-down menu 1053 and select a stamp type. In one embodiment, when a stamp type in the pull-down menu 1053 is selected by the user, the selected stamp type is transmitted to the server system 118. Then, the web server 120 transmits a web page similar to web page 1000 to the user computer 112a, which displays an updated web page 1000 with the browser. This updated web page displays the selected stamp type in box 1055. In another embodiment, when a stamp type in the scroll down menu 1053 is selected by the user, the selected stamp type is displayed in box 1055. Then, when the user selects the button 1021 (FIG. 10), the selected stamp type is transmitted to the web server 120.

Selecting Number of Stamps to Print

In one embodiment, a web page form similar to the web page illustrated in FIG. 10 includes a box into which the user may enter in a number of stamps to print. After that number is transmitted to the web server 120, the server system 118 may compare the transmitted number to a limit on the number of stamps the user may print as discussed previously. To assist the user, the web page prompting the user to enter a number of stamps to print may include, for example, the number of labels that the server system 118 calculates are remaining on the particular label sheet. If the transmitted number is within the limit, the number is accepted by the server system for further processing. If the number is above the limit, the web server 120 may transmit to the user computer 112a a web page that notifies the user that the number of stamps selected by the user was not accepted by the server system 118. In another embodiment, the user may select a number of stamps to print from a pull-down menu. The numbers of stamps to print available in the pull-down menu may reflect only those numbers acceptable by the server systems 118. The user then selects a number of stamps to print from the pull-down menu. The selected number is then transmitted to the web server 120 in a manner well known to those skilled in the art.

Selecting a Stamp Value

FIG. 13A illustrates an embodiment of a web page for selecting a stamp value. The web page 1300 is similar to the web page 1000 illustrated in FIG. 10, but includes a box 1301 into which the user may enter a stamp value amount. After entering a stamp value, the user may select the link "calculate cost" 1303 to transmit the entered stamp value to the web server 120 in a manner well known to those skilled in the art. Upon receiving the transmitted stamp value, the server system 118 may calculate a total cost to the user by, for example, multiplying the number of stamps to be printed by the chosen stamp value, and adding a fee. In another embodiment, the web page may include functionality (e.g., ActiveX Controls, Java, etc.) for calculating and displaying a total cost to the user.

FIG. 13A illustrates a web page 1300 that displays to the user a calculation of the user's cost of printing stamps. In particular, the web page 1300 shows the number of stamps to print, labeled 1305. A subtotal, labeled 1307, is calculated and illustrated. Also, a fee, labeled 1309, is displayed. Additionally, the total cost to the user, labeled 1311, is shown. In another embodiment, when a stamp value is selected by the user, the selected stamp value is displayed in box 1305. Then, when the user selects the button 1021, the selected stamp value is transmitted to the web server 120 in a manner well known to those skilled in the art.

As previously discussed, a user computer 112 may be coupled with a scale 136. The web server 120 may prompt the user to indicate if the user wishes to use a scale to determine a stamp value. For example, the web server 120 may transmit to the user computer 112 a web page including a link, button, or the like that the user may select if the user wishes to use a postal scale. In one embodiment, if the user selects the link, the server system 118 transmits to the user computer 112 a scale control program to be run on the user computer 112. The scale control program may be transmitted to the user computer 112 using any number of methods known to those skilled in the art.

Figure 13B:
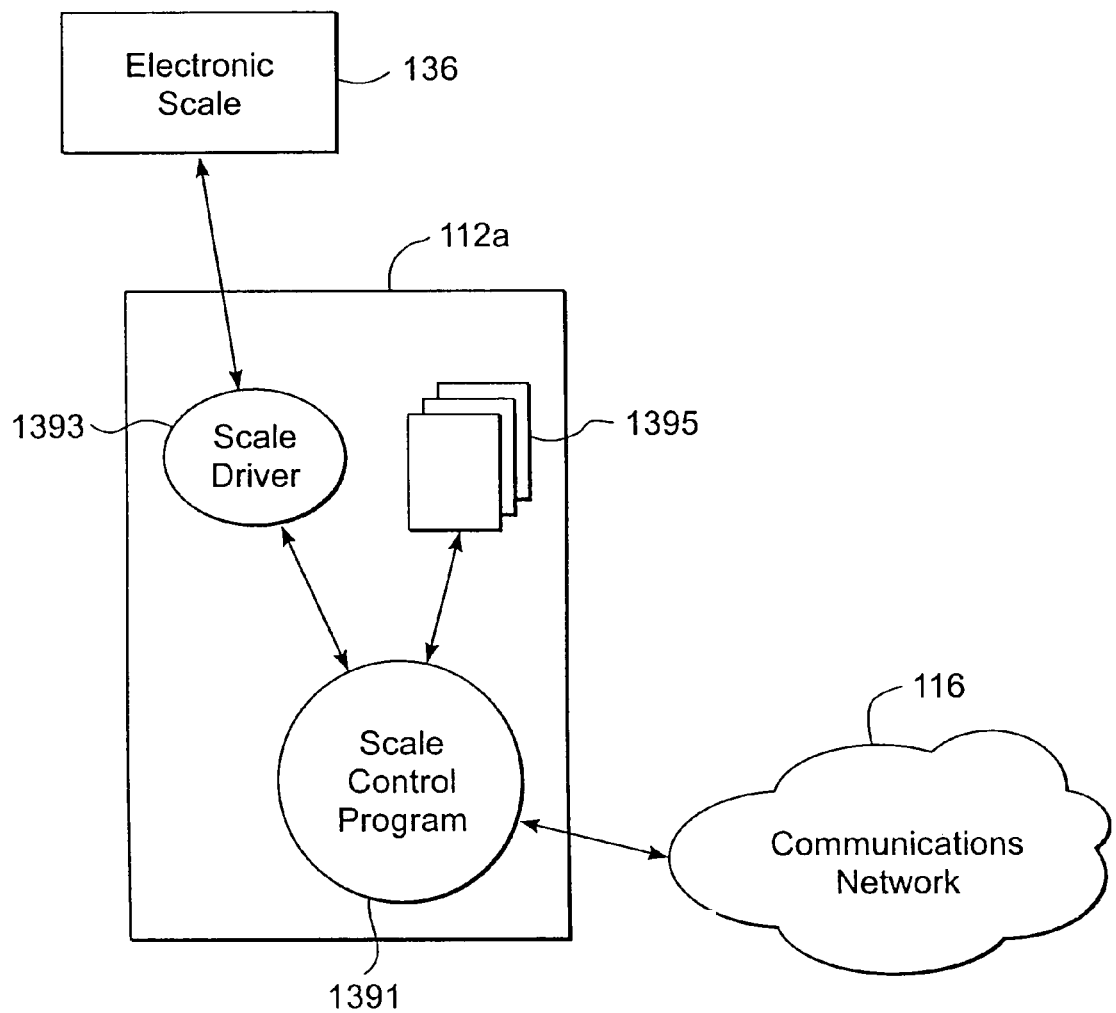
FIG. 13B is a simplified diagram of a scale control program according to an embodiment of the invention.

FIG. 13B is a simplified diagram illustrating the operation of a scale control program 1391 on the user computer 112a. This diagram is merely an illustration which should not limit the scope of the claims herein. One skilled in the art would recognize many other variations, modifications, and alternatives.

In one embodiment, the scale control program 1391 is a dynamic link library (i.e., a .dll) program. The scale control program 1391 may be, for example, an ActiveX controls, a Java applet, a VBScript, JavaScript, a C++ program, or the like. The scale control program 1391 may communicate with other software components running on the user computer 112a using any number of component communication protocols, such as ActiveX or the like. Additionally, the scale control program 1391 may communicate, via the communications network 116, with software components running on other computers (e.g., the server system 118 of FIG. 1A) using a component communication protocol such as Distributed Component Object Model (DCOM) or the like.

The scale control program 1391 may be downloaded each time the user logs onto the website or at specified intervals or known events in order to provide the latest version on the consumer's machine. In an alternative embodiment the scale control program 1391 may be downloaded once. After downloading, the scale control program 1391 runs automatically when needed, and requires no further intervention by the user.

In one embodiment, a Java applet is downloaded to a consumer's PC and is executed by the Web browser, when the consumer selects to use a scale to select a stamp value. The Java applet controls the scale 136 through the computer's operating system.

In one embodiment, the scale control program 1391 executes after being transmitted to the user computer 112*a*. The scale control program 1391 communicates with a scale driver 1393. As is well known to those skilled in the art, the scale driver 1393 operates to interface the scale 136 with the user computer 112*a*. Also, the scale control program 1391 may communicate with the web browsing software to, for example, display information in a web page. Additionally, the scale control program 1391 may communicate with the server system 118 via the communications network 116 in a manner well known to those skilled in the art.

In one embodiment, the scale control program 1391 provides information to the scale driver 1391 for the scale to calculate a postage value. For example, the scale control program 1391 may communicate to the scale driver 1393 information including the stamp type chosen by the user in step 209. In one embodiment, the scale control program 1391 receives the stamp type that is displayed in box 1055 of the web page 1000 shown in FIG. 10. After a stamp value is calculated by the scale 136 and/or the scale driver 1393, the scale control program 1391 receives the postage value from the scale driver 1393. Then, the scale control program 1391 may communicate the postal value to the web browsing software so that the postal value is displayed on a web page in a manner well known to those skilled in the art. For example, the postal value determined by the scale 136 and/or the scale driver 1393 may be displayed in box 1301 of the web page 1300 of FIG. 13A.

In another embodiment, the scale 136 supplies a weight to the scale control program 1391 via the scale driver 1393. Then, the scale control program 1391 communicates the weight and the chosen stamp type to the server system 118. Next, the server system 118 communicates a postage value based upon the weight and the postage type to the scale control program 1391. Next, the scale control program 1391 communicates the postage value to the web browser, which displays the postage value in box 1301 of the web page 1300 of FIG. 13.

In yet another embodiment, the scale 136 supplies a weight to the scale control program 1391 via the scale driver 1393. Then, the scale control program 1391 calculates a postage value based upon the weight and the postage type in any number of methods known to those skilled in the art. Next, the scale control program 1391 communicates the postage value to the web browser, which displays the postage value in box 1301 of the web page 1300 of FIG. 13A.

In still another embodiment, the scale control program 1391 may query the scale driver 1393 to determine whether the postage rates of the postal scale are up to date. If not, the scale control program 1391 may transfer updated postal rates from the server system 118 to the scale driver 1393 for downloading to the scale. Alternatively, the updated postage rates may be stored on the user computers 112*a*.

Submitting Payment Information

FIGS. 10 and 13, illustrate embodiments of web pages for submitting payment information. In particular, the web pages 1000 and 1300 include prompts for entering the name on a credit card in a box 1351 and select the type of credit card from a pull-down menu 1353. Additionally, the user is prompted to enter the credit card number in the box 1355, and select the expiration date from pull down menus 1357 and 1359.

As already discussed, payment information may also be submitted via a registration web page, such as the registration web pages shown in FIGS. 5 and 6.

Printing Stamps

Figure 14:
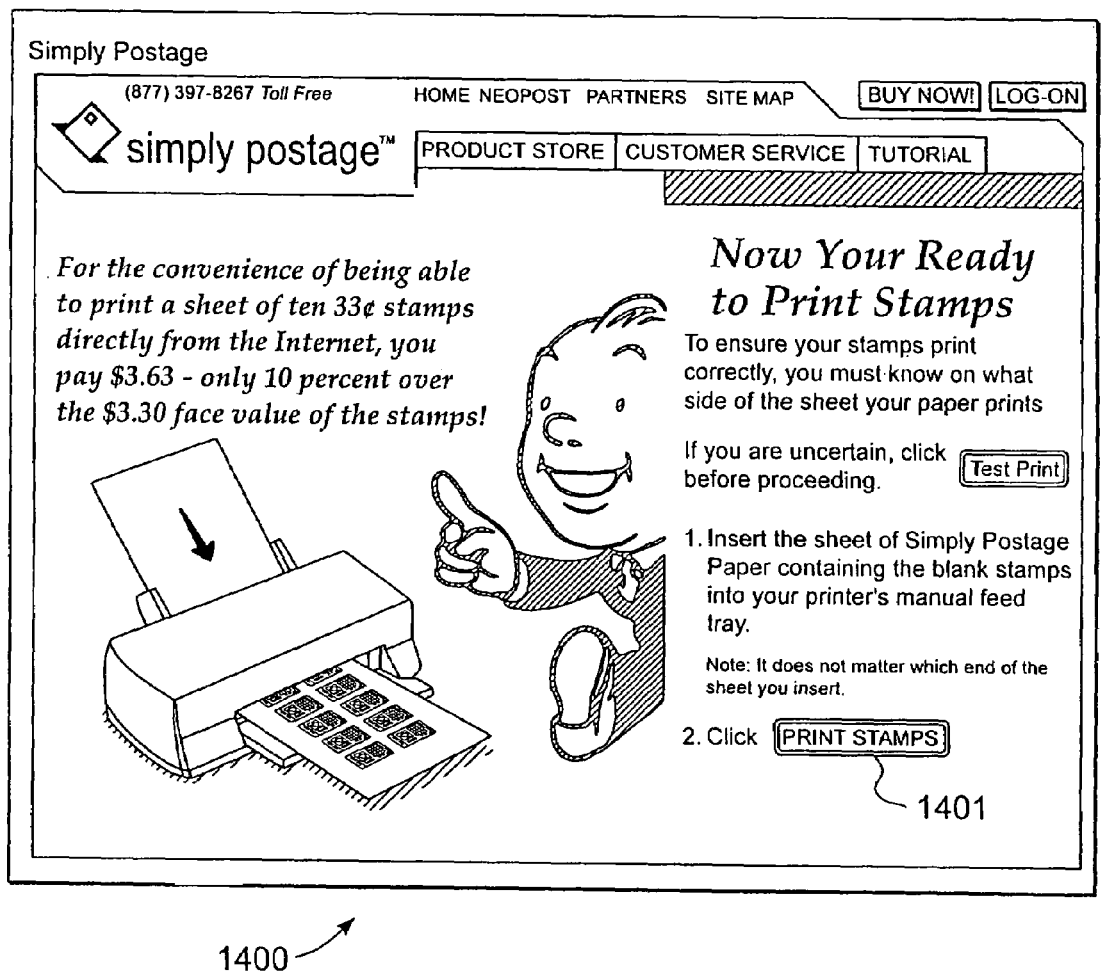
FIG. 14 is an example of a web page that prompts a user to initiate printing stamps.

In one embodiment, the server system 118 may prompt the user to initiate printing via a link, button, or the like, on a web page. FIG. 14 illustrates one embodiment of a web page that prompts the user to initiate printing of stamps. In particular, the web page 1400 includes a button 1401 that prompts a user to print a stamp or stamps. Additionally, FIGS. 10 and 13A, illustrate other embodiments of web pages that prompt a user to initiate the printing of a stamp. In particular web pages 1000 and 1300 include button 1021 and 1403, respectively, that prompt the user to print a stamp or stamps. In one embodiment, the information selected/entered by the user in, for example, one or more of steps 207, 209, 211, 213, and 215 is transmitted to the server system 118 from user computer 112 after the user selects button 1021 or 1403 of web page 1000 or 1300 (FIG. 10 or 13A, respectively).

Print Control Program

Figure 15:
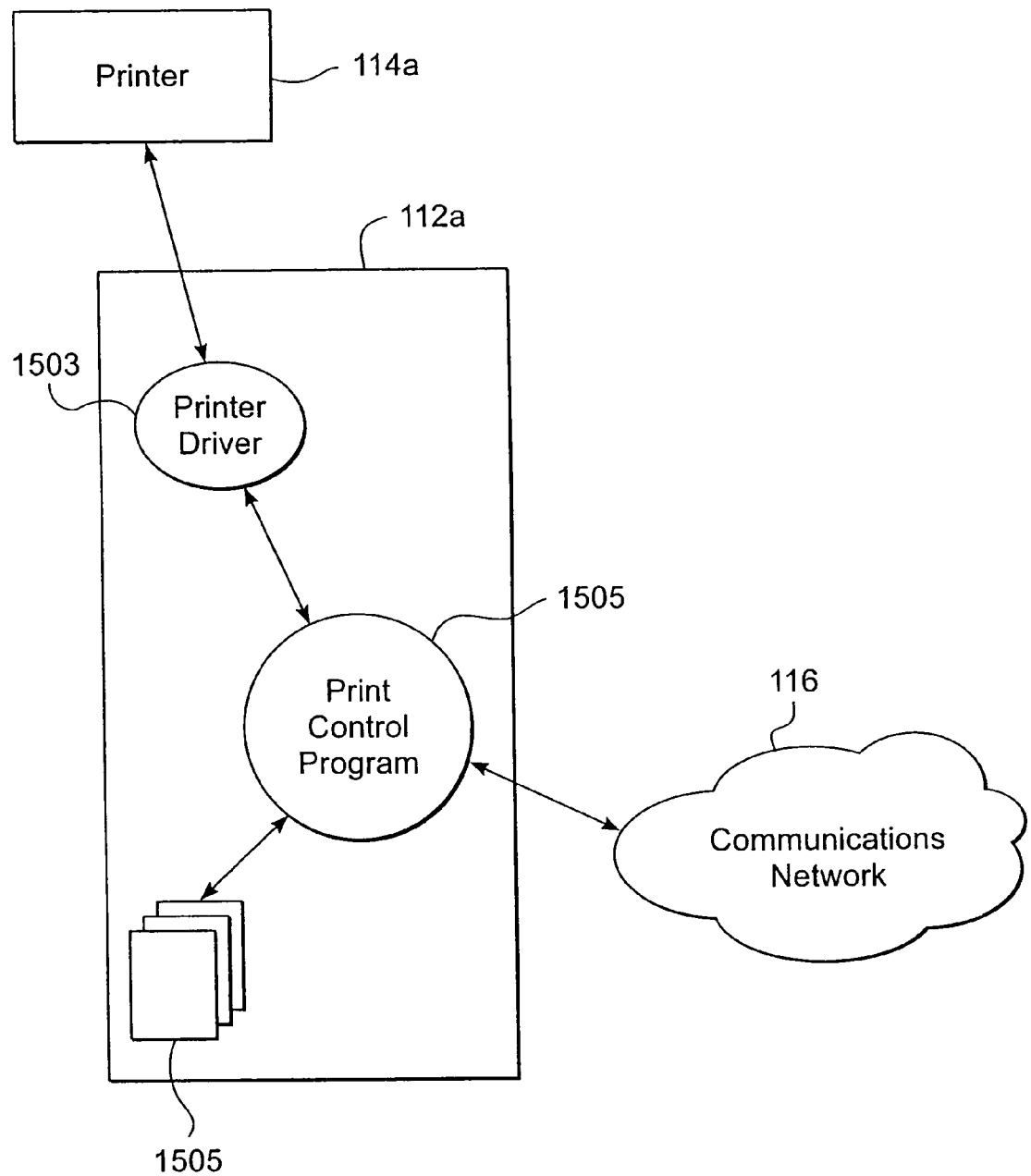
FIG. 15 is a simplified diagram of a print control program according to an embodiment of the invention.

FIG. 15 is a simplified diagram illustrating an embodiment according to the invention. This diagram is merely an illustration which should not limit the scope of the claims herein. One of ordinary skill in the art would recognize many other variations, modifications, and alternatives.

FIG. 15 illustrates a print control program 1501 operating on the user computer 112*a*. In one embodiment, the print control program 1501 may be a print.dll. The print.dll may be downloaded each time the user logs onto the website or at specified intervals or known events in order to provide the latest version on the consumer's machine. In an alternative embodiment the print.dll may be downloaded once. After downloading, the print.dll runs automatically when needed, and requires no further intervention by the user.

The print control program 1501 may include, for example, a Java applet, or VBScript, or JavaScript, or C++ program, or ActiveX controls, and may be downloaded by the user or automatically to permit operation of the printer and/or peripherals, such as a weigh scale. In one embodiment, a Java applet is downloaded to a consumer's PC and is executed by the Web browser, when the consumer selects to print a stamp. The Java applet controls the printer through the computer's operating system.

In one embodiment, the print control program 1501 is downloaded from the web server 120 to the user computer 112*a* via the communications network 116 in a manner well known to those skilled in the art. The web server 120 may download the print control program 1501, for example, after the user logs onto the website in step 205. The print control program 1501 may communicate with other software components running on the user computer 112*a* using any number of component communication protocols, such as ActiveX or the like. Additionally, the print control program 1501 may communicate, via the communications network 116, with software components running on other computers (e.g., the server system 118 of FIG. 1) using a component communication protocol such as Distributed Component Object Model (DCOM) or the like.

In one embodiment, the print control program 1501 executes after being transmitted to the user computer 112*a*. The print control program 1501 communicates with a printer driver 1503. As is well known to those skilled in the art, the printer driver 1503 operates to control the printer 114*a*. Additionally, the print control program 1501 may communicate with the server system 118 via the communications network 116 in a manner well known to those skilled in the art. In some embodiments, the print control program may include the scale control program described previously.

Figure 16:
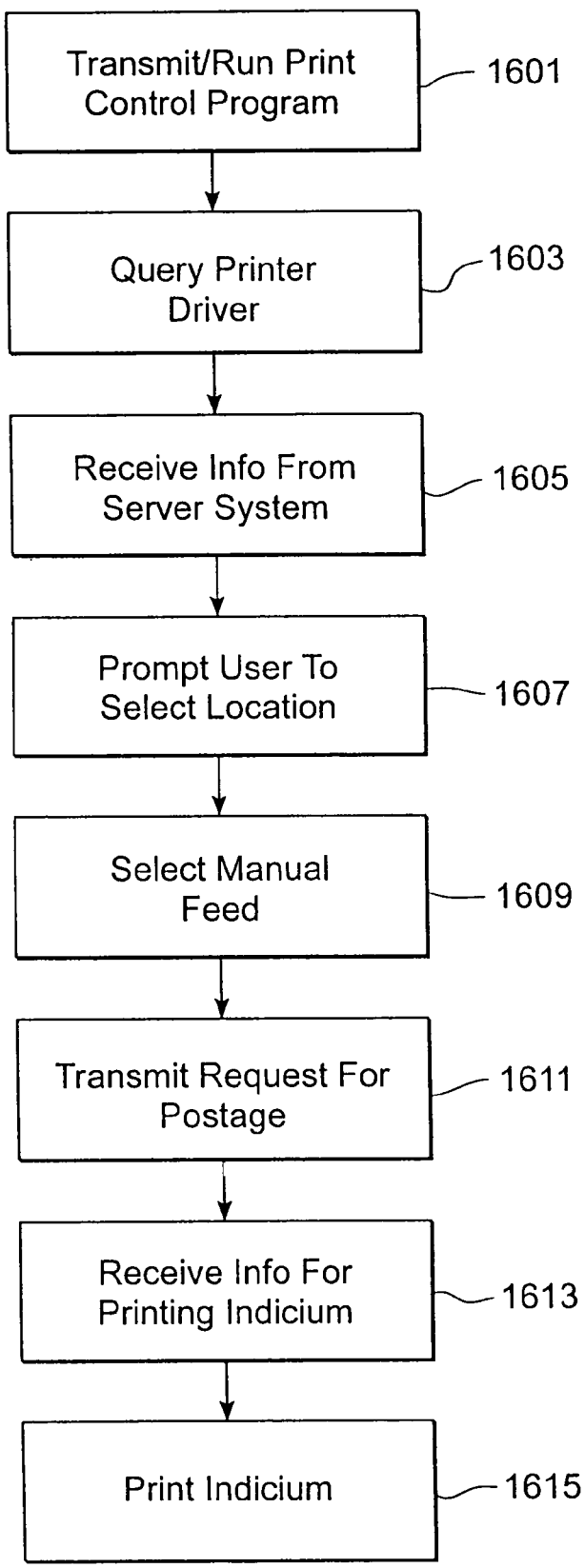
FIG. 16 is a simplified flow diagram of a method for printing stamps according to one embodiment of the invention.

FIG. 16 is a simplified flow diagram of a method of printing stamps according to an embodiment of the invention. This diagram is merely an illustration which should not limit the scope of the claims herein. One skilled in the art would recognize many other variations, modifications, and alternatives.

As already discussed, the print control program 1501 may be transmitted to the user computer 112a and begin executing in step 1601 using any number of methods known to those skilled in the art. In a step 1603, the print control program 1501 queries the printer driver 1503. The print control program 1501 may query the printer driver 1503, in a manner well known to those skilled in the art, to determine information about the printer 114a, including information necessary to print stamps with the printer 114a.

In a step 1605, the print control program 1501 may receive information about the label sheet, label roll, or the like from the server system 118. As previously discussed, each label sheet, label roll, or the like may be identified by a unique serial number. Thus, in one embodiment, the server system 118 may transmit to the print control program 1501 information about the particular label sheet, label roll, or the like, on which stamps will be printed. For example, the print control program 1501 may be provided with information that identifies whether the postage marks will be printed on a label sheet or a label roll. Additionally, because different labels sheets might have different numbers of labels and different label locations, the print control program 1501 may be provided with the number of labels on the particular label sheet and the locations of the labels on the particular label sheet.

In another embodiment, a more specialized print control program is transmitted to the user computer 112a in step 1601, in which the print control program is tailored to the particular label sheet, label roll, or the like to be printed. For example, one print control program may be transmitted to user computer 112a for printing postage marks on a label roll, whereas a different print control program is transmitted to user computer 112a for printing postage marks on a label sheet. Similarly, one print control program may be transmitted to user computer 112a for printing postage marks on label sheets with, for example, ten labels, whereas a different print control program is transmitted to user computer 112a for printing postage mark on label sheets with, for example, six labels.

The print control program 1501 may receive other information from the server system 118. For example, the print control program 1501 may receive the number of unused labels remaining on the label sheet (or the number of labels previously used). Additionally, the print control program 1501 may receive, for example, the locations of unused labels (or the locations of previously used labels). Moreover, the print control program 1501 may receive information from the web browser running on the user computer 112a including the number of stamps to be printed, the cost of the stamps, etc. from a web page such as, for example, the web page 1300 shown in FIG. 13A in a manner well known to those skilled in the art.

In a step 1607, the print control program 1501 may prompt the user to select a label location or locations on the label sheet on which to print the postage mark or marks. Additionally, if postage marks have already been printed to labels on the label sheet, the print control program 1501 may indicate to the user the locations that have already been used. As discussed previously, each label sheet may be uniquely identified by a sheet serial number. Thus, the server system 118 may keep track of how many labels of a particular label sheet have been printed with a postage mark. Additionally, the server system 118 may keep track of the locations of labels to which postage marks were printed. For example, upon the user printing postage marks, the print control program 1501 may communicate to the server system 118 the locations of the labels to which postage marks were printed. Thus, when the user attempts to print labels to that label sheet at a subsequent time, the server system 118 may communicate to the print control program 1501 the locations of labels that have already been used (or have not yet been used).

Similarly, if postage marks have already been printed to labels on the label sheet, the print control program 1501 may pre-select for the user the next unused label location or locations for printing. In this way, the user need not have to determine which label to print next, because the print control program 1501 already has chosen the next label for the user. The user may override the pre-selection if desired.

In a step 1609, the print control program 1501 may prompt the user to choose whether to print in a manual feed mode. In step 1603, the print control program 1501 may query the printer driver 1503 to determine whether the printer supports a manual feed mode. Then, in one embodiment, if the printer 114a does not support a manual feed mode, the print control program 1501 does not prompt the user to choose whether to manual feed. In another embodiment, the print control program 1501 does prompt the user to choose whether to print in a manual feed mode even if the printer 114a does not support a manual feed mode.

In a step 1611, the print control program 1501 transmits a request for a postage mark or marks to the server system 118 via the communications network 116. In one embodiment, the print control program 1501 transmits one request for each stamp to be printed. In another embodiment, the print control program 1501 may transmit one request for multiple stamps. The request may include information submitted by the user, such as, for example, the sheet or label serial number, the stamp type, the stamp value, in steps 207, 209, 213, respectively. According to one embodiment of the present invention, the request may be transmitted from user computer 112 to server system 118 in the form of a data structure in Extensible Markup Language (XML), and may comprise the following:

<server.bp_RequestWebStampParams>
        <LoginID>TestPrint</LoginID>
        <Amount>330</Amount>
        <RateClass>1100</RateClass>
        <FIM>0</FIM>
        <SerialNumber>1966-F8CF</SerialNumber>
        <CCNameOnCard>Joe Customer</CCNameOnCard>
        <CCNumber>0000111122223333</CCNumber>
        <CCExp>0401</CCExp>
    </server.bp_RequestWebStampParams> where:
    <LoginID>TestPrint</LoginID> is the user's name or login name (if the user is a registered user);
    <Amount>330</Amount> is the amount of postage to be purchased in $1/1000$ of US$1. For example, 330=$0.33;
    <RateClass>1100</RateClass> is the value corresponding to a rate class of the postage, for example, "First Class";
    <FIM>0</FIM> is a unused legacy field which is set to zero;
    <SerialNumber>1966-F8CF</SerialNumber> is the serial number of the sheet of labels on which the user intends to print the indicia (assuming that the sheet of labels are serialized). If the labels are also serialized, the serial number of the label on which the indicium is to be printed may also be provided;

<CCNameOnCard>Joe Customer</CCNameOnCard> is the user's name as spelled on a credit card which is to be used for consummating the commercial purchase transaction. If the user is a pre-registered user, this field may be blank and server system 118 will use information related to the user stored in database 358 for billing purposes;

<CCNumber>0000111122223333</CCNumber> is the credit card number which the user intends to use for billing purposes. This field may also be blank if the user is a registered user;

<CCExp>0401</CCExp> is the credit card expiration date of the credit card which the user intends to use for billing purposes. For the shown example, the format of the date is month-year (MMYY). This field may also be blank if the user is a registered user.

It should be apparent that the above described data structure merely illustrates an example of the data and the data format which may be included in the user's request to purchase postage which is communicated from user computer 112 to server system 118 and is not meant to limit the scope of this invention as recited in the claims. In alternate embodiments of the present invention, more or less information than that shown above may be included in the user request. Further, various different formats may be used for communicating the information to server system 118.

The request may also include other information such as the number of stamps, the locations chosen by the user, and the like. By providing this information to the server system 118, the system may be able to assist the user in printing stamps on this label sheet in the future by providing information to a user computer 112 that identifies locations of labels on the label sheet (identified by the unique sheet serial number) that have already been used. In embodiments in which each label on a sheet has a unique label serial number, the location of a particular label can be derived from its label serial number. Additionally, because the server system 118 may keep track of the number of labels used on a particular label sheet, the server system may determine when all the labels on a label sheet have been used. Thus, the server system 118 could, for example, invalidate the sheet serial number of a completed label sheet and remove it from the pull-down menu 1013 shown in FIG. 11 the next time the user attempts to select a serial number.

In a step 1613, the print control program 1501 receives from the server system 118 information for printing one or more indicia. Then, the print control program 1601, in conjunction with the printer driver 1603, directs the printer 114a to print the indicia at the appropriate label locations in a step 1615. According to one embodiment of the invention, the server systems transmits to the user computer the information for printing one or more indicia via data structure in XML format. The XML format for the data structure may be as follows:

<Indicium>
<MeterNumber>042N50000061</MeterNumber>
<RateClass>1100</RateClass>
<FIM>0</FIM>
<LPO>Warrenton, VA</LPO>
<Amount>330</Amount>
<Matrix>AgFA4gEAMDQyTr3w+
glikQEAAEoBAP8uMQEAAAAA
Hh0AAACuBwAAAAAesQOAMTEwMKHVkp9AoLIvu-CxwwowCZT35n5nxxFKfC4VU6
s3i22eQbgPaFQCH53g=</Matrix>
</Indicium> where:
<MeterNumber>042N50000061</MeterNumber> is the unique serial number of the MPSD used for generating the information for printing the indicium;
<RateClass>1100</RateClass> is a value corresponding to a rate class, for example "First Class";
<FIM>0</FIM> is a reserved field set to 0,
<LPO>Warrenton, VA</LPO> is an optional origin address;
<Amount>330</Amount> is an amount of postage in $\frac{1}{1000}$ of US$1, for example, 330=$0.33; and
<Matrix>AgFA4gEAMDQyTr3w+glikQEAAEoBAP8u-MQEAAAAAHh0AAA CuBwAAAAAesQ0AMTEwMK-HVkp9AoLIvuCxwwowCZT35n5nxxFKfC4VU6s3i22eQ-bgPaF QCH53g=</Matrix> is Base64-encoded binary data representing the indicium data (89 bytes) that is printed as the machine-readable portion of the indicium. The indicium data encoded in the Matrix section may have the following format:

```
struct Indicium
{
    byte VersionNo;
    byte AlgorithmID;
    byte CertificateSerialNo[4];
    char ManufacturerID[2];
    char ModelID[2];
    byte SerialNo[4];
    byte AscendingRegister[5];
    byte Postage[3];
    byte Date[4];
    byte ZIP[4];
    byte UserID[5];
    byte StampSerialNo[6];
    byte DescendingRegister[4];
    char RateCategory[4];
    byte DigitalSignature[40];
};
``` where:
"VersionNo" data field represents the version number assigned by the postal authority, for example, the USPS, to the indicia data set. A 1-byte binary value may be used to represent this data field;
"AlgorithmID" data field identifies the digital signature algorithm used to create the digital signature in the indicium. A 1-byte binary value may be used to represent this data field;
"CertificateSerialNo" data field represents a unique serial number of the PSD certificate issued by the IBIP Certificate Authority (e.g., USPS). A 4-byte binary value may be used to represent this data field;
"ManufacturerID" data field represents the USPS-assigned identifier for the postage vendor. For example, the manufacturer identifier "04" may be assigned to Neopost. A 2-character ASCII text may be used to represent this data field;
"ModelID" data field represents the model number assigned to the product model by the postal authority (e.g., the USPS). A 2-character ASCII text may be used to represent this data field e.g., "2N". According to the IBIP specifications, the first character is this data field is a numeric value (0–9) and the second character is an alphanumeric value (A–Z);

"SerialNo" data field represents the serial number of the MPSD used to generate the indicium data. A 4-byte binary value may be used to represent this data field;

"AscendingRegister" data field represents the total monetary value of all indicia ever generated by the MPSD during its life cycle. A 5-byte binary value may be used to represent this data field;

"Postage" data field represents the amount of postage applied for this specific indicium. This data field may be represented using a 3-byte binary value in numeric format. This data field supports the maximum amount of postage due on a single piece of mail in any mail class supported by the mail system;

"Date" data field represents the date the indicium was printed (from the PSDM server's clock). This data field may be represented using a 4-byte binary value in the format YYYYMMDD);

"ZIP" data field represents the ZIP of the user requesting the indicium (also called the originating user). This data field may be represented using a 4-byte binary value in 5-digit numeric format;

"UserID" data field identifies the user requesting the indicium. For example, this field may contain the name of the user. If the user is a registered user, this field may contain the user identifier assigned to the user by server system 118. This data field may be represented using a 5-byte binary value;

"StampSerialNo" data field is a combination field. The first section (e.g., the first byte) of the field may represent a system software identification number for the server system 118 software. The second section (e.g., the remaining 5-bytes) of this field may represent the serial number of the label on which the indicium is printed (for example, the label serial number "13DA-5F45" (reference 258 of FIG. 1C);

"DescendingRegister" data field represents the postage value remaining on the MPSD. This data field may be represented using a 4-byte binary value;

"RateCategory" data field represents the postage class for the indicium and rate, including any presort discount level. The rate values for this field are usually provided by the postal authority, for example, the USPS. This data field may be represented using a 4-byte binary value; and "DigitalSignature" data field represents the digital signature. The size of this data field is a function of the digital signature algorithm used for generating the digital signature. According to an embodiment of the present invention, a 40-byte value may be used for this field for a DSA digital signature.

Further details of the above structure are described in U.S. patent application Ser. No. 09/708,883, entitled "Techniques For Dispensing Postage Using A Communication Network", filed Nov. 7, 2000.

The information for printing an indicium after it is generated at the server system 118 may be sent to the user computer 112a either as a bitmap of the human-readable and machine-readable portions suitable for printing, or as a data structure or data message that includes the indicium data. If indicium data is sent, then the print control program 1501 generates the bitmap from the information. The bitmap is then printed by the printer on either a label or envelope to give a stamp or a stamped envelope, respectively. The print control program 1501 may be deleted, either when the web browser is closed or when the user changes domains, i.e., leaves the service provider's website. In another embodiment the print control program 1501 remains resident.

Although these embodiments were described in the context of postage stamps, the present invention may be used with other types of value indicium. For example, in other embodiments, a tax stamp, a hunting/fishing license stamp, a ticket, a driver's license, a trading stamp (e.g., green stamp), or any other item of monetary value may be purchased and printed according to the invention. Further, although these embodiments were described in the context of printing value indicia to labels, the indicia may be printed to other types of printable media as well, e.g., envelopes, post cards, etc.

Selecting Locations of Labels

FIG. 17 illustrates one embodiment of a label sheet that may be used with the present invention. FIG. 17 is merely an illustration which should not limit the scope of the claims herein. One skilled in the art would recognize many other variations, modifications, and alternatives. The label sheet 1700 includes ten individual labels 1701. Additionally, a unique sheet serial number, labeled 1703, is included on the label sheet. Although the label sheet 1700 includes ten labels, other label sheets might include more or less labels. Additionally, other label sheets may have labels at locations different than the locations of labels on the label sheet 1700.

Figure 18A:
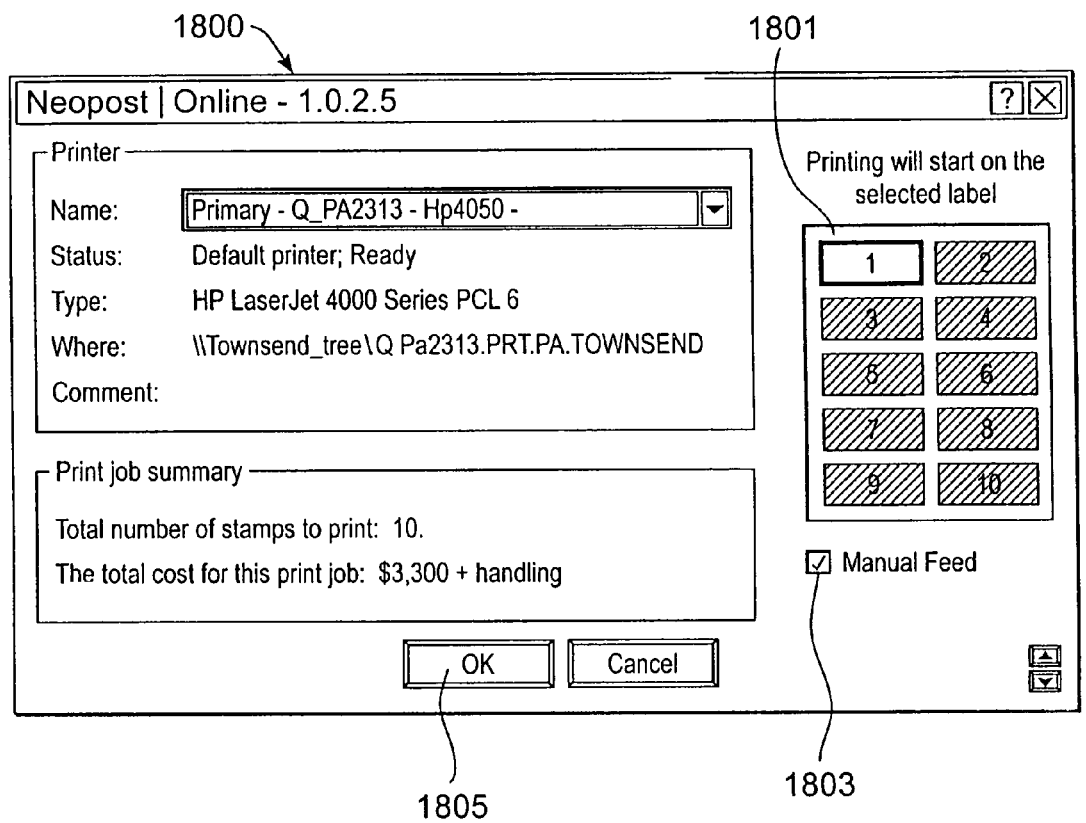
FIG. 18A is an illustration of a window for selecting locations of labels on which to print according to one embodiment of the invention.

FIG. 18A illustrates an embodiment of a window for prompting a user to select a location or locations. The window 1800 may be generated and controlled by the print control program 1501. The window 1800 includes a simplified graphical representation 1801 of the label sheet on which postage marks are to be printed. In particular, the graphical representation 1801 is of a ten-label label sheet, such as, for example, the label sheet 1700 shown in FIG. 17. The ten label locations are consecutively number 1 through 10 in the graphical representation 1801. If a user is printing one postage mark, the user may select a location of the label on which to print the postage mark by using, for example, a mouse to select one of the ten locations in the graphical representation 1801. Upon selecting a location, the location may be highlighted to indicate to the user that it has been selected. For example, in FIG. 18A, the label location "1" is of a lighter shade than the other locations.

If a user is printing more than one postage mark, the user may select a location of a first label on which to begin printing the multiple postage marks. Then, the multiple postage marks will be printed on consecutive labels on the label sheet, beginning with the selected label. For example, in FIG. 18A, if the user will print three stamps, the stamps will be printed at label locations "1", "2", and "3". In another embodiment, the user may select each of the locations to which the postage marks will be printed. For example, the user may select a location on which one of the multiple stamps will be printed by, for example, clicking on the location with a mouse. Upon selecting a location, the location may be highlighted to indicate to the user that it has been selected. If the user decides not to print to the selected location, the user may de-select the location by, for example, clicking again on the location with a mouse. Upon de-selecting the location, the location is de-highlighted. In this manner, if the user desires to print three stamps, the user could select locations "3", "5", and "10" in the graphical representation 1801 of FIG. 18A.

The print control program 1501 may indicate to the user the locations of labels that have previously been used by, for example, putting an "X" through previously used locations, highlighting used locations in a different shade or color, etc. in the graphical representation 1801 of FIG. 18A. Additionally, the print control program 1501 may prevent the user from selecting already used locations for printing, and also may prompt the user that the location is no longer available with, for example, an additional window. In another embodiment, the print control program 1501 may allow the user to override the print control program 1501 and select locations that the server system 118 has communicated to the print control program 1501 are not available. For example, the user may decide that the locations of labels that the print control program 1501 has indicated have been used do not correspond to the already used locations on the actual label sheet.

Additionally, the print control program 1501 may preselect a label or labels to print on a particular label sheet based upon the labels that were already used on that label sheet. For example, say that the user has previously printed labels on the a label sheet having a sheet serial number, the already printed labels represented by the labels "1", "2", and "3" in the simplified graphical representation 1801 of FIG. 18A. Then, the next time the user attempts to print a label on that label sheet, the print control program 1501 may pre-select for the user the label location "4" for the next printing.

In other embodiments in which each label on a label sheet has an associated unique label serial number, label positions may be identified by the label serial numbers. For example, if a user enters/selects particular label serial numbers in step 207, the corresponding label locations can be identified by, for example, print control program 1501. Alternatively, upon receiving the entered/selected label serial numbers, server system 118 could identify their locations on the label sheet and then communicate those locations to print control program 1501. Additionally, print control program 1501 could display to the user via graphical representation 1801 the locations of the labels corresponding to the entered/selected label serial numbers.

Manual Feed Mode

FIG. 18A illustrates one embodiment of prompting a user to choose whether to print in a manual feed mode. The window 1800 shown in FIG. 18A, includes a manual feed check box 1803 that the user may check (or uncheck) with, for example, a mouse. In one embodiment, the print control program 1501 prompts the user to choose whether to print in a manual feed mode only if the printer 114a supports a manual feed mode. If the printer does not, the print control program does not prompt the user to choose whether to manual feed. In another embodiment, the print control program 1601 does prompt the user to choose whether to print in a manual feed mode even if the printer 114a does not support a manual feed mode. In this embodiment, if the user had selected manual feed mode in step 1609 and the printer 114a does not support manual feed, the print control program 1501 prompts the user with a window, or the like, to insert the label sheet into the printer 114a. Additionally, this window includes a button, or the like, for the user to select after inserting the label sheet into the printer 114a. After the user selects this button, the printing is initiated. In this way, the print control program 1501 simulates a manual feed mode for the printer 114a.

Printing the Labels

Figure 18B:
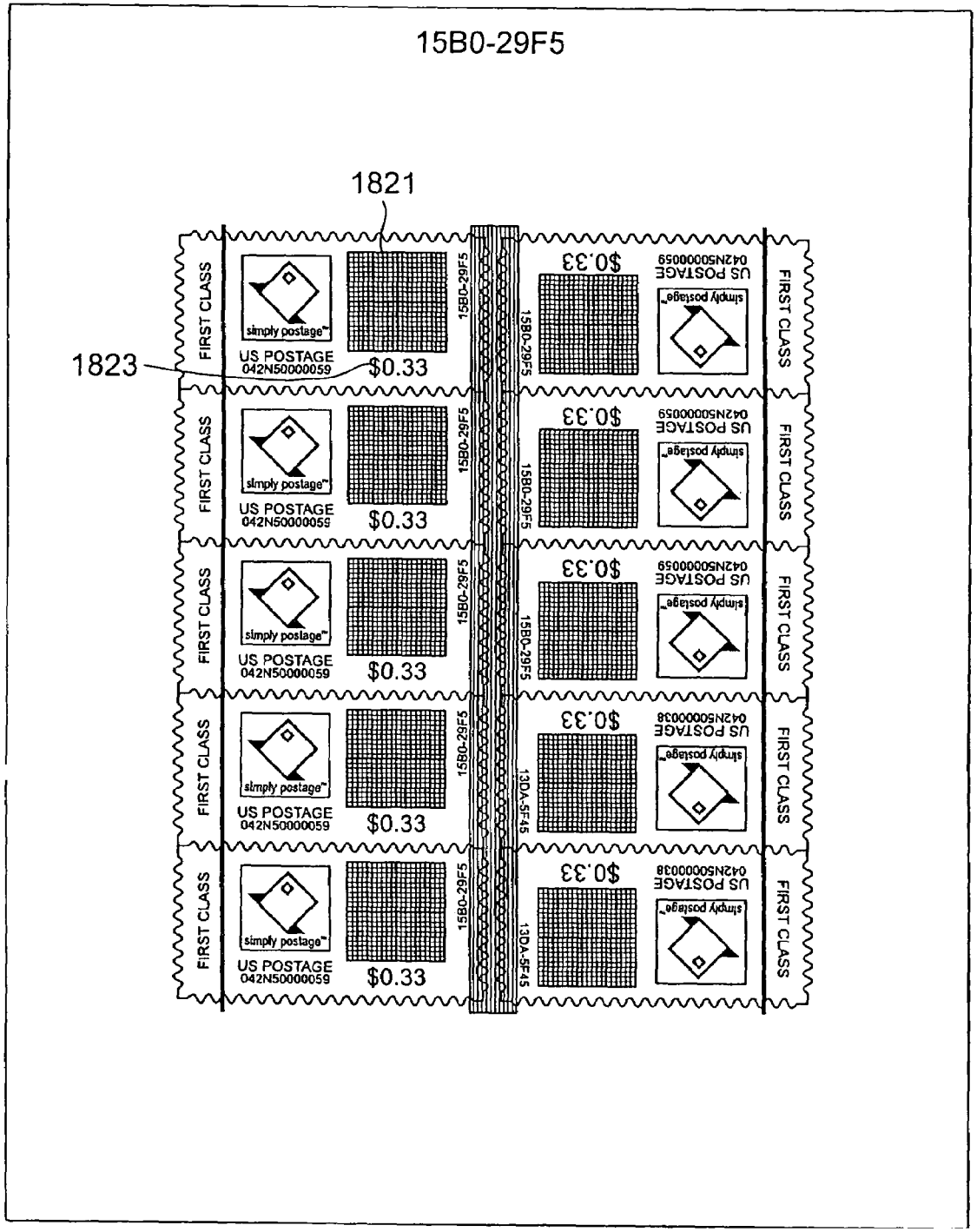
FIG. 18B is an illustration of a sheet of labels on which indicia have been printed.

FIG. 18A illustrates one embodiment for initiating the printing of postage to the labels. In particular, the user may select the button 1805 with a mouse, or the like, to initiate the printing of the label or labels. FIG. 18B illustrates a label sheet that has been printed with postal indicia. In particular, the postal indicia includes a 2D barcode 1821 and human readable information 1823.

Although these embodiments were described in the context of postage stamps, the present invention may be used with other types of value indicium. For example, in other embodiments, a tax stamp, a hunting/fishing license stamp, a ticket, a driver's license, a trading stamp (e.g., green stamp), or any other item of monetary value may be purchased and printed according to the invention.

Correctly Inserting Label Sheets

In some instances, postage marks may be misprinted. For example, if the user has incorrectly inserted a label sheet into the printer, the postage marks may be printed on the wrong side of the label sheet. This type of misinsertion may be referred to as "wrong side insertion." Additionally, a postage mark may be mistakenly printed to a location where a label has already been removed. Referring to FIG. 17, say, for example, that labels 1701, 1703, 1705, 1707, 1709, and 1711 were previously printed and have been removed. The user wishes to print a postage mark to label 1713 using, for example, the methods describe above. If the user inserts the label sheet correctly into the printer, and, for example, selects label "2" in the window 1800 of FIG. 18A, the postage mark will be properly printed to label 1713. However, if the user inserts the label sheet incorrectly into the printer, the postage mark may be printed to the location of removed label 1711. This type of misinsertion may be referred to as "wrong edge insertion." Such misprints are undesirable because, at most, the user loses the value of the misprinted postage mark, and at the least, the user must expend time and effort to obtain a refund for the misprint.

Figure 19:
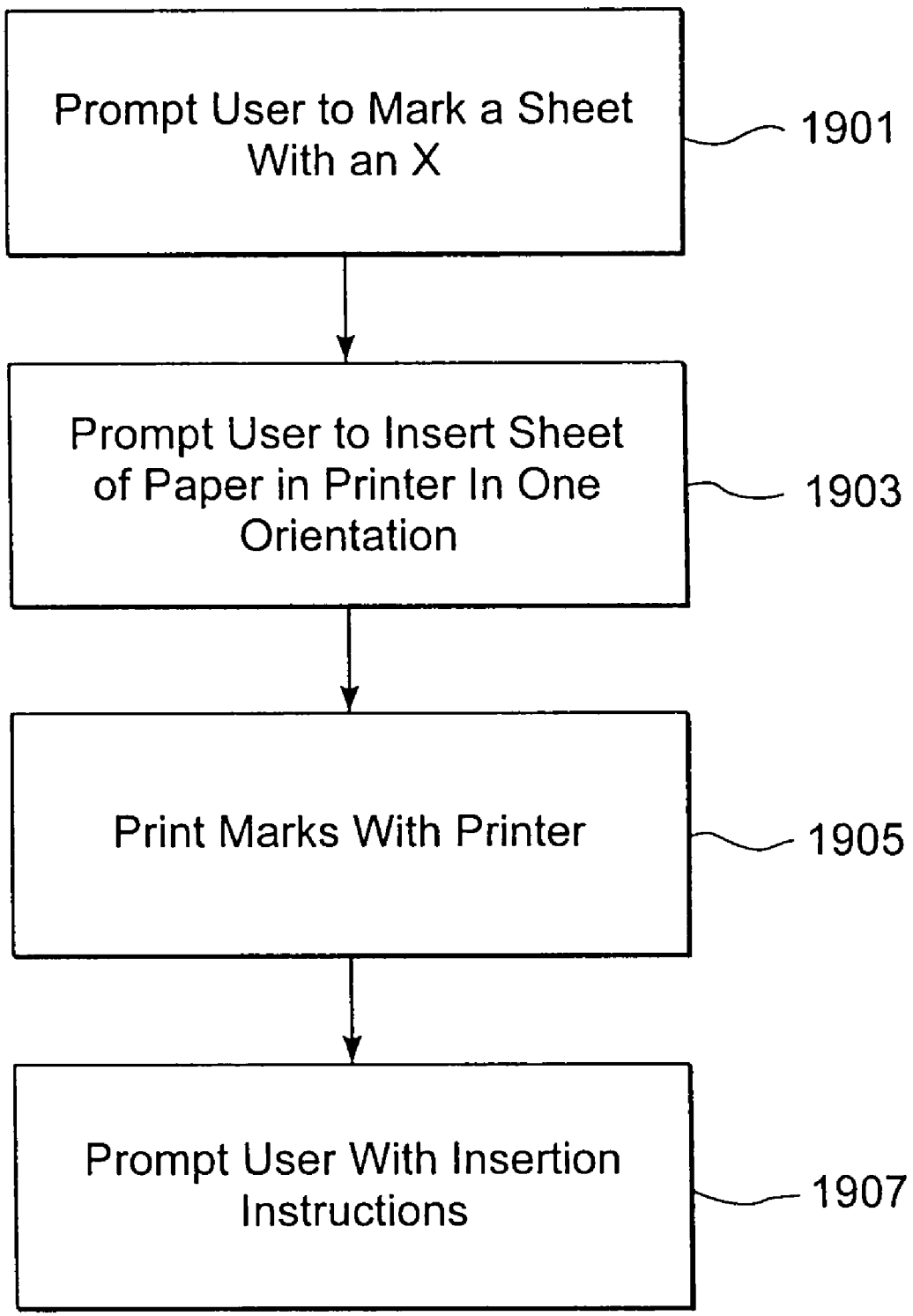
FIG. 19 is a simplified flow diagram of a method for determining correct insertion of a label sheet according to one embodiment of the invention.

FIG. 19 is a simplified flow diagram of a method according to an embodiment of the invention. This diagram is merely an illustration which should not limit the scope of the claims herein. One skilled in the art would recognize many other variations, modifications, and alternatives. The flow of FIG. 19 may be implemented, for example, with the system shown in FIG. 1. Additionally, the flow of FIG. 19 may be implemented, in part, with the print control program 1501.

FIG. 19 illustrates a method for determining a correct printer insertion orientation for a label sheet. The method illustrated in FIG. 19 attempts to prevent wrong-side insertion. In a step 1901, the user is prompted to place a first mark on one side of a sheet of paper or the like. In a step 1903, the user is prompted to place the marked sheet of paper into the printer 114a in a particular orientation. For example, the user may be prompted to either insert the paper into the printer with the first mark facing up, or insert it with the first mark facing down. The user may be prompted to insert the paper into a paper tray, a manual feed tray, or the like, of the printer.

In a step 1905, the printer 114a is directed to print a second mark on the sheet of paper. For example, the printer 114a may be directed to print one or more of a text string, an illustration, a postage mark indicium, or the like.

In a step 1907, the user is prompted with instructions regarding proper of insertion of a label sheet based upon the result of the printing step 1905 described above. For example, if the user was prompted in step 1903 to insert the sheet of paper into the printer with the first mark facing up, and if the second mark printed by the printer appears on the same side of the paper as the first mark, then the user is prompted to insert a label sheet with the labels facing up. But, if the user was prompted in step 1903 to insert the sheet of paper into the printer with the first mark facing up, and if the second mark printed by the printer appears on the opposite side of the paper as the first mark, then the user is prompted to insert a label sheet with the labels facing down.

Similarly, if the if the user was prompted in step 1903 to insert the sheet of paper into the printer with the first mark facing down, and if the second mark printed by the printer appears on the same side of the paper as the first mark, then the user is prompted to insert a label sheet with the labels facing down. And, if the user was prompted in step 1903 to insert the sheet of paper into the printer with the first mark facing down, and if the second mark printed by the printer appears on the opposite side of the paper as the first mark, then the user is prompted to insert a label sheet with the labels facing up.

Figure 20:
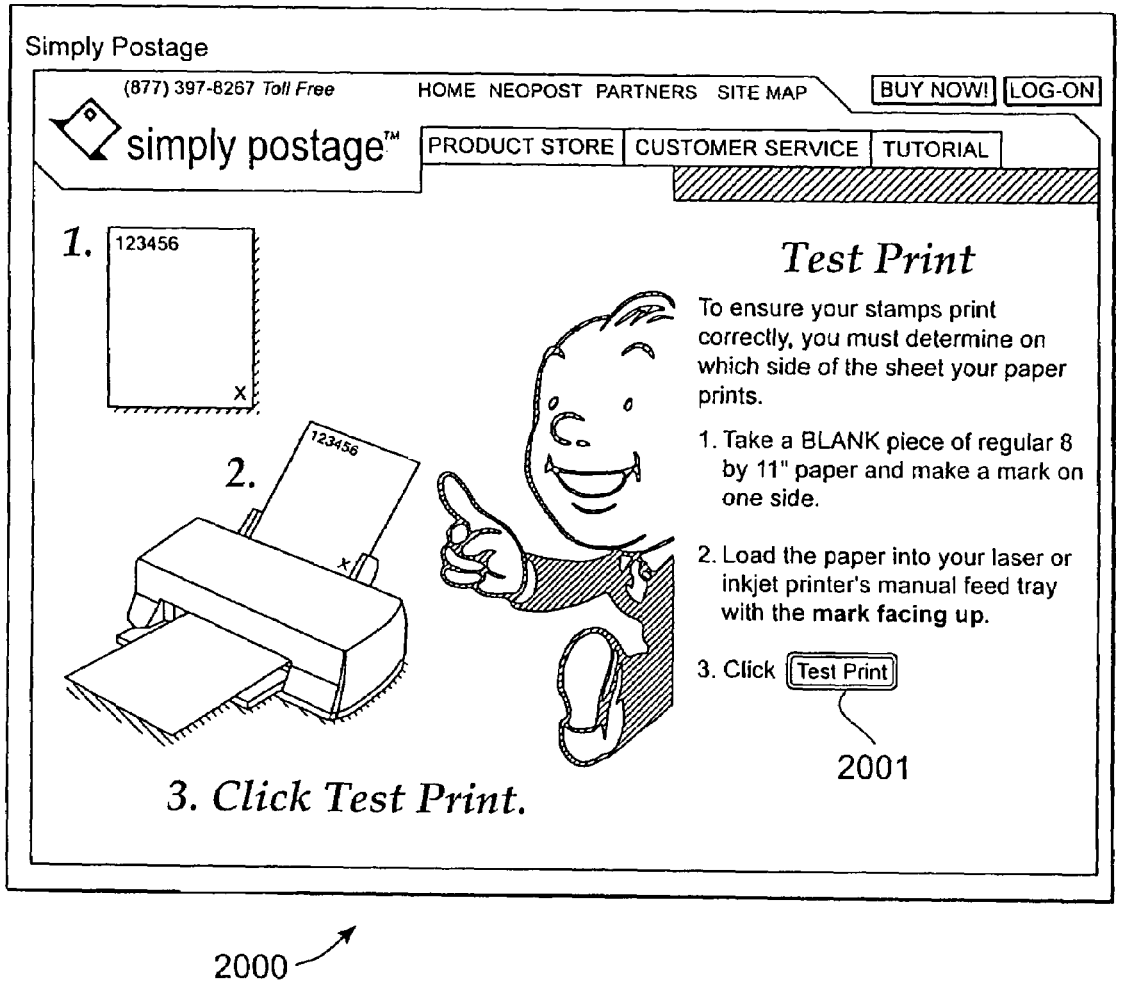
FIG. 20 is an example of a web page for prompting a user to mark a sheet of paper and then insert the marked sheet of paper into a printer in a certain orientation.

FIG. 20 illustrates a web page embodiment of steps 1901 and 1903. The web page 2000 prompts a user to mark a sheet of paper with a first mark. Additionally, the web page 2000 prompts the user to insert the marked page into the printer with the first mark facing up. The web page embodiment 2000 includes a button 2001 that, when pressed, causes the printer to print a second mark on the sheet of paper in a manner well known to those skilled in the art.

Figure 21:
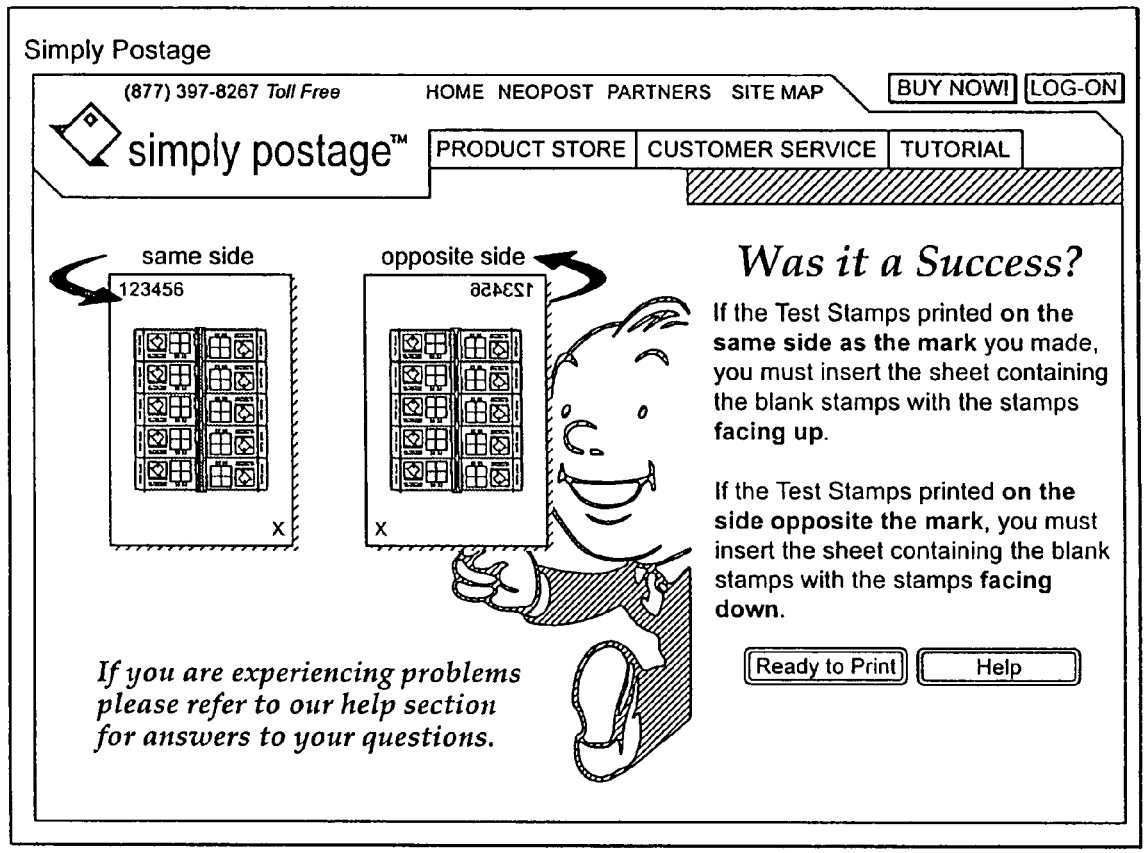
FIG. 21 is an example of a web page prompting a user to insert a label sheet into a printer in a correct orientation.

FIG. 21 illustrates a web page embodiment of step 1907. The web page 2100 prompts a user regarding the correct way to insert a label sheet based on the results of the printing step 1905 of FIG. 19. In particular, FIG. 21 prompts the user regarding the correct insertion of a label sheet if the user was prompted to insert a sheet of paper with the first mark facing up in step 1903.

Printing Insertion Instructions on Label Sheets

In another embodiment, after the correct insertion orientation has been determined, insertion instructions may be printed onto a label sheet. For example, instructions reading "Insert With This Side Up", or the like, may be printed onto the label sheet to assist the user in correctly inserting the label sheet in the future. This is particularly helpful if the user will be printing a few labels at a time, and thus will be inserting the label sheet into the printer multiple times. With the insertion instructions on the label sheet, the user need not repeat the steps 1901 and 1903 shown in FIG. 19 each time the user wishes to print one or more labels. Additionally, with the insertion instructions on the label sheet, the user need not rely on the user's memory for correct insertion, or have to store the insertion instructions elsewhere.

Figure 22A:
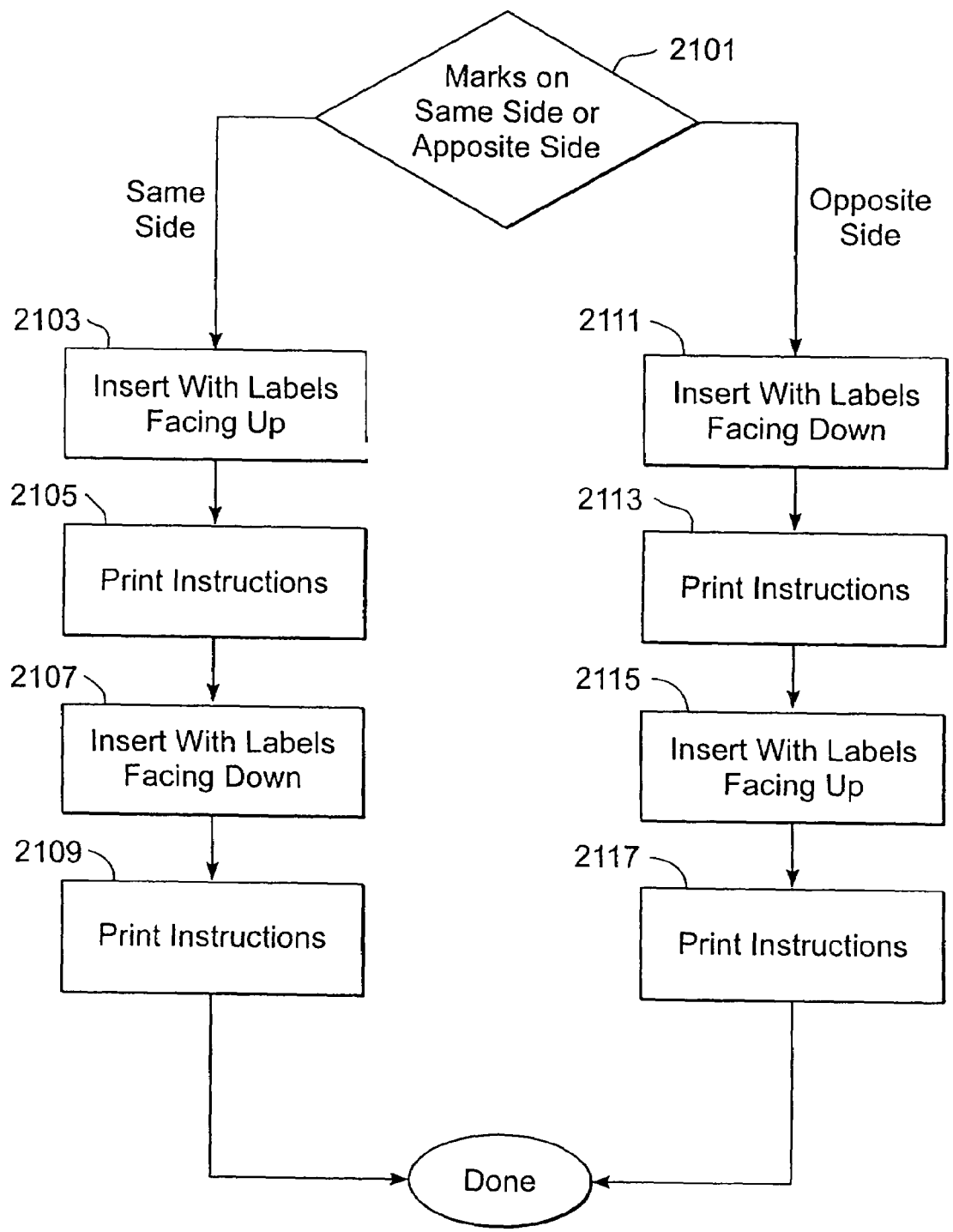
FIG. 22A is a simplified flow diagram of another method for determining correct insertion of a label sheet according to one embodiment of the invention.

FIG. 22A is a simplified flow diagram of a method according to an embodiment of the invention. This diagram is merely an illustration which should not limit the scope of the claims herein. One skilled in the art would recognize many other variations, modifications, and alternatives. The flow of FIG. 22A may be implemented, for example, with the system shown in FIG. 1.

FIG. 22A illustrates the flow of a method for printing insertion instructions onto a label sheet. The flow illustrated in FIG. 22A may be implemented, for example, with a series of web pages, windows, or the like. This flow assumes that in step 1903 of FIG. 19, the user was prompted to insert the paper into the printer with the first mark facing up. In a step 2101, the user is prompted whether, after performing steps 1901, 1903, and 1905 of FIG. 19, the first and second marks appear on the same side or the opposite sides. For example, a web page may prompt the user to select either a "same side" button or a "different side" button. If the user selects the "same side" button, the method flows to step 2103. If the user selects the "opposite side" button, the method flows to step 2111.

If the user has indicated that the first and second marks appeared on the same side of the paper, the user is prompted, in a step 2103, to insert a label sheet into the printer 13 with the labels facing up. The user may be prompted to insert the label sheet into a paper tray, a manual feed tray, or the like, of the printer. In one embodiment, a web page prompts the user to insert a label sheet into the printer with the labels facing up.

Then, in a step 2105, the printer 114*a* is directed to print insertion instructions onto the label sheet in, for example, a margin or the like. For example, the printer 114*a* may be directed to print an instruction in a margin of the label sheet that reads "Insert Into Printer With This Side Up", or the like. A web page, or the like, may include a button, or the like, that, when pressed, causes the printer to print the instructions onto the label sheet in a manner well known to those skilled in the art.

Similarly, the user may elect to print instructions on the back side of the label sheet. In this way, if the user mistakenly incorrectly inserts the label sheet, the insertion instructions on the back side will help make the user aware of his or her mistake. Thus, in a step 2107, the user may be prompted to insert the label sheet into the printer with the labels facing down. In one embodiment, a web page prompts the user to insert a label sheet into the printer with the labels facing down. Then, in a step 2109, the printer 114*a* is directed to print insertion instructions onto the back side of the label sheet. For example, the printer 114*a* may be directed to print an instruction onto the back side of the label sheet that reads "You Have Inserted the Label Sheet Incorrectly! Insert Into Printer With This Side Down", or the like. A web page, or the like, may include a button, or the like, that, when pressed, causes the printer to print the instructions onto the back of the label sheet in a manner well known to those skilled in the art.

If in step 2101 the user has indicated that the first and second marks appeared on opposite sides of the paper, the user is prompted, in a step 2111, to insert a label sheet into the printer with the labels facing down. In one embodiment, a web page prompts the user to insert a label sheet into the printer with the labels facing down.

Then, in a step 2113, the printer 114*a* is directed to print insertion instructions onto the back of the label sheet. For example, the printer 114*a* may be directed to print an instruction onto the back of the label sheet that reads "Insert Into Printer With This Side Up", or the like. A web page, or the like, may include a button, or the like, that, when pressed, causes the printer to print the instructions onto the label sheet in a manner well known to those skilled in the art.

Similarly, in a step 2115, the user may be prompted to insert the label sheet into the printer with the labels facing up. In one embodiment, a web page prompts the user to insert a label sheet into the printer with the labels facing up.

Then, in a step 2117, the printer 114*a* is directed to print insertion instructions onto the label sheet in, for example, a margin or the like. For example, the printer 114*a* may be directed to print an instruction in the margin of the label sheet that reads "You Have Inserted the Label Sheet Incorrectly! Insert Into Printer With This Side Down", or the like. A web page, or the like, may include a button, or the like, that, when pressed, causes the printer to print the instructions in the margin of the label sheet in a manner well known to those skilled in the art.

In yet another embodiment, after the correct insertion orientation has been determined, the correct orientation may be transmitted to the server system 118. For example, a web page or the like may prompt the user, with buttons or the like, to indicate whether the first and second marks appeared on the same side or different sides. Then, the server system 118 may keep track of the correct insertion orientation for the user. Thus, the next time the user attempts to print a stamp, the server system may prompt the user, with a web page, via the print control program, or the like, with the insertion orientation that the user last used to print stamps. Thus, the user need not repeat the steps 1901 and 1903 shown in FIG. 19 each time the user wishes to print one or more labels. Additionally, when the server system 118 prompts the user with insertion instructions, the user need not rely on the user's memory for correct insertion, or have to store the insertion instructions elsewhere. In still another embodiment, the correct orientation may stored as information in a cookie on the user computer 112a.

Determining Correct Insertion Orientation for Label Sheets

Figure 22B:
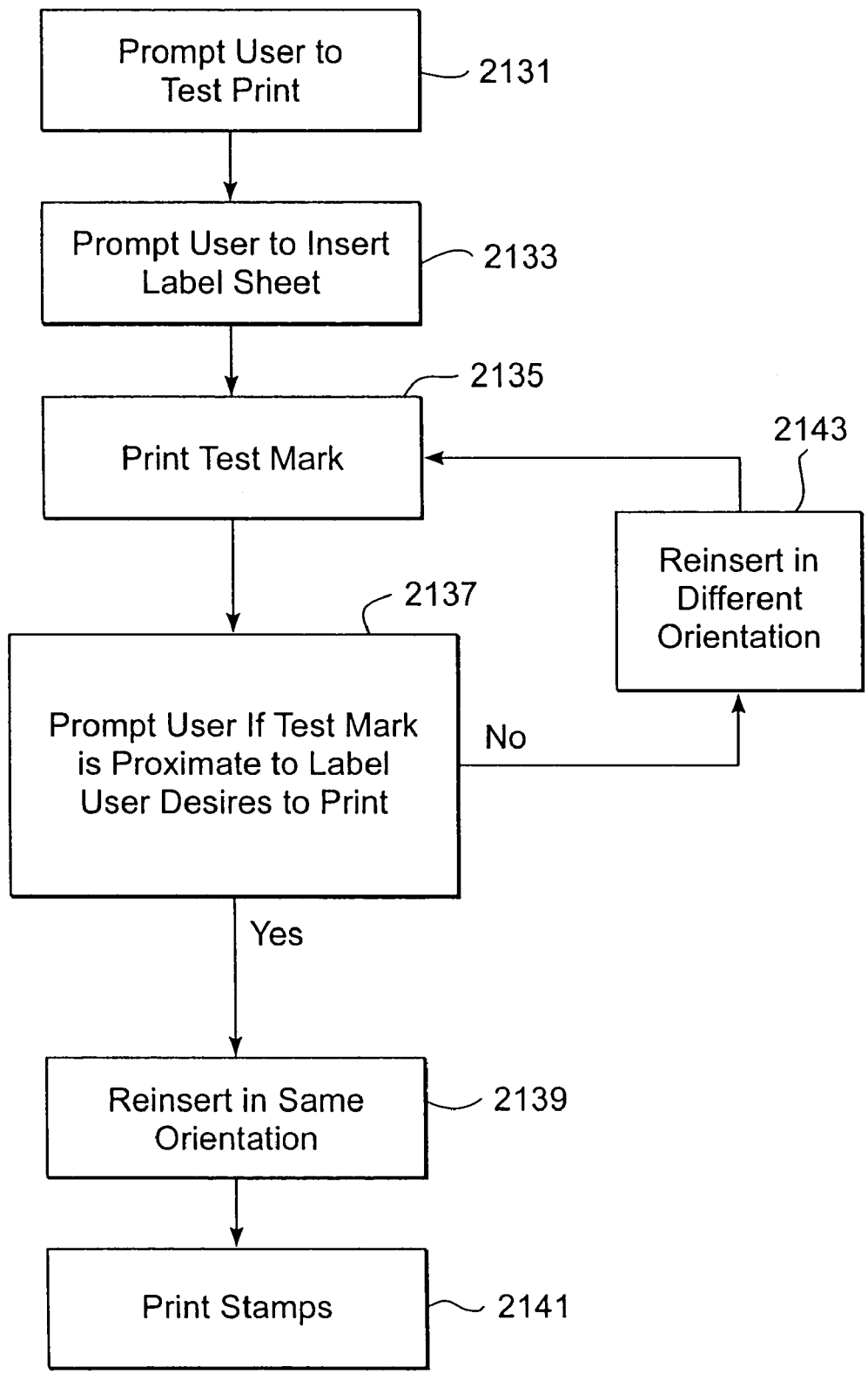
FIG. 22B is a simplified flow diagram of yet another method for determining correct insertion of a label sheet according to one embodiment of the invention.

FIG. 22B is a simplified flow diagram of a method according to another embodiment of the invention. This diagram is merely an illustration which should not limit the scope of the claims herein. One skilled in the art would recognize many other variations, modifications, and alternatives. The flow of FIG. 22B may be implemented, for example, with the system shown in FIG. 1. Additionally, the flow of FIG. 22B may be implemented, in part, with the print control program 1501.

FIG. 22B illustrates the flow of a method for determining a correct insertion orientation for a label sheet. The flow illustrated in FIG. 22B may be implemented, for example, with a series of web pages, windows, or the like. In a step 2131, the user is prompted whether the user wishes to perform a test print procedure. The test print procedure will attempt to print a test mark proximate to a label that the user desires to print. The test print procedure may attempt to print the test mark in a margin proximate to the label which the user desires to print. The user may be prompted in step 2131 with a web page, window, or the like. For example, the user may be prompted to select a button if the user desires to perform the test print procedure.

Figure 22C:
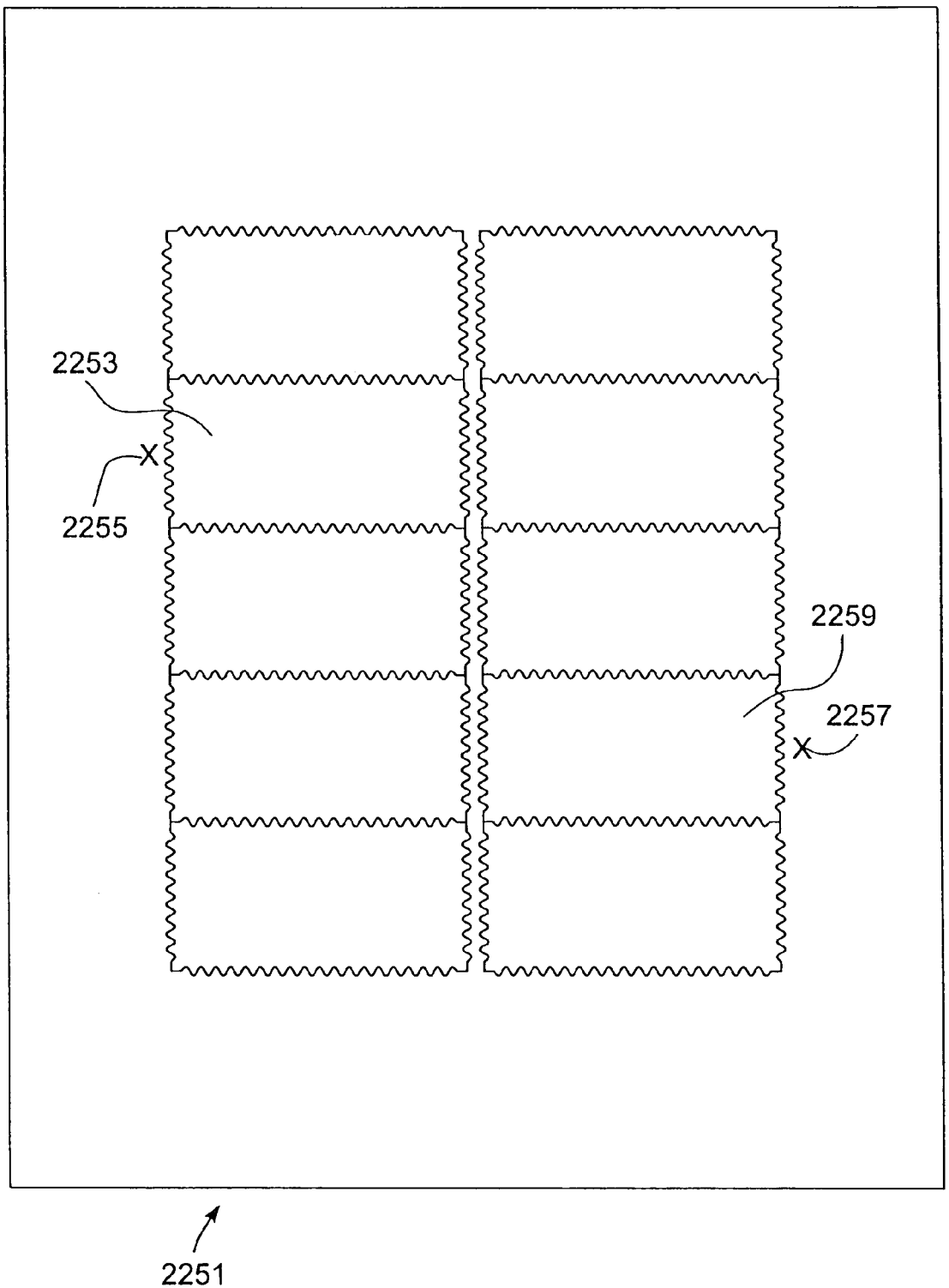
FIG. 22C is an illustration of a label sheet with a marks made by a user and a printer.

If the user elects to perform the test print procedure by, for example, selecting the button described above, the user is prompted to insert the label sheet into the printer in a step 2133. Next, a test mark is printed to the label sheet in a step 2135. FIG. 22C is an exemplary illustration of the label side of a label sheet 2251 used to illustrate the method shown in FIG. 22B. The label sheet 2251 includes ten labels. The label that the user desires to print to is label 2253. The test mark printed in step 2135 may be, for example, an "X", or some other like identifying symbol.

After the test mark is printed, the user is prompted to identify whether the test mark was printed proximate to the label 2253. For example, the test mark may have been printed next to label 2253 (test mark 2255). Alternatively, the test mark may have been printed next to another label, for example, next to label 2259 (test mark 2257). Also, the test mark may have been printed on the back side of the label sheet 2251.

If the test mark was printed next to the desired label, the user is prompted, in a step 2139, to reinsert the label sheet into the printer in the same orientation as used to print the test mark. Then, the label may be printed in a step 2141. However, if the test mark was not printed next to the desired label, the user is prompted, in a step 2143, to reinsert the label sheet into the printer in an orientation different than that used to print the test mark. Then, another test mark is printed in a step 2135, and the flow is repeated until the correct orientation is determined.

Figure 23:
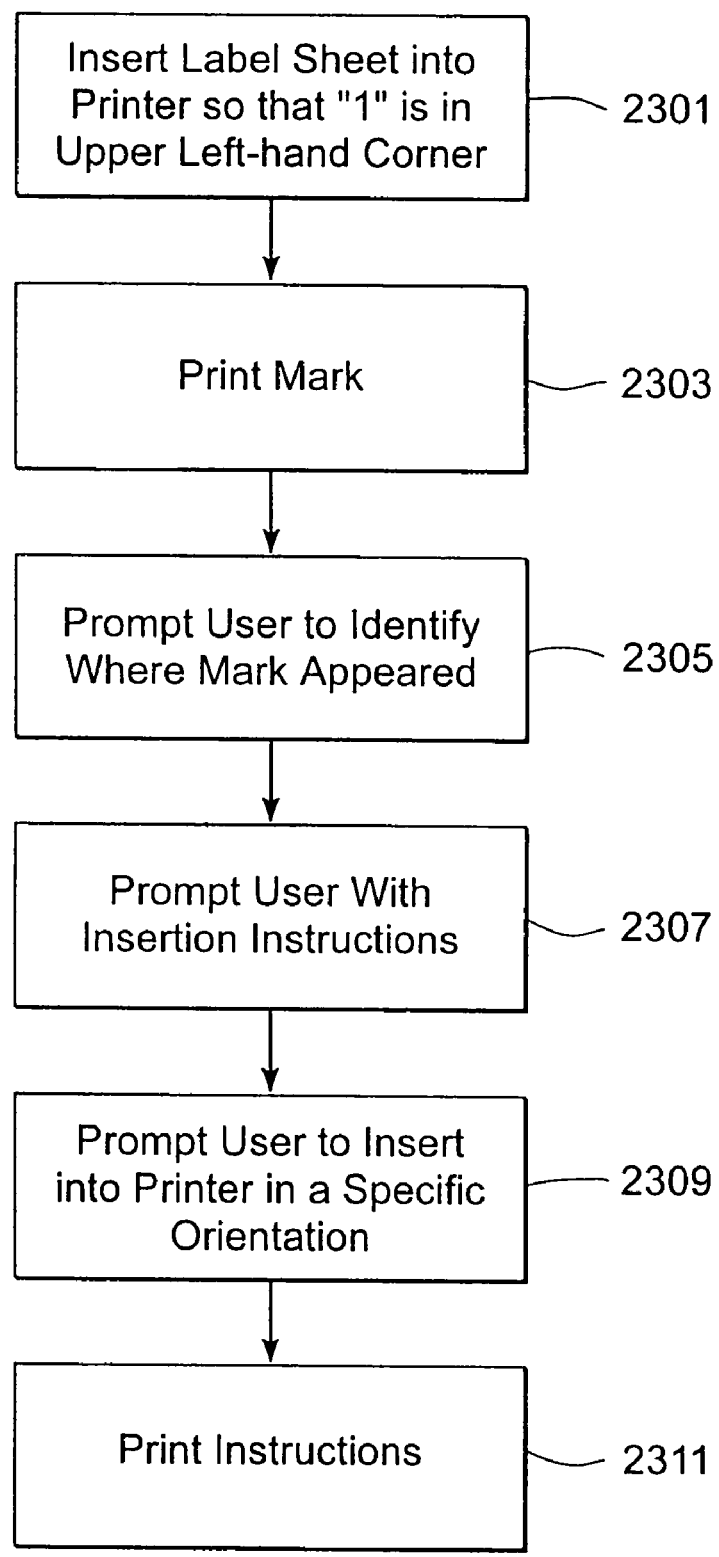
FIG. 23 is a simplified flow diagram of still another method for determining correct insertion of a label sheet according to one embodiment of the invention.

FIG. 23 is a simplified flow diagram of a method according to another embodiment of the invention. This diagram is merely an illustration which should not limit the scope of the claims herein. One of skilled in the art would recognize many other variations, modifications, and alternatives. The flow of FIG. 23 may be implemented, for example, with the system shown in FIG. 1. Additionally, the flow of FIG. 23 may be implemented, in part, with the print control program 1501.

Figure 24:
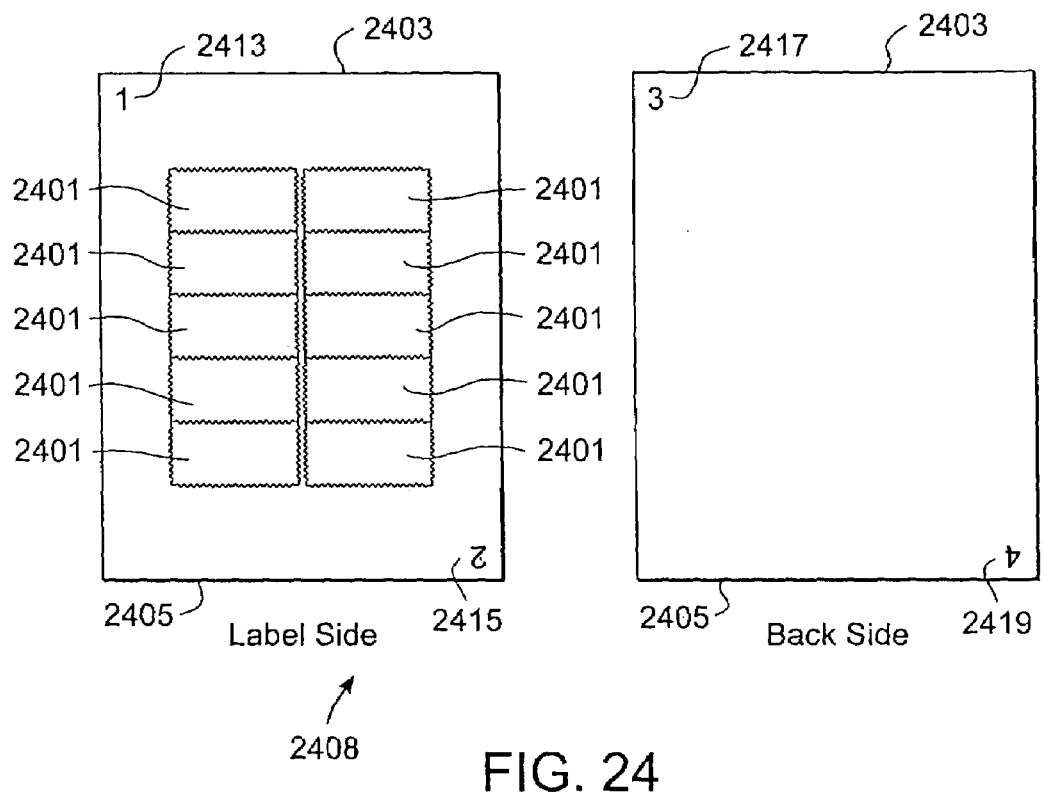
FIG. 24 illustrates the front and back sides of a label sheet according to one embodiment of the invention.

FIG. 23 illustrates a method for determining a correct printer insertion orientation for a label sheet. The method illustrated in FIG. 23 attempts to prevent both wrong-side insertion and wrong-edge insertion. In particular, the method illustrated in FIG. 23 helps the user identify the correct insertion orientation for a label sheet such that if the user inserts the label sheet into the printer in the correct insertion orientation, the label that the user intends to print is actually printed. The method illustrated in FIG. 23 works in conjunction with a label sheet that is marked to help identify different orientations of the label sheet. FIG. 24 is a simplified illustration of a label sheet marked to help identify different orientation of the label sheet according to an aspect of the invention. This figure is merely an example which should not limit the scope of the claims herein. One of ordinary skill in the art would recognize many other variations, modifications, and alternatives.

FIG. 24 shows a label side and a back side of a label sheet 2400. The label sheet 2400 includes a plurality of labels 2401, and has a top edge 2403 and a bottom edge 2405. Additionally, the label sheet includes orientation markings labeled 2413, 2415, 2417, and 2419 to help the user identify different orientations of the label sheet. In particular, the orientation markings 2413, 2415, 2417, and 2419 are the numbers "1", "2", "3", and "4", respectively. Although in this embodiment the orientation markings 2413, 2415, 2417, and 2419 are numbers, the markings may be any set of uniquely identifiable markings. For example, the markings 2413, 2415, 2417, and 2419 may be letters, symbols, or the like.

In the embodiment illustrated in FIG. 24, the orientation markings 2413, 2415, 2417, and 2419 are located in respective corners of the label sheet 2400. Orientation markings 2413 and 2417 are located proximate to the upper edge 2403, while orientation markings 2415 and 2419 are located proximate to the bottom edge. Thus, the orientation markings 2413, 2415, 2417, and 2419 are located on the label sheet 2400 such that one of the markings will be located in the upper left-hand corner of the label sheet in each of four insertion orientations. For instance, in a first orientation, the marking 2413 will appear in the upper left-hand corner of the label sheet. In a second orientation, the marking 2415 will appear in the upper left-hand corner of the label sheet. In a third orientation, the marking 2417 will appear in the upper left-hand corner of the label sheet. In a fourth orientation, the marking 2419 will appear in the upper left-hand corner of the label sheet. Although in this embodiment the orientation markings 2413, 2415, 2417, and 2419 are located in respective upper left-hand corners of the label sheet of the label sheet 2400, depending on the insertion orientation, the markings may be located in other areas of the label sheet. For example, the orientation markings 2413, 2415, 2417, and 2419 may be located in respective upper right-hand corners, respective tops, or the like, of the label sheet, depending on the insertion orientation. It is to be understood that in other embodiments, a label sheet may have more or less orientation markings than the four shown in FIG. 24.

Referring again to FIG. 23, a flow of a method for identifying the correct printer insertion orientation is illustrated. The flow illustrated in FIG. 23 may be implemented, for example, with a series of web pages, windows, or the like. In a step 2301, the user is prompted to insert the label sheet 2400 into the printer such that the orientation marking 2413 appears to the user in the upper left-hand corner of the label sheet as the user inserts the sheet into the printer. The user may be prompted to insert the label sheet into a paper tray, a manual feed tray, or the like, of the printer. In one embodiment, a web page prompts the user to insert a label sheet into the printer such that the orientation marking 2413 appears to the user in the upper left-hand corner of the label sheet.

Figure 25:
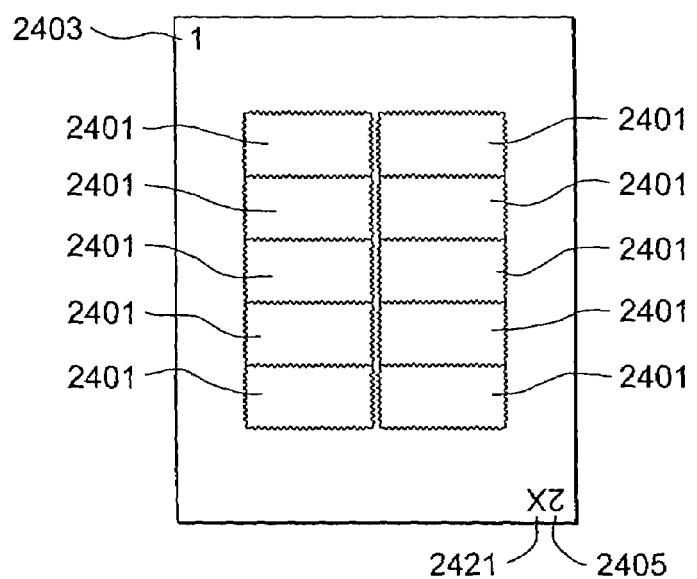
FIG. 25 illustrates a label sheet according to one embodiment of the invention, with a mark made by a printer.

Then, in a step 2303, the printer 114a is directed to print a test mark in the upper left-hand corner of the label sheet 2400. For example, the printer 114a may be directed to print a dot, a line, a circle, or the like, proximate to, over, around, or the like, one of the orientation markings 2413, 2415, 2417, or 2419. However, depending upon many factors known to those skilled in the art, the test mark printed by the printer 114a may appear proximate to any of the orientation markings 2413, 2415, 2417, or 2419. For example, the test mark may appear next to a different one of the orientation markings 2413, 2415, 2417, or 2419 depending upon the make and/or model of the printer 114a. FIG. 25 illustrates an example of a test mark 2421 printed in step 2303. In particular, the test mark 2421 is an "X" and was printed proximate to the mark 2415. A web page, or the like, may include a button, or the like, that, when pressed, causes the printer to print the test mark onto the label sheet in a manner well known to those skilled in the art.

Next, in a step 2305, the user is prompted to identify the orientation marking 2413, 2415, 2417, or 2419 proximate to which the test mark printed in step 2303 appears. For example, a web page, or the like, may prompt the user to select one of a plurality of buttons, links, or the like, labeled "1", "2", "3", and "4". Then, based upon the user's response in step 2305, the user is prompted with instructions on the correct insertion orientation in a step 2307. In particular, if the user indicated that the test mark was next to the orientation marking 2413, then the proper insertion orientation is such that the orientation marking 2413 appears to the user in the upper left-hand corner of the label sheet 2400. Similarly, if the user indicated that the test mark was next to the orientation marking 2415, then the proper insertion orientation is such that the orientation marking 2415 appears to the user in the upper left-hand corner of the label sheet 2400. Also, if the user indicated that the test mark was next to the orientation marking 2417, then the proper insertion orientation is such that the orientation marking 2417 appears to the user in the upper left-hand corner of the label sheet 2400. And, if the user indicated that the test mark was next to the orientation marking 2419, then the proper insertion orientation is such that the orientation marking 2419 appears to the user in the upper left-hand corner of the label sheet 2400. The user may be prompted with the appropriate insertion instructions in step 2307 with a web page, window, or the like.

Additionally, insertion instructions may be printed upon the label sheet in a manner similar to that discussed with respect to FIG. 22A. For instance, in a step 2309, the user may be prompted to insert the label sheet into the printer 114a in a particular orientation with reference to the orientation marks 2413, 2415, 2417, and 2419. Then, in a step 2311, the printer may be directed to print insertion instructions on the label sheet 2400 in a margin on the label side of the label sheet 2400, on the back side of the label sheet 2400, or the like. For example, if it has been determined that the correct insertion orientation is such that the orientation marking 2413 appears to the user in the upper left-hand corner of the label sheet, then the user may be prompted to insert the label sheet 2400 into the printer in the correct orientation. Then, the printer 114a may be directed to print insertion instructions in a margin of the label sheet 2400 such as "Insert label sheet into so that '1' appears in upper left-hand corner.", or the like. Additionally, the user may be prompted to insert the label sheet into the printer in an appropriate orientation such that insertion instructions may be printed on the back side of the label sheet 2400 similar to those discussed with respect to FIG. 22A.

With the methods described with respect to FIGS. 22B, and 23–25, after the correct insertion orientation has been determined, the correct insertion orientation may be transmitted to the server system 118. Thus, in a manner similar to the methods described with respect to FIGS. 19, 20, 21, and 22A, the server system 118 may keep track of the correct insertion orientation for the user. Thus, the next time the user attempts to print a stamp, the server system may prompt the user, with a web page, via the print control program, or the like, with the insertion orientation that the user last used to print stamps. The user need not repeat the above-described steps each time the user wishes to print one or more labels. Additionally, when the server system 118 prompts the user with insertion instructions, the user need not rely on the user's memory for correct insertion, or have to store the insertion instructions elsewhere. In still another embodiment, the correct orientation may stored as information in a cookie on the user computer 112a.

Although these embodiments were described in the context of determining correct insertion orientation of label sheets, it is to be understood that the invention may be applied to determining orientation of other types of printable media as well, e.g., envelopes, post cards, etc.

Reversible Label Sheet

Figure 26:
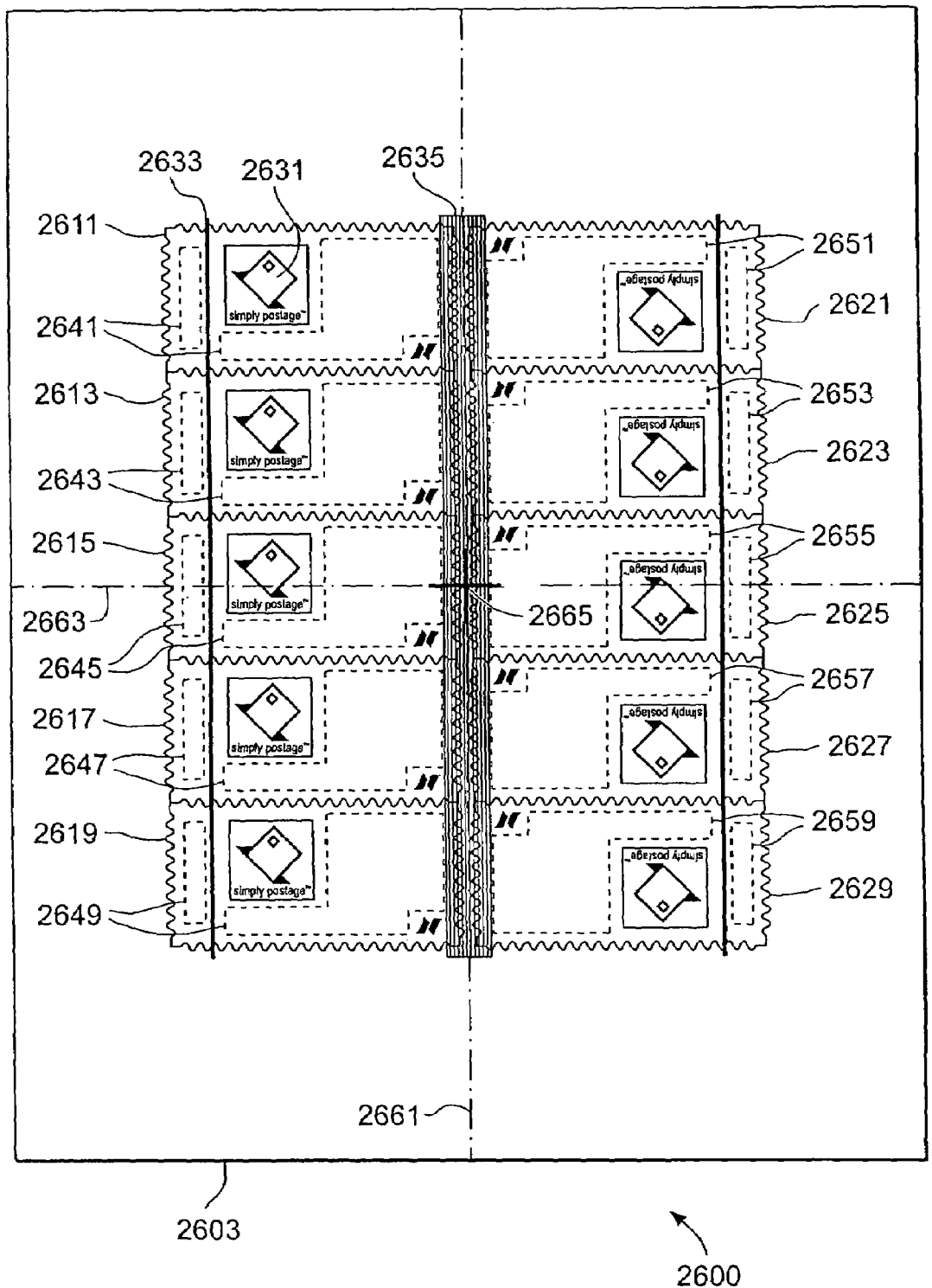
FIG. 26 illustrates a reversible label sheet according to one embodiment of the invention.

FIG. 26 is a simplified illustration of a label sheet according to another aspect of the invention. This figure is merely an example which should not limit the scope of the claims herein. One of ordinary skill in the art would recognize many other variations, modifications, and alternatives.

FIG. 26 illustrates an embodiment of a reversible label sheet. In particular, FIG. 26 shows the label side of a label sheet 2600. The label sheet 2600 includes a first edge 2601 and a second edge 2603. Additionally, the label sheet 2600 includes a plurality of labels 2611, 2613, 2615, 2617, 2619, 2621, 2623, 2625, 2627, and 2629. Although the label sheet 2600 includes ten labels, a label sheet according to the invention may include any even number of labels. Each label includes printed thereon a pattern. For example, in the embodiment shown in FIG. 26, each label has printed thereon an icon 2631 and vertical lines 2633 and 2635. Although in the embodiment shown in FIG. 26, all the labels include the same pattern, the patterns on the labels need not be the same. The pattern printed on each label defines a print target area on that label. For example, the pattern on label 2611 defines a print target area that is roughly identified by the region labeled 2641. A postage indicium, text information, and the like, may be printed within the print target area 2641. Similarly, labels 2613, 2615, 2617, 2619, 2621, 2623, 2625, 2627, and 2629 have print target areas 2643, 2645, 2647, 2649, 2651, 2653, 2655, 2657, and 2659, respectively, defined thereon.

A vertical midline of the label sheet 2600 is shown as line 2661. Additionally, a horizontal midline of the label sheet 2600 is shown as line 2663. A center point 2665 of the label sheet 2600 is located at the intersection of the vertical midline 2661 and horizontal midline 2663. Although in the embodiment shown in FIG. 26, all the print target areas are of substantially the same size and shape, the print target areas need not be all of the same size and shape. However, each of print target areas has a corresponding print target area of substantially the same size and shape, but located at a position substantially rotated 180 degrees about the center point 2665, and having an orientation rotated 180 degrees. For example, the print target area 2659 is of substantially the same size and shape as the print target area 2641. But the position of print target area 2659 is rotated substantially 180 degrees about the center point 2665 from the position of the print target area 2641. Also, the orientation of the print target area 2659 is rotated 180 degrees from that of the print target area 2641.

As can be seen in FIG. 26, the pattern defined by the union of the print target areas appears the same whether the label sheet 2600 is held with the edge 2601 on top or with the edge 2603 on top. Thus, if a user wishes, for example, to print to all the print target areas on label sheet 2600, it does not matter whether the label sheet 2600 is inserted into a printer with the edge 2601 fed first or with the edge 2603 fed first.

Figure 27:
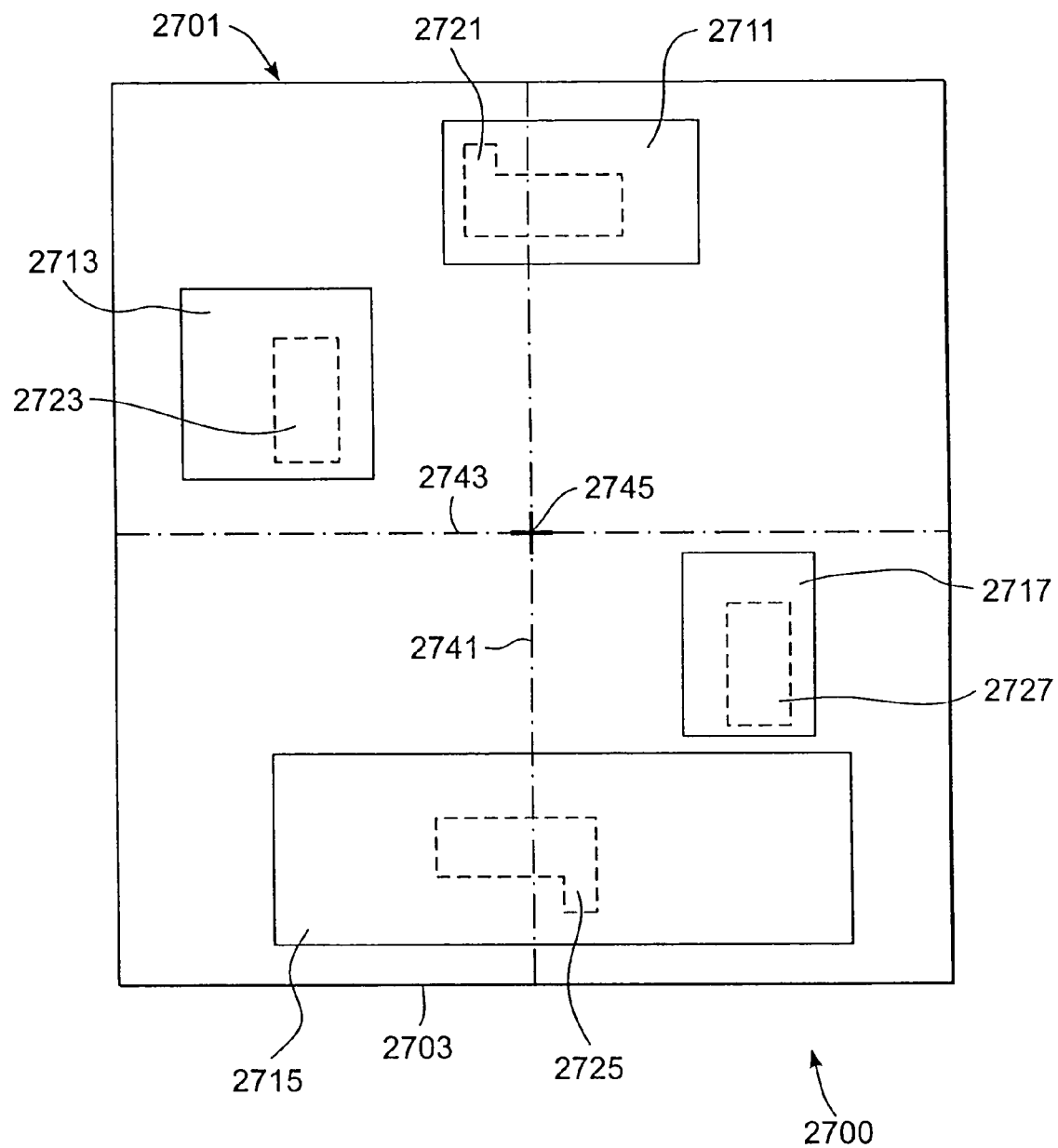
FIG. 27 illustrates a reversible label sheet according to another embodiment of the invention.

FIG. 27 is a simplified illustration of a label sheet according to another embodiment of the invention. This figure is merely an example which should not limit the scope of the claims herein. One of ordinary skill in the art would recognize many other variations, modifications, and alternatives.

FIG. 27 illustrates another embodiment of a reversible label sheet. In particular, FIG. 27 illustrates that the sizes and shapes of the labels need not be the same. Additionally, FIG. 27 illustrates that the sizes and shapes of the print target areas need not all be the same. FIG. 27 shows the label side of a label sheet 2700 having a first edge 2701 and a second edge 2703. The label sheet 2700 includes labels 2711, 2713, 2715, and 2717. Each label has a pattern (not shown) printed thereon that defines a print target area. For instance, label 2711 includes a print target area that is identified by the region 2721. Similarly, labels 2713, 2715, and 2717 have defined thereon print target areas 2723, 2725, and 2727, respectively. Additionally, the centerpoint of the label sheet 2700 is identified as 2745.

The print target area 2725 is of substantially the same size and shape of the print target area 2721. However, print target area 2725 is located at a position substantially rotated 180 degrees about the center point 2745 from the position of print target area 2721. Also, the orientation of print target area 2725 is rotated substantially 180 degrees from that of print target area 2721. The print target areas 2723 and 2727 similarly correspond. However, the size and shape of print target areas 2723 and 2727 are substantially different from those of print target areas 2721 and 2725. But, as can be seen in FIG. 27, the pattern defined by the union of the print target areas appears the same whether the label sheet 2700 is held with the edge 2701 on top or with the edge 2703 on top. Thus, if a user wishes, for example, to print to all the print target areas on label sheet 2700, it does not matter whether the label sheet 2700 is inserted into a printer with the edge 2701 fed first or with the edge 2703 fed first.

The invention has now been explained with reference to specific embodiments. Other embodiments will be apparent to those of ordinary skill in the art. Therefore, it is not intended that this invention be limited except as indicated by the appended claims.

What is claimed is:

1. A method for determining a correct insertion orientation for a printable medium in a printer, the method comprising:
   prompting, with a computer coupled with an output device and with the printer, a user to place a first mark on a sheet of paper;
   prompting, with the computer, the user to insert the sheet of paper into the printer in an orientation relative to the first mark;
   printing a second mark to the sheet of paper with the printer; and
   prompting, with the computer, the correct insertion orientation for a label sheet based upon the location of the first and second marks on the sheet of paper.

2. The method of claim 1 further comprising:
   prompting the user to insert the printable medium into the printer in a particular orientation; and
   printing insertion instructions on the printable medium.

3. The method of claim 2 wherein the printable medium is a label sheet.

4. The method of claim 2 wherein the printable medium is an envelope.

5. The method of claim 1 further comprising:
   storing the correct insertion orientation; and
   upon the user attempting to print to a label sheet, prompting, with the computer, the user with insertion instructions.

6. The method of claim 5 wherein the computer is coupled with a server system via a communications network, and wherein said storing step includes storing the correct insertion orientation on the server system.

7. A system for determining a correct insertion orientation for a printable medium in a printer, the computer system comprising:
   a module for prompting, with a computer coupled with an output device and with the printer, a user to place a first mark on a sheet of paper;
   a module for prompting, with the computer, the user to insert the sheet of paper into the printer in an orientation relative to the first mark;
   a module for printing a second mark to the sheet of paper with the printer; and
   a module for prompting, with the computer, the correct insertion orientation for the printable medium based upon the location of the first and second marks on the sheet of paper.

8. The system of claim 7 further comprising:
   a module for prompting the user to insert the printable medium into the printer in a particular orientation; and
   a module for directing the printer to print insertion instructions on the printable medium.

9. The system of claim 7 further comprising:
   a module for storing the correct insertion orientation in a memory of the computer; and
   a module for, upon the user attempting to print to a label sheet, prompting, with the computer, the user with insertion instructions.

10. A computer program product stored on a computer-readable medium for determining a correct insertion orientation for a printable medium in a printer, the computer program product comprising:
    code for prompting a user to place a first mark on a sheet of paper;
    code for prompting the user to insert the sheet of paper into the printer in an orientation relative to the first mark;
    code for printing a second mark to the sheet of paper with the printer; and
    code for prompting the user with the correct insertion orientation for the printable medium based upon the location of the first and second marks on the sheet of paper.

11. The computer program product of claim 10 further comprising:

code for prompting the user to insert the printable medium into the printer in a particular orientation; and code for directing the printer to print insertion instructions on the printable medium.

12. The computer program product of claim 10 the further comprising:

code for storing the correct insertion orientation in a memory of the computer; and code for, upon the user attempting to print to a label sheet, prompting, with the computer, the user with insertion instructions.

13. A method for determining a correct insertion orientation for a label sheet in a printer, the method comprising:

prompting, with a computer coupled with an output device and with the printer, a user to place a first mark on a sheet of paper;

prompting, with the computer, the user to insert the sheet of paper into the printer in an orientation relative to the first mark;

printing a second mark to the sheet of paper with the printer; and prompting, with the computer, the correct insertion orientation for a label sheet based upon the location of the first and second marks on the sheet of paper.

14. The method of claim 13 further comprising:

prompting the user to insert a label sheet into the printer in a particular orientation; and printing insertion instructions on the label sheet.

15. The method of claim 13 further comprising:

storing the correct insertion orientation; and upon the user attempting to print to a label sheet, prompting, with the computer, the user with insertion instructions.

16. The method of claim 15 wherein the computer is coupled with a server system via a communications network, and wherein said storing step includes storing the correct insertion orientation on the server system.

17. The method of claim 15 wherein said storing step includes storing the correct insertion orientation on the computer.

* * * * *